(12) United States Patent
Kuwahara et al.

(10) Patent No.: US 12,378,346 B2
(45) Date of Patent: Aug. 5, 2025

(54) POLYORGANOSILOXANE-CONTAINING POLYMER PARTICLE GROUP, COMPOSITION, RESIN COMPOSITION, AND MOLDED BODY

(71) Applicant: Mitsubishi Chemical Corporation, Tokyo (JP)

(72) Inventors: Atsushi Kuwahara, Tokyo (JP); Hiroya Arai, Tokyo (JP); Ai Kiwa, Tokyo (JP); Shinji Matsuoka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 441 days.

(21) Appl. No.: 18/063,709

(22) Filed: Dec. 9, 2022

(65) Prior Publication Data

US 2023/0118524 A1    Apr. 20, 2023

Related U.S. Application Data

(63) Continuation of application No. PCT/JP2021/022362, filed on Jun. 11, 2021.

(30) Foreign Application Priority Data

Jun. 12, 2020    (JP) ................. 2020-102397

(51) Int. Cl.
C08F 283/12    (2006.01)
C08F 220/14    (2006.01)
(Continued)

(52) U.S. Cl.
CPC ........ C08F 283/124 (2013.01); C08F 220/14 (2013.01); C08F 220/1804 (2020.02);
(Continued)

(58) Field of Classification Search
CPC ............... C08F 283/124; C08F 220/14; C08F 220/1804; C08F 220/40; C08F 2/26;
(Continued)

(56) References Cited

U.S. PATENT DOCUMENTS

2009/0076191 A1    3/2009    Aoyama et al.
2018/0312693 A1    11/2018    Iwanaga et al.
2020/0109277 A1    4/2020    Takemasu et al.

FOREIGN PATENT DOCUMENTS

CN    101175818 A    5/2008
CN    108137763 A    6/2018
(Continued)

OTHER PUBLICATIONS

Notice of Reasons for Refusal issued in Japanese Patent Application No. 2022-530643, on Nov. 19, 2024, 12 pages including English translation.

(Continued)

*Primary Examiner* — Randy P Gulakowski
*Assistant Examiner* — Holley Grace Hester
(74) *Attorney, Agent, or Firm* — Grüneberg and Myers PLLC

(57) ABSTRACT

Polyorganosiloxane-containing polymer particles comprising: a polymer (A) comprising a polyorganosiloxane (A1) and a first vinyl polymer (A2); and a second vinyl polymer (B), wherein a proportion of particles satisfying formula (1) is less than 60%:

$$M/L>0.1 \qquad (1),$$

wherein L is a diameter of each particle of the polyorganosiloxane-containing polymer particles, as determined in an observation using a transmission electron microscope with respect to a cross section of a resin piece obtained by dispersing the polyorganosiloxane-containing polymer par- (Continued)

ticles in a resin, and M is a maximum domain length of the polyorganosiloxane (A1) in the observation.

21 Claims, 16 Drawing Sheets

(51) Int. Cl.
 *C08F 220/18* (2006.01)
 *C08F 220/40* (2006.01)
 *C08L 83/04* (2006.01)

(52) U.S. Cl.
 CPC ............ *C08F 220/40* (2013.01); *C08L 83/04* (2013.01); *C08L 2201/52* (2013.01); *C08L 2205/18* (2013.01)

(58) Field of Classification Search
 CPC ........ C08F 2/44; C08F 285/00; C08F 283/12; C08L 83/04; C08L 2201/52; C08L 2205/18; C08L 33/12; C08L 59/04; C08L 69/00; C08L 33/04; C08L 51/085; C08L 101/00
 See application file for complete search history.

(56) References Cited

FOREIGN PATENT DOCUMENTS

| | | |
|---|---|---|
| CN | 110709437 | 1/2020 |
| EP | 1 881 036 | 1/2008 |
| EP | 3 369 755 | 9/2018 |
| EP | 3 636 683 | 4/2020 |
| GB | 1297730 | 11/1972 |
| JP | 47-005592 | 3/1972 |
| JP | H06-116471 | 4/1994 |
| JP | 2000-327880 | 11/2000 |
| JP | 2003-096142 | 4/2003 |
| JP | 2006-124540 | 5/2006 |
| JP | 2009-155421 | 7/2009 |

OTHER PUBLICATIONS

International Search Report dated Aug. 31, 2021, in PCT/JP2021/022362, with English translation, 4 pages.
Extended European Search Report dated Oct. 31, 2023, in European Patent Application No. 21821995.4, 8 pages.
Taiwanese Office Action received for Taiwanese Patent Application No. 110121460, mailed on Sep. 4, 2024, 13 pages with English translation.
Office Action issued in Chinese Patent Application No. 202180040856, on Jan. 24, 2025, 17 pages, (with unedited computer-generated English translation).

POLYORGANOSILOXANE-CONTAINING POLYMER PARTICLE GROUP, COMPOSITION, RESIN COMPOSITION, AND MOLDED BODY

This application is a continuation application of International Application No. PCT/JP2021/022362, filed on Jun. 11, 2021, which claims priority to Japanese Patent Application No. 2020-102397, filed Jun. 12, 2020, the entire contents of which are incorporated herein by reference.

TECHNICAL FIELD

The present invention relates to polyorganosiloxane-containing polymer particles, a composition, a resin composition, and a molded product.

BACKGROUND ART

A rubber-containing polymer obtained by polymerizing a vinyl monomer with a rubbery polymer can be dispersed in a wide variety of resins while maintaining a predetermined rubber particle size and rubber structure. Therefore, a rubber-containing polymer is suited for resin applications where impact strength is required.

In general, it is preferable to use a rubbery polymer having a low elastic modulus and a high Poisson's ratio in terms of improving the impact strength. Butadiene rubbers and silicone rubbers have an extremely high Poisson's ratio of 0.5 and low elastic moduli as well, and are thus suitably used as the rubbery polymers.

Silicone rubbers are more resistant to heat- or ultraviolet-induced hardening or discoloration, compared to butadiene rubbers, and have excellent durability. For this reason, silicone rubbers are suitably used for applications requiring long-term maintenance of mechanical properties, such as building materials and automobile components. A silicone rubber generally used is polyorganosiloxane, a representative example of which is polydimethylsiloxane.

However, polyorganosiloxanes are more expensive than butadiene rubbers. In addition, the use of polyorganosiloxanes poses a problem that, when a polyorganosiloxane-containing polymer is blended with a resin (polycarbonate, polymethyl methacrylate, styrene-acrylonitrile copolymer, etc.) having a higher refractive index than the polyorganosiloxane-containing polymer to form a molded product, the transparency of the molded product decreases, thus making it difficult to realize a desirable color appearance, especially a deep dark color.

Patent Literature 1 describes resin compositions containing various thermoplastic resins, such as a vinyl chloride resin, a polycarbonate resin and a polyester resin, and a polyorganosiloxane-containing graft copolymer. In Patent Literature 1, the number average particle diameter of the polyorganosiloxane-containing graft copolymer is limited to 5 to 80 nm, and the volume of particles larger than 100 nm is limited to 10% or less of the total particle volume, to thereby improve the pigmentability of the resulting molded product.

Patent Literature 2 describes a resin composition containing a styrene-acrylonitrile copolymer and a polyorganosiloxane-containing graft copolymer. Patent Literature 2 also describes limiting the weight average particle diameter of the polyorganosiloxane-containing graft copolymer to 110 nm or less.

Patent Literature 3 describes a resin composition containing a polymethyl methacrylate resin and a polyorganosiloxane-containing graft copolymer.

CITATION LIST

Patent Literature

Patent Literature 1: Japanese Unexamined Patent Application, First Publication No. Hei 6-116471
Patent Literature 2: Japanese Unexamined Patent Application. First Publication No. 2009-155421
Patent Literature 3: Japanese Unexamined Patent Application. First Publication No. 2000-327880

SUMMARY OF INVENTION

Technical Problem

However, the prior art references described above have a problem that the impact strength of the resulting molded product is not sufficient.

An object of the present invention is to provide a polyorganosiloxane-containing polymer particles, a composition, and a resin composition, which can be used to provide a molded product having excellent impact strength.

Another object of the present invention is to provide a molded product having excellent impact strength.

Solution to Problem

The embodiments of the present invention are as follows.

[1] Polyorganosiloxane-containing polymer particles including: a polymer (A) including a polyorganosiloxane (A1) and a first vinyl polymer (A2); and a second vinyl polymer (B),
wherein a proportion of particles satisfying formula (1) is less than 60%:

$$M/L > 0.1 \quad (1),$$

wherein L is a diameter of each particle of the polyorganosiloxane-containing polymer particles, as determined in an observation using a transmission electron microscope with respect to a cross section of a resin piece obtained by dispersing the polyorganosiloxane-containing polymer particles in a resin, and M is a maximum domain length of the polyorganosiloxane (A1) in the observation.

[2] The polyorganosiloxane-containing polymer particles according to [1], wherein a proportion of the polyorganosiloxane (A1) is 1% by mass or more and 50% by mass or less with respect to 100% by mass of the polyorganosiloxane-containing polymer particles.

[3] The polyorganosiloxane-containing polymer particles according to [1] or [2], wherein a proportion of the polyorganosiloxane (A1) is 1% by mass or more and 10% by mass or less with respect to 100% by mass of the polyorganosiloxane-containing polymer particles.

[4] The polyorganosiloxane-containing polymer particles according to any one of [1] to [3], which have a number average particle diameter of 10 nm or more and 150 nm or less.

[5] The polyorganosiloxane-containing polymer particles according to any one of [1] to [4], a part of which is insoluble in tetrahydrofuran, wherein a proportion of the polyorganosiloxane-containing polymer particles which are insoluble in tetrahydrofuran is 80% by mass or more and less than 100% by mass with respect to 100% by mass of the polyorganosiloxane-containing polymer particles.

[6] The polyorganosiloxane-containing polymer particles according to any one of [1] to [5], a part of which is soluble in tetrahydrofuran, wherein weight average molecular weight of the polyorganosiloxane-containing polymer particles which are soluble in tetrahydrofuran is 20,000 or more and 500,000 or less.

[7] The polyorganosiloxane-containing polymer particles according to any one of [1] to [6], wherein the polymer (A) has a sea-island structure with the polyorganosiloxane (A1) as a sea component and the first vinyl polymer (A2) as an island component, as confirmed by observation using a transmission electron microscope with respect to a cross section of the resin piece,
  wherein the sea-island structure has multiple domains of the first vinyl polymer (A2) included in a domain of the polyorganosiloxane (A1).

[8] The polyorganosiloxane-containing polymer particles according to any one of [1] to [7], each of which has a sea-island structure with the polyorganosiloxane (A1) as a sea component and the first vinyl polymer (A2) as an island component, as confirmed by observation using a transmission electron microscope with respect to a cross section of the resin piece.

[9] The polyorganosiloxane-containing polymer particles according to any one of [1] to [8], wherein a proportion of the polymer (A) is 60% by mass or more and 95% by mass or less with respect to 100% by mass of the polyorganosiloxane-containing polymer particles.

[10] The polyorganosiloxane-containing polymer particles according to any one of [1] to [9], wherein the first vinyl polymer (A2) comprises a vinyl monomer component (a2) including a monofunctional (meth)acrylate monomer.

[11] The polyorganosiloxane-containing polymer particles according to any one of [1] to [10], wherein the second vinyl polymer (B) includes a vinyl monomer component (b) including at least one selected from the group consisting of a (meth)acrylate monomer and an aromatic vinyl monomer.
  wherein a proportion of total amount of the (meth)acrylate monomer and the aromatic vinyl monomer is 50% by mass or more with respect to 100% by mass of the vinyl monomer component (b).

[12] The polyorganosiloxane-containing polymer particles according to any one of [1] to [11], wherein the second vinyl polymer (B) includes a vinyl monomer component (b) including methyl methacrylate,
  wherein a proportion of the methyl methacrylate is 50% by mass or more with respect to 100% by mass of the vinyl monomer component (b).

[13] The polyorganosiloxane-containing polymer particles according to any one of [1] to [12], wherein the polymer (A) is a polymer obtained by polymerizing a vinyl monomer component (a2) for the first vinyl polymer (A2) in the presence of a latex containing the polyorganosiloxane (A1).

[14] A composition comprising: the polyorganosiloxane-containing polymer particles of any one of [1] to [13]; and at least one component selected from the group consisting of a phosphoric acid compound and an alkali metal salt thereof.

[15] The composition according to [14], wherein the alkali metal salt of the phosphoric acid compound is at least one selected from the group consisting of an alkali metal salt of an alkyl phosphate and an alkali metal salt of an alkyl aryl phosphate.

[16] The composition according to [14] or [15], wherein the alkali metal salt of the phosphoric acid compound is an alkali metal salt of a polyoxyalkylene alkyl ether phosphate.

[17] The composition according to any one of [14] to [16], wherein an amount of phosphorus atoms contained in the at least one component selected from the group consisting of a phosphoric acid compound and an alkali metal salt thereof is 100 ppm by mass or more, in terms of a mass proportion thereof relative to total 100% by mass of the polyorganosiloxane-containing polymer particles and the at least one component.

[18] A resin composition comprising: the polyorganosiloxane-containing polymer particles of any one of [1] to [13]; and a thermoplastic resin.

[19] A resin composition including: the composition of any one of [14] to [17]; and a thermoplastic resin.

[20] The resin composition according to [18] or [19], wherein the thermoplastic resin comprises at least one selected from the group consisting of aromatic polycarbonate, polymethyl methacrylate, styrene-acrylonitrile copolymer, polyethylene terephthalate, polybutylene terephthalate, polyvinyl chloride, polyphenylene sulfide and polyacetal.

[21] A molded product including the polyorganosiloxane-containing polymer particles of any one of [1] to [13].

Advantageous Effects of Invention

The polyorganosiloxane-containing polymer particles of the present invention can be used to provide a molded product having excellent impact strength.

The composition of the present invention can be used to provide a molded product having excellent impact strength.

The resin composition of the present invention can be used to provide a molded product having excellent impact strength.

The molded product of the present invention is excellent in impact strength.

DESCRIPTION OF EMBODIMENTS

Figure 1:
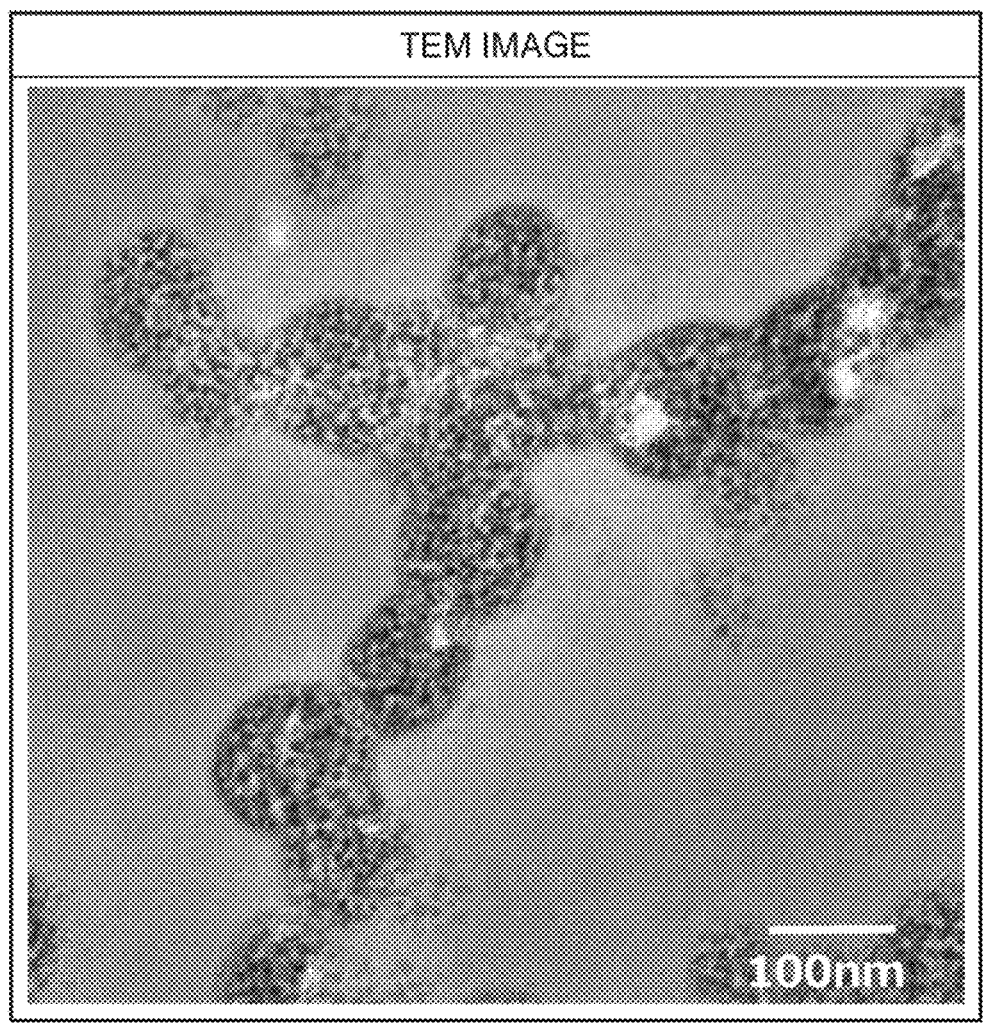
FIG. 1 is a transmission electron microscope (TEM) image of polymer panicles (C-1) produced in the Examples section.

Hereinbelow, the embodiments of the present invention are described in detail.

In the present invention, a vinyl monomer is a compound having a polymerizable double bond.

The term "(meth)acrylate" indicates an acrylate or a methacrylate.

In the present specification, a transmission electron microscope is also referred to as "TEM".

[Polyorganosiloxane-Containing Polymer Particles]

The polyorganosiloxane-containing polymer particles (hereinafter, also referred to as "polymer particles (C)") according to one aspect of the present invention includes a polymer (A) and a second vinyl polymer (B)(hereinafter, also referred to as "vinyl polymer (B)"). The polymer (A) contains a polyorganosiloxane (A1) and a first vinyl polymer (A2) (hereinafter, also referred to as "vinyl polymer (A2)").

With respect to the polyorganosiloxane (A1), the vinyl polymer (A2), the polymer (A), and the vinyl polymer (B), detailed descriptions are given in later sections.

Typically, each panicle of the polymer particles (C) contains the polymer (A) and the vinyl polymer (B).

In the polymer particles (C), a proportion (hereinafter, also referred to as "Z value") of particles satisfying the formula (1) below is less than 60%:

$$M/L > 0.1 \quad (1),$$

wherein, is a diameter (μm) of each particle of the polymer particles (C), as determined in an observation using a TEM with respect to a cross section of a resin piece obtained by dispersing the polymer particles (C) in a resin, and M is a maximum domain length (μm) of the polyorganosiloxane (A1) in the observation.

The Z value of less than 60% allows the molded product containing the polymer particles (C) to show excellent impact strength, color appearance and weatherability. The Z value is preferably 50% or less, more preferably 30% or less, even more preferably 20% or less, and particularly preferably 10% or less. The Z value is preferred to be as small as possible, and there is no particular lower limit thereof.

In the polymer particles (C), the polymer (A) preferably has a sea-island structure with the polyorganosiloxane (A1) as a sea component and the vinyl polymer (A2) as an island component, as confirmed by observation using TEM with respect to a cross section of the resin piece described above. Such a sea-island structure formed by combination of the polyorganosiloxane (A1) with the vinyl polymer (A2) allows the molded product containing the polymer particles (C) to show further improved impact strength, color appearance and weatherability.

Each particle of the polymer particles (C) preferably has a sea-island structure with the polyorganosiloxane (A1) as a sea component, the vinyl polymer (A2) as a first island component, and the vinyl polymer (B) as a second island component, as confirmed by observation using TEM with respect to a cross section of the resin piece described above. Such a sea-island structure formed by combination of the polyorganosiloxane (A1), the vinyl polymer (A2) and the vinyl polymer (B) allows the molded product to show further improved impact strength and color appearance.

The sea-island structure in which the polyorganosiloxane (A1), the vinyl polymer (A2), and the vinyl polymer (B) are combined as described above can be formed, for example, by implementing polymerization after impregnating the polymer (A) with at least a part of the vinyl monomer component (b) for forming the vinyl polymer (B) in the production of the polymer particles (C).

For impregnating the polymer (A) with at least a part of the vinyl monomer component (b), for example, a vinyl monomer having a solubility in water of 1.0 g/L or less at 30° C. may be used as at least a part of the vinyl monomer component (b).

Examples of the vinyl monomer having a solubility in water of 1.0 g/L or less at 30° C. include, among the vinyl monomers described in a later section, styrene, alkyl-substituted styrene, alkyl-substituted isopropenylbenzene, 1,1-diphenylethylene and the like.

Examples of methods for distinguishing between the first island component and the second island component include a TEM observation with adjusted staining conditions (specifically, type of staining agent and staining time), and elemental analysis by energy dispersive X-ray spectroscopy, electron energy loss spectroscopy, etc.

Each particle of the polymer particles (C) may include the vinyl polymer (B) not forming the second island component. The vinyl polymer (B) not forming the second island component (i.e., the vinyl polymer (B) formed by polymerization of the vinyl monomer component (b) that is not impregnated into the polymer (A)) in each particle of the polymer particles (C) is present on the outer surface of the polymer (A) as a graft polymer (i.e., a polymer covalently bonded to the polymer (A)) or a free polymer (i.e., a polymer physically adsorbing, without being covalently bonded, to the polymer (A)).

Specifically, the TEM image of the cross section of the resin piece can be acquired by following the procedures described below.

(1) First, the polymer particles (C) are placed at the tip of a polyethylene capsule, and a liquid uncured epoxy resin is poured into the capsule. Then, the capsule is left to stand at 25° C. for 12 hours to allow the resin to be cured, thereby obtaining a resin piece.

(2) The obtained resin piece is stained with an osmium tetroxide aqueous solution (23° C. 12 hours).

(3) Then, the resin piece stained with the osmium tetroxide aqueous solution is stained with a ruthenium tetroxide aqueous solution (23° C., 5 hour).

(4) From the resulting resin piece after being stained with the ruthenium tetroxide aqueous solution, a section is cut out using a microtome, and the section is collected on a copper grid with a support film. The thickness of the section is 50 nm.

(5) Then, TEM is adopted to acquire an image (TEM image) of a randomly selected area of 0.5 μm² or more on the surface of the section (cross section of the resin piece). The magnification for image acquisition is 200,000 times.

In the obtained TEM image, as shown in FIG. 1, a region of cured epoxy resin (hereinafter, also referred to as a "resin region") is observed as a continuous phase, and regions of respective particles of the polymer particles (C) (hereinafter, also referred to as "particle regions") are observed as dispersed phases dispersed in the resin region. Further in the TEM image, as shown in FIG. 1, the region of the polyorganosiloxane (A1) (hereinafter, also referred to as "polyorganosiloxane (A1) domain") among the particle regions is confirmed with a bright contrast, and the region of the vinyl polymer (A2) or vinyl polymer (B) (hereinafter, also referred to as "vinyl polymer domain") is confirmed with a dark contrast.

The image of "TEM image" in FIG. 1 is a TEM image obtained for the polymer particles (C-1) produced in the Examples section described later.

Figure 2:
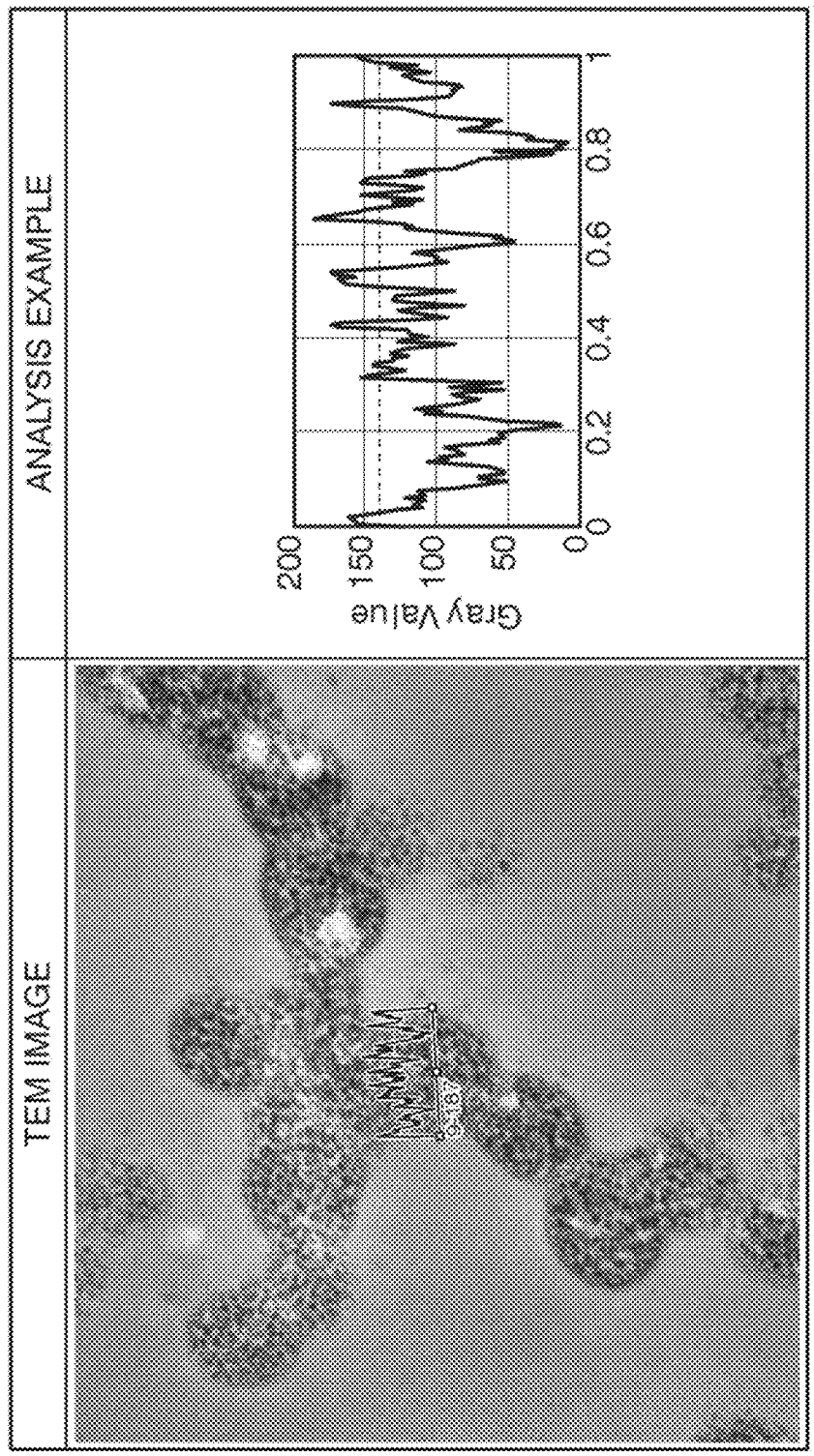
FIG. 2 is an image obtained as a result of brightness image analysis from a transmission electron microscope (TEM) image of polymer particles (C-1) produced in the Examples section.
Figure 3:
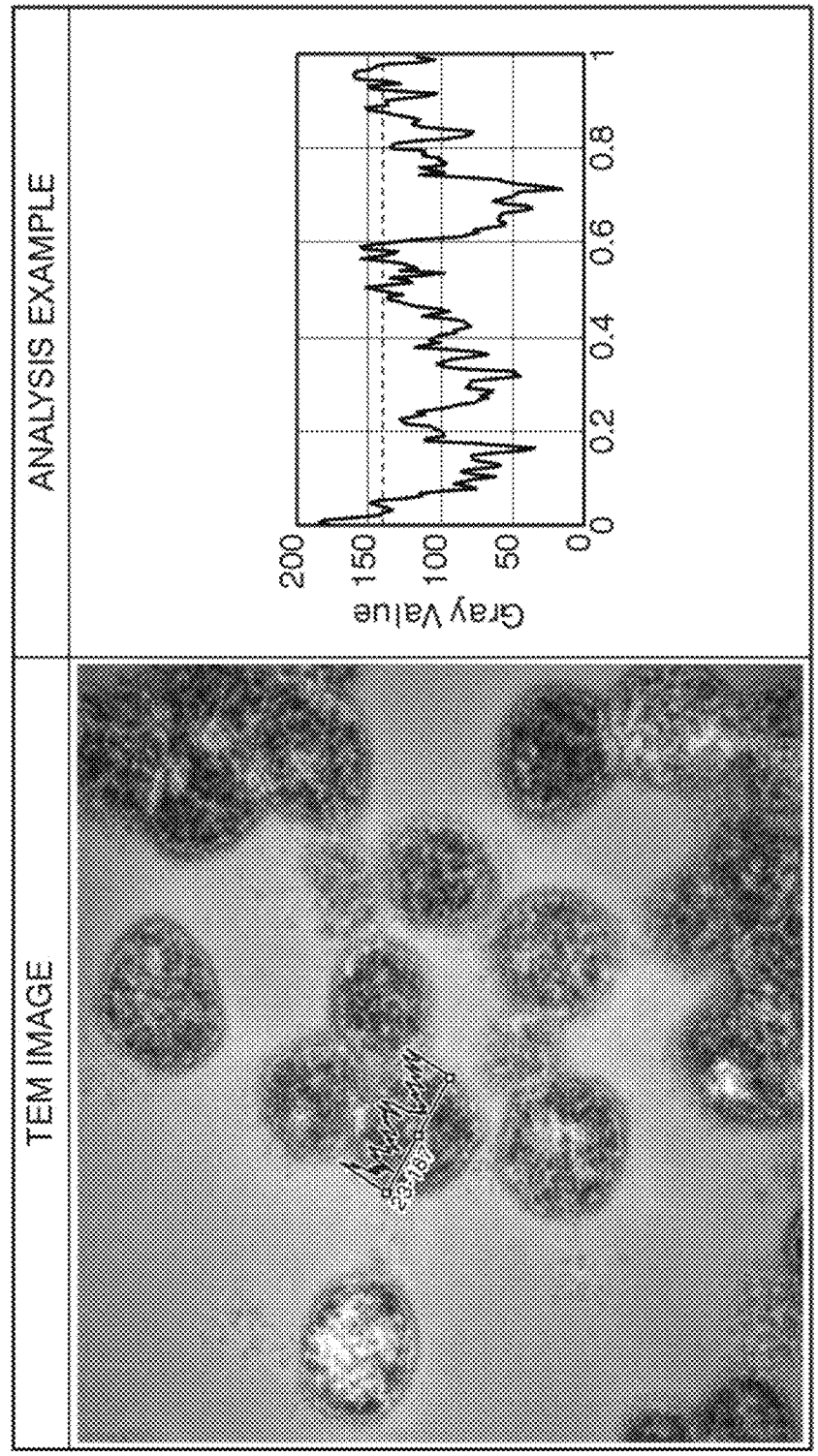
FIG. 3 is an image obtained as a result of brightness image analysis from a transmission electron microscope (TEM) image of polymer particles (C-3) produced in the Examples section.
Figure 4:
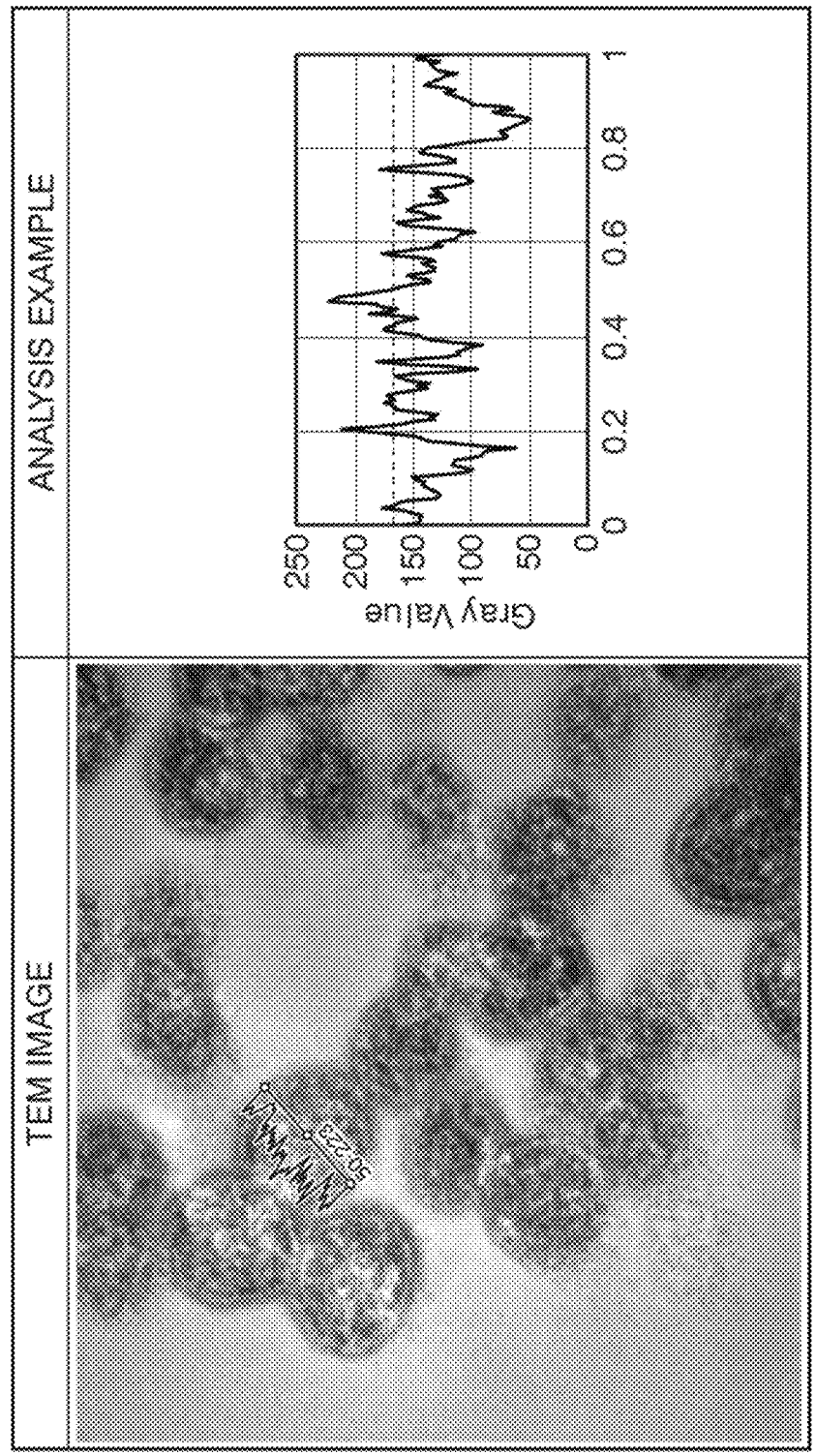
FIG. 4 is an image obtained as a result of brightness image analysis from a transmission electron microscope (TEM) image of polymer particles (C-4) produced in the Examples section.
Figure 5:
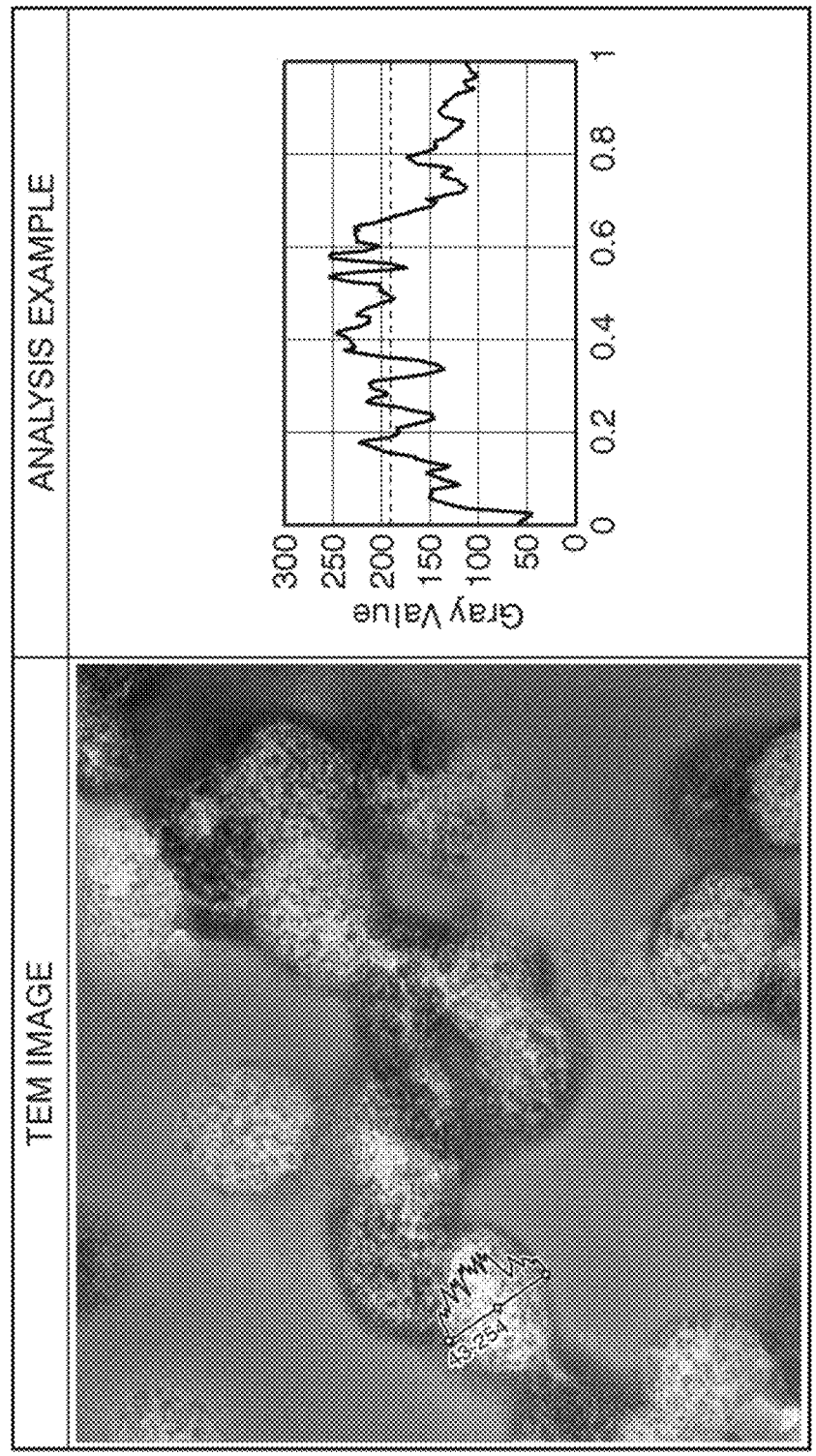
FIG. 5 is an image obtained as a result of brightness image analysis from a transmission electron microscope (TEM) image of polymer particles (C-6) produced in the Examples section.

From the obtained TEM image, as shown in FIG. 2, the particle regions, the polyorganosiloxane (A1) domains, and the vinyl polymer domains can be respectively extracted using an image analysis software (e.g., ImageJ).

Specifically, with respect to the TEM image, the contrast in the particle regions is extracted by line profile measurement. In the line profile measurement, the maximum Feret diameter and the minimum Feret diameter in one particle region are respectively regarded as the major diameter and the minor diameter, and a line is drawn which passes through a point (hereinafter, also referred to as "central point") where the axes respectively corresponding to the major diameter and the minor diameter intersect with each other, thereby cutting through the axis corresponding to the particle diameter. When the maximum Feret diameter and the minimum Feret diameter are of the same value, a plurality of lines are arbitrarily drawn which corresponds to the same Feret diameter, and the point of intersection of such lines is taken as the central point. Also, each line is drawn so as not to allow both ends of the line to touch adjacent particle regions. The length of the drawn line is taken as the diameter L of the particle region. Further, the line can be arbitrarily drawn at any locations that meet the above requirements, but it is preferable that a plurality of lines are drawn in one particle region, and a line showing the largest value in terms of a ratio of the maximum domain length M of the polyorganosiloxane (A1) determined by the method described in a later section relative to the diameter L of the particle region (hereinafter, also referred to as "M/L value") is adopted in the line profile of the particle region. In the case of drawing a plurality of lines, it is preferable that a first line is drawn arbitrarily, then a second line is drawn which forms an angle of 30° or more and 60° or less at the central point with the obtained first line (this "angle" indicates an angle not exceeding 90°), a third line is drawn which intersects the second line at the central point, thus obtaining three lines in total, and these three lines are compared to select the one showing the largest M/L value. However, if it is not possible to draw lines that meet the above requirements, the M/L values of less than three lines may be compared.

In this context, particle regions falling under the following categories cannot be identified as one particle, and hence are not selected as the particle region for measuring the line profile.

(i) A particle region cut off at the edge of the image.
(ii) A particle region with a size less than 80% of the average panicle diameter.
(iii) A particle region having adjacent particle regions in three or more directions with unclear boundaries therebetween.

All the remaining particle regions confirmed in the image are measured, and the line profile measurement is performed for a total of 50 or more particle regions. If 50 or more particle regions that do not fall under the categories (i) to (iii) above cannot be measured in a single TEM image, the particle regions in a plurality of TEM images obtained at different observation locations are subjected to the measurement and the results are totaled.

The average particle diameter in (ii) above is the average value of the equivalent circle diameters of the particle regions confirmed in the image.

Next, the distance from one end to the other end of the line drawn in the panicle area is plotted on the abscissa (X-axis), while plotting the contrast (Gray Value) on the line on the ordinate (Y-axis) as the Y value, and the maximum Y value and 75% of the maximum value (YA value) are obtained for a single panicle region. Points where the Y values are greater than the YA values are defined as HGV sites. In this context, the HGV sites can be distinguished from the polyorganosiloxane (A1) domain, because the Y value increases as the color brightness (lightness) increases, and the polyorganosiloxane (A1) domain is observed with bright contrast, while the vinyl polymer domain is observed with dark contrast.

Among the HGV sites, the one having the maximum continuous length in one particle region is defined as the maximum domain of the polyorganosiloxane (A1) in that particle region, and the continuous length of the HGV site is defined as the maximum domain length M. In this context, the continuous length of the HGV site means the distance between intersections with the line drawn by the YA value (indicated by a broken line in FIG. 2) at the peaks where the Gray Value exceeds the YA value.

With respect to the particle regions subjected to the line profile measurement, the Z value is calculated from the following formula (2) wherein the number of particle regions that satisfy the formula (1) is Z1, and the number of particle regions that do not satisfy the formula (1) is Z2:

$$Z\ \text{value} = \{Z1/(Z1+Z2)\} \times 100 \qquad (2)$$

In FIG. 2, "TEM image" is an image obtained by implementing line profile measurement with ImageJ on a TEM image obtained for the polymer (C-1) produced in the Examples described later.

In FIG. 2, "ANALYSIS EXAMPLE" indicates an example of analysis implemented by graphing the results of line profile measurement using ImageJ with respect to the polymer (C-1).

In the "ANALYSIS EXAMPLE", the line length (diameter L) is convened to 1 for easy comparison of particle regions with different particle diameters. The same applies to FIGS. 3 to 16, which are described in later sections.

In the sea-island structure described above, the average diameter of the vinyl polymer domains is preferably 50 nm or less, more preferably 30 nm or less, and particularly preferably 20 nm or less. When the average diameter of the vinyl polymer domains is 50 nm or less, the molded product is allowed to show further improved impact strength.

The lower limit of the average diameter of the vinyl polymer domains is not particularly limited, but may be, for example, 2 nm.

The sea-island structure described above preferably has a plurality of the vinyl polymer domain, included in the polyorganosiloxane (A1) domain, in terms of impact strength of the molded product. Further, the average diameter of the vinyl polymer domains is preferably 50 nm or less, and more preferably 30 nm or less. The lower limit of the average diameter of the vinyl polymer (A2) domains is not particularly limited, but may be, for example, 2 nm.

The vinyl polymer domains may include only the vinyl polymer (A2) domains, or may include both the vinyl polymer (A2) domains and the vinyl polymer (B) domains.

When the vinyl polymer domains include only the vinyl polymer (A2) domains, the average diameter of the vinyl polymer domains is the average diameter of the vinyl polymer (A2) domains.

The average diameter of the vinyl polymer domains can be determined by various methods, and, for example, can be determined front the TEM image described above.

Specifically, the determination of the average diameter can be implemented by following the procedures described below.

First, a TEM image is obtained by the procedure described above.

Then, from the obtained TEM image, using an image analysis software (for example, product name "Image-Pro (registered trademark) Plus", provided by Nippon Roper Co., Ltd.), the particle regions, polyorganosiloxane (A1) domain, and vinyl polymer domain are respectively extracted. Specifically, after smoothing the brightness unevenness of the background and removing noise in the TEM image, binarization is performed with the threshold value being the maximum brightness at which the surrounding resin regions are not selected, which allows the particle regions, the polyorganosiloxane (A1) domain and the vinyl polymer domain to be respectively extracted.

Out of the confirmed particle regions, 30% or more and 100 regions or more are selected in the decreasing order from the one with the largest area. In this process, the proportion of the selected particle regions is the proportion of the number of selected particle regions relative to the total number of particle regions having an equivalent circle diameter of 10 nm or more which are confirmed in the image.

For each of the selected particle regions as the measurement target, vinyl polymer domains having an equivalent circle diameter of 10 nm or more are selected out of the vinyl polymer domains present in the regions, and an average value of the equivalent circle diameters of these vinyl polymer domains is determined as the average diameter thereof. An average value of the average diameters determined for all of the particle regions as the measurement target can be taken as the average diameter of the vinyl polymer domains.

The proportion of the polyorganosiloxane (A1) with respect to 100% by mass of the polymer particles (C) is preferably 50% by mass or less, more preferably 40% by mass or less, even more preferably 30% by mass or less, even more preferably 20% by mass or less, particularly preferably 10% by mass or less, and most preferably 6% by mass or less. On the other hand, this proportion is preferably 1% by mass or more. When the proportion of the polyorganosiloxane (A1) is not less than the lower limit value described above, the impact strength of the molded product improves further. When the proportion is not more than the upper limit value described above, the appearance of the molded product improves further.

The proportion of the polymer (A) with respect to 100% by mass of the polymer particles (C) is preferably 60% by mass or more, and more preferably 65% by mass or more. On the other hand, this proportion is preferably 95% by mass or less, more preferably 90% by mass or less, and even more preferably 85% by mass or less. When the proportion of the polymer (A) is not less than the lower limit value described above, the impact strength of the molded product improves further. When this proportion is not more than the upper limit value described above, the dispersibility of the polymer particles (C) in the thermoplastic resin improves further, which in turn further improves the appearance of the resulting molded product.

The proportion of the polymer (A) with respect to 100% by mass of the polymer particles (C) may be, for example, 60 to 95% by mass, 60 to 90% by mass, 65 to 90% by mass, or 65 to 85% by mass.

The proportion of the vinyl polymer (B) with respect to 100% by mass of the polymer particles (C) is preferably 5% by mass or more, more preferably 10% by mass or more, and even more preferably 15% by mass or more. On the other hand, this proportion is preferably 40% by mass or less, and more preferably 35% by mass or less. When the proportion of the vinyl polymer (B) is not less than the lower limit value described above, the dispersibility of the polymer particles (C) in the thermoplastic resin improves further, which in turn further improves the appearance of the resulting molded product. When this proportion is not more than the upper limit value described above, the impact strength of the molded product improves further.

The proportion of the vinyl polymer (B) with respect to 100% by mass of the polymer particles (C) may be, for example, 5 to 40% by mass, 10 to 40% by mass, 10 to 35% by mass, or 10 to 35% by mass.

Typically, a part of the polymer particles (C) is insoluble in tetrahydrofuran (hereinafter, also referred to as "THF"). In other words, a part of the polymer particles (C) is soluble in THF.

Hereinafter, the fraction of the polymer particles (C) which is insoluble in THF is also referred to as "THF-insoluble fraction", and the fraction of the polymer particles (C) which is soluble in THF is also referred to as "THF-soluble fraction".

The proportion of the THF-insoluble fraction with respect to 100% by mass of the polymer particles (C) is preferably 80% by mass or more, more preferably 85% by mass or more, even more preferably 90% by mass or more, and particularly preferably 93% by mass or more. On the other hand, this proportion is preferably less than 100% by mass, and more preferably 99% by mass or less. When the proportion of the THF-insoluble fraction is not less than the lower limit value described above, the dispersibility of the polymer particles (C) in the thermoplastic resin improves further, which in turn further improves the appearance of the resulting molded product. When the proportion of the THF-insoluble fraction is less than 100% by mass, an excellent balance is achieved between impact strength and color development. When this proportion is 99% by mass or less, a further improved melt flowability is achieved when the polymer particles (C) are added to a thermoplastic resin.

The proportion of the THF-insoluble fraction with respect to 100% by mass of the polymer particles (C) may be, for example, 80% by mass or more and less than 100% by mass, 85% by mass or more and less than 100% by mass, 90% by mass or more and 99% by mass or less, or 93% by mass or more and 99% by mass or less.

The proportion of the THF-insoluble fraction is determined by implementing the following operations (1-1) to (1-5).

(1-1) 0.5 g of a sample (polymer particles (C)) is added to 50 mL (44.5 g) of THF to prepare a mixed solution. The obtained mixed solution is allowed to stand at 25° C. for 8 hours, followed by stirring with a stirrer for 30 minutes, to thereby dissolve the THF-soluble fraction.

(1-2) The mixed solution is placed in a centrifugal tube with its mass having been measured in advance, and centrifugally separated into the THF-insoluble fraction, and a liquid containing the THF-soluble fraction by a centrifuge (16000 rpm, 4 hours).

(1-3) After removing the supernatant, THF is newly added and stirred, and the resulting is centrifuged again in the same manner as in (1-2) above to wash the THF-insoluble fraction.

(1-4) After repeating the above (1-3) twice, the supernatant is removed. The centrifugal tube with the remaining THF-insoluble fraction is immersed in a warm water bath (80° C., 8 hours) to volatilize the THF, and the resulting is vacuum-dried at 65° C. for 6 hours obtain a dry sample (THF-insoluble fraction adhering to the centrifugal tube).

(1-5) The mass of the obtained dry sample (THF-insoluble fraction+centrifugal tube) is measured, and the proportion, $w_{ais}$ (%), of the THF-insoluble fraction is calculated by the following formula:

$$w_{ais}=(w_{ct}-w_{as})/wt\times100,$$

wherein:
wt is the mass of the polymer particles (C) subjected to the measurement,
$w_{as}$ is the mass of the centrifugal tube, and
$w_{ct}$ is the mass of the THF-insoluble fraction (including the mass of the centrifugal tube).

For having the proportion of the THF-insoluble fraction in the polymer particles (C) within the above range, it is preferable that the vinyl polymer (A2) is sufficiently cross-linked, and the polyorganosiloxane (A1) and the vinyl polymer (A2) are covalently bonded. Further, it is preferable that the vinyl polymer (B) is covalently bonded to the polymer (A).

The weight average molecular weight of the THF-soluble fraction of the polymer particles (C) is preferably 20,000 or more, more preferably 50,000 or more. On the other hand, this weight average molecular weight is preferably 500,000 or less, more preferably 350,000, even more preferably 200,000 or less, and particularly preferably 150,000 or less.

When the weight average molecular weight of the THF-soluble fraction is 20,000 or more and 500,000 or less, the polymer particles (C) show excellent dispersibility in the thermoplastic resin, which results in excellent impact strength and appearance of the molded product to be obtained. Especially when the weight average molecular weight of the THF-soluble fraction is 50,000 or more and 150,000 or less, the polymer particles (C) show particularly excellent dispersibility in the thermoplastic resin, which allows a molded product with excellent impact strength and appearance to be obtained under a wide range of molding conditions including a molding condition with a low kneading intensity.

The weight average molecular weight of the THF-soluble fraction of the polymer particles (C) may be 20,000 or more and 500,000 or less, 20,000 or more and 350,000 or less, 50,000 or more and 200,000 or less, or 50,000 or more and 150,000 or less.

The weight average molecular weight of the THF-soluble fraction is measured by implementing the following operations (2-1) to (2-3).

(2-1) THF is distilled off under reduced pressure using a rotary evaporator from the liquid containing the THF-soluble fraction collected in the measurement of proportion of the THF-insoluble fraction described above, to obtain the THF-soluble fraction.

(2-2) The THF-soluble fraction obtained in (2-1) above is dissolved again in THF so as to give a sample concentration of 0.1 to 0.3% by mass, thereby obtaining a THF solution of the THF-soluble fraction.

(2-3) The THF solution of the THF-soluble fraction obtained in (2-2) above is subjected to gel permeation chromatography (GPC) measurement, and the weight average molecular weight (Mw) is determined from the standard polystyrene calibration curve.

The GPC measurement conditions are as described in the Examples section described later.

The weight average molecular weight of the THF-soluble fraction can be controlled by the amount of initiator, the amount of reducing agent, the polymerization temperature and use of chain transfer agent during polymerization of the vinyl monomer component (b) for forming the vinyl polymer (B). For example, by enhancing the generation of radicals by increasing the amounts of initiator and reducing agent, raising the polymerization temperature, etc., or by promoting the chain transfer reaction by addition of a chain transfer agent and increasing the addition amount thereof, the weight average molecular weight of the THF soluble fraction decreases.

The number average particle diameter of the polymer particles (C) is preferably 10 nm or more, more preferably 30 nm or more, even more preferably 50 nm or more, and particularly preferably 70 nm or more. On the other hand, the number average particle diameter is preferably 800 nm or less, more preferably 500 nm or less, even more preferably 200 nm or less, even more preferably 150 nm or less, particularly preferably 130 nm or less, and most preferably 100 nm or less. When the number average particle diameter is not less than the lower limit value described above, the impact strength of the molded product improves further. When the number average particle diameter is not more than the upper limit value described above, the appearance of the molded product improves further.

The number average particle diameter of the polymer particles (C) may be, for example, 10 to 800 nm, 30 to 500 nm, 50 to 200 nm, 50 to 150 nm, 70 to 130 nm, or 70 and 100 nm.

The method for measuring the number average particle diameter of the polymer particles (C) is not particularly limited, but, for example, the following method can be employed.

Using a sample obtained by diluting the latex of the polymer particles (C) to a concentration of about 3% with deionized water, the number-based particle size distribution is determined with a capillary particle size distribution analyzer (CHDF2000 type particle size distribution analyzer manufactured by MATEC inc., USA), and the median diameter is defined as the number average particle diameter.

The particle size distribution can be measured under the following standard conditions recommended by MATEC Inc.

Cartridge: Customized capillary type cartridge for particle separation (trade name: C-202)
Carrier liquid: Customized carrier liquid (trade name: 2XGR500) pH of carrier liquid: Neutral
Carrier liquid flow rate: 1.4 mL/min
Carrier liquid pressure: about 4,000 psi (2,600 kPa)
Measurement temperature: 35° C.
Volume of sample used: 0.1 mL Reference materials used for particle size analysis are monodisperse polystyrene products with known particle sizes, manufactured by DUKE, USA, which are 12 types of particles with particle sizes ranging from 40 to 800 nm.

The number average particle diameter of the polymer particles (C) can be controlled, for example, by adjusting the amount of the emulsifier used when the polymer particles (C) are produced by emulsion polymerization.

(Polyorganosiloxane (A1))

The polyorganosiloxane (A1) is a polymer containing organosiloxane units. The polyorganosiloxane (A1) can be obtained by polymerizing an organosiloxane mixture containing an organosiloxane. The organosiloxane mixture may further contain optional components used as necessary.

Examples of optional components used as necessary include at least one selected from the group consisting of a siloxane cross-linking agent, a siloxane crossing agent, and a siloxane oligomer with terminal blocking groups.

Examples of the organosiloxane include linear organosiloxanes, alkoxysilane compounds, cyclic organosiloxanes, and the like, and any of them can be used. Among these, alkoxysilane compounds and cyclic organosiloxanes are preferable, and cyclic organosiloxanes are particularly preferable because high polymerization stability and high polymerization rate can be achieved.

As the alkoxysilane compound, a bifunctional alkoxysilane compound is preferable, and examples thereof include dimethyldimethoxysilane, dimethyldiethoxysilane, diethoxydiethylsilane, dipropoxydimethylsilane, diphenyldimethoxysilane, diphenyldiethoxysilane, methylphenyldimethoxysilane, and methylphenyldiethoxysilane. One of these may be used alone, or two or more of these may be used in combination.

As the cyclic organosiloxane, those having 3- to 7-membered rings are preferable, and examples thereof include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. One of these may be used alone, or two or more of these may be used in combination. Among these, octamethylcyclotetrasiloxane is preferable in terms of easy control of the particle size distribution.

The organosiloxane is preferably at least one selected from the group consisting of cyclic dimethylsiloxane and bifunctional dialkylsilane compounds in terms of obtaining the polymer particles (C) capable of increasing the impact strength of the molded product.

The "cyclic dimethylsiloxane" is a cyclic siloxane having two methyl groups on a silicon atom, and examples thereof include hexamethylcyclotrisiloxane, octamethylcyclotetrasiloxane, decamethylcyclopentasiloxane, and dodecamethylcyclohexasiloxane. One of these may be used alone, or two or more of these may be used in combination.

The bifunctional dialkylsilane compound is a silane compound having two alkoxy groups and two alkyl groups on a silicon atom, and examples thereof include dimethyldimethoxysilane, dimethyldiethoxysilane, diethoxydiethylsilane, and dipropoxydimethylsilane. One of these may be used alone, or two or more of these may be used in combination.

As the siloxane cross-linking agent, one having a siloxy group is preferable. Examples of the siloxane cross-linking agent include tri- or tetra-functional silane cross-linking agents, such as trimethoxymethylsilane, triethoxyphenylsilane, tetramethoxysilane, tetraethoxysilane, tetra-n-propoxysilane, and tetrabutoxysilane. Among them, a tetrafunctional cross-linking agent is preferable, and tetraethoxysilane is more preferable.

The proportion of the siloxane cross-linking agent is preferably 10% by mass or less, more preferably 5% by mass or less, and may be 0% by mass, with respect to 100% by mass of the organosiloxane mixture. When the proportion of the siloxane cross-linking agent is 10% by mass or less, it is possible to obtain polymer particles (C) capable of further improving the impact strength of the molded product.

The siloxane crossing agent has a siloxy group (—Si—O—) and a functional group capable of polymerizing with a vinyl monomer. Examples of the siloxane crossing agent include siloxanes represented by the following formula (I):

wherein:
R$^1$ represents a methyl group, an ethyl group, a propyl group, or a phenyl group:
R$^2$ represents an organic group such as a hydrocarbon group, and is, for example, preferably a methyl group, an ethyl group, a propyl group, or a phenyl group;
n represents 0, 1 or 2; and
R represents a functional group represented by any one of the following formulae (I-1) to (I-4):

with the proviso that R$^3$ and R$^4$ each independently represent a hydrogen atom or a methyl group, and p represents an integer of 1 to 6.

Examples of the functional group represented by the formula (I-1) include a methacryloyloxyalkyl group. Examples of siloxanes having this group include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyl diethoxymethylsilane, δ-methacryloyloxybutyldiethoxymethylsilane and the like.

Examples of the functional group represented by the formula (I-2) include a vinylphenyl group. Examples of siloxanes having this group include vinylphenylethyldimethoxysilane.

Examples of siloxanes having a functional group represented by the formula (I-3) include vinyltrimethoxysilane and vinyltriethoxysilane.

Examples of the functional group represented by the formula (I-4) includes a mercaptoalkyl group. Examples of siloxanes having this group include γ-mercaptopropyldimethylsilane, γ-mercaptopropylmethoxydimethylsilane, γ-mercaptopropyldiethoxymethylsilane, γ-mercaptopropylethoxydimethylsilane, and γ-mercaptopropyltrimethoxysilane.

With respect to the siloxane crossing agent, a single type thereof may be used alone, or two or more types thereof may be used in combination.

The siloxane crossing agent is preferably 3-methacryloxypropylmethyldimethoxysilane for easily forming a sea-island structure when the polyorganosiloxane (A1) and the vinyl polymer (A2) are combined.

The proportion of the siloxane crossing agent is preferably 0.05% by mass or more, more preferably 0.1% by mass or more, and even more preferably 0.5% by mass or more, with respect to 100% by mass of the organosiloxane mixture. On the other hand, this proportion is preferably 20% by mass or less, more preferably 10% by mass or less, and even more preferably 5% by mass or less. When the proportion of the siloxane graft crossing agent is within the range set by the upper limit and lower limit values described above, sufficient covalent bonds are allowed to be formed between the polyorganosiloxane (A1) and the vinyl polymer (A2), which enables the production of the polymer particles (C) with excellent impact strength.

The proportion of the siloxane crossing agent to 100% by mass of the organosiloxane mixture may be, for example, 0.05 to 20% by mass, 0.1 to 10% by mass, or 0.5 to 5% by mass.

The number average particle diameter of the polyorganosiloxane (A1) is preferably 1 nm or more, more preferably 10 nm or more, and even more preferably 30 nm or more. On the other hand, the number average particle diameter is preferably 500 nm or less, more preferably 300 nm or less, even more preferably 150 nm or less, even more preferably 100 nm or less, particularly preferably 80 nm or less, and most preferably 60 nm or less. When the number average particle diameter of the polyorganosiloxane (A1) is within the range set by the upper limit and lower limit values described above, it is easy to adjust the number average particle diameter of the polymer particles (C) to fall within the range set by the preferable upper limit and lower limit values described above.

The number average particle diameter of the polyorganosiloxane (A1) may be, for example, 1 to 500 nm, 1 to 300 nm, 10 to 150 nm, 10 to 100 nm, 30 to 80 nm, or 30 and 60 nm.

With respect to the polyorganosiloxane (A1), the ratio, mass average particle diameter (nm)/number average particle diameter (nm) (hereinafter, also referred to as "Dw/Dn"), is preferably 1.0 or more. On the other hand, this ratio is preferably 1.7 or less. When Dw/Dn is within the range set by the upper limit and lower limit values described above, the resin composition containing the polymer particles (C) and the thermoplastic resin shows further improved coloring ability, which results in further improved color appearance of a molded product using the resin composition.

The method for measuring the number average particle diameter (Dn) of the polyorganosiloxane (A1) is the same as the above-described method for measuring the number average particle diameter of the polyorganosiloxane (A1).

The method for measuring the mass average particle diameter (Dw) of the polyorganosiloxane (A1) is the same as the above-described method for measuring the number average particle diameter of the polyorganosiloxane (A1), except that the mass-based particle size distribution is determined instead of the number-based particle size distribution. That is, using a sample obtained by diluting the latex of the polyorganosiloxane (A1) to a concentration of about 3% with deionized water, the mass-based particle size distribution is determined with a capillary particle size distribution analyzer (CHDF2000 type particle size distribution analyzer manufactured by MATEC inc., USA), and the median diameter is defined as the mass average particle diameter.

<Method for Producing Polyorganosiloxane (A1)>

The method for producing the polyorganosiloxane (A1) is not particularly limited, and for example, the following production method can be adopted.

A production method in which, first, an organosiloxane mixture containing an organosiloxane, and, optionally, a siloxane cross-linking agent, a siloxane crossing agent, and a siloxane oligomer having a terminal blocking group is emulsified with an emulsifier and water to prepare an emulsion, and the organosiloxane mixture is polymerized in the emulsion in the presence of an acid catalyst at high temperature, followed by neutralizing the acid catalyst with an alkaline substance, to thereby obtain a latex of polyorganosiloxane.

The following explanation on the production method concerns the case where the "organosiloxane mixture" is used as the raw material for polymerization, but the same production process is likewise applicable to the case where the "organosiloxane" is used.

Examples of the method for preparing the emulsion in this production method include a method using a homomixer that effects micronization by shearing force due to high-speed rotation; and a method that implement mixing by high-speed agitation using a homogenizer or the like that effects micronization by the ejection force generated by a high-pressure generator. Among these, the method using a homogenizer is preferable because the distribution of the particle size of the polyorganosiloxane latex can be narrowed.

Examples of the method for mixing the acid catalyst during polymerization include: (1) a method in which the acid catalyst is added together with the organosiloxane mixture, the emulsifier, and water and mixed together; (2) a method in which an aqueous solution of the acid catalyst is added to an emulsion of the organosiloxane mixture all at once, and (3) a method in which an emulsion of the organosiloxane mixture is dropwise added into a hot aqueous solution of the acid catalyst at a constant rate, and the resulting is mixed. Among them, preferred method is the one in which an emulsion of the organosiloxane mixture is dropwise added into a hot aqueous solution of the acid catalyst at a constant rate, and the resulting is mixed, because the particle diameter of the polyorganosiloxane can be easily controlled.

The polymerization temperature is preferably 50° C. or higher, and more preferably 70° C. or higher. The upper limit of the polymerization temperature is, for example, 100° C.

The polymerization time is generally 2 hours or more, preferably 5 hours or more, when the polymerization is implemented by dropwise adding the emulsion of the organosiloxane mixture to a hot acid catalyst aqueous solution at a constant rate.

Further, since the cross-linking reaction between silanols proceeds at a temperature of 30° C. or lower, in order to increase the cross-linking density of the polyorganosiloxane, a latex resulting from polymerization at a high temperature of 50° C. or higher is held at 30° C. or lower for about 5 to 100 hours.

The polymerization reaction of the organosiloxane mixture can be terminated by neutralizing the reaction system containing the latex to pH 6 or more and pH 8 or less with an alkaline substance, such as sodium hydroxide, potassium hydroxide or aqueous ammonia solution.

The emulsifier used in the above production method is not particularly limited as long as it can emulsify the organosiloxane mixture, but an anionic emulsifier or a nonionic emulsifier is preferred.

Examples of the anionic emulsifier include sodium alkylbenzenesulfonate, sodium alkylphenylether disulfonate, sodium alkylsulfate, sodium polyoxyethylene alkylsulfate, and sodium polyoxyethylene nonylphenyl ether sulfate.

Examples of the nonionic emulsifier include polyoxyethylene alkyl ether, polyoxyethylene alkylene alkyl ether, polyoxyethylene distyrenated phenyl ether, polyoxyethylene tribenzylphenyl ether, and polyoxyethylene polyoxypropylene glycol.

One of these emulsifiers may be used alone, or two or more of these may be used in combination.

The amount of the emulsifier used is preferably 0.05 pans by mass or more, more preferably 0.1 part by mass or more, with respect to 100 parts by mass of the organosiloxane mixture. On the other hand, this amount is preferably 20 parts by mass or less, and more preferably 10 parts by mass or less. The particle size of the polyorganosiloxane latex can be adjusted to a desired value by adjusting the amount of emulsifier used. When the amount of the emulsifier used is not less than the lower limit value described above, the emulsification stability of the emulsion of the organosiloxane mixture can be enhanced. When the amount of the emulsifier used is not more than the upper limit value described above, the molded product improves further in terms of heat discoloration resistance and surface appearance.

Examples of the acid catalysts used in the polymerization of the organosiloxane mixture include sulfonic acids, such as aliphatic sulfonic acids, aliphatic-substituted benzenesulfonic acids and aliphatic-substituted naphthalenesulfonic acids, and mineral acids, such as sulfuric acid, hydrochloric acid and nitric acid. One of these acid catalysts may be used alone, or two or more of these may be used in combination. Among these, the use of mineral acids, such as sulfuric acid, hydrochloric acid, and nitric acid, can narrow the particle size distribution of the polyorganosiloxane latex, and also can suppress the occurrence of defects (decrease in thermal decomposition resistance of the molded product, defective appearance, etc.) caused by the emulsifier component in the polyorganosiloxane latex.

The amount of the acid catalyst used is preferably 0.005 parts by mass or more and 40 parts by mass or less, with respect to 100 parts by mass of the organosiloxane. When the amount of the acid catalyst used is 0.005 parts by mass or more, the organosiloxane mixture can be polymerized within a short period of time. When the amount of the acid catalyst used is 40 parts by mass or less, the molded product improves further in terms of heat discoloration resistance and surface appearance.

Further, since the amount of the acid catalyst used is a factor that determines the particle diameter of the polyorganosiloxane (A1), in order to obtain polyorganosiloxane (A1) having a particle diameter described in a later section, the amount of the acid catalyst used is more preferably 1 part by mass or more and 30 parts by mass or less, with respect to 100 parts by mass of the organosiloxane.

If necessary, an emulsifier may be added to the polyorganosiloxane latex obtained by the above method for the purpose of improving mechanical stability. As the emulsifier, the same anionic emulsifiers and nonionic emulsifiers as listed above are preferable.

(Vinyl Polymer (A2))

The vinyl polymer (A2) is a polymer obtained by polymerizing the vinyl monomer component (a2), and composed of units derived front vinyl monomers.

The vinyl monomer component (a2) in the vinyl polymer (A2) includes at least one type of vinyl monomer.

The vinyl monomer component (a2) may contain a monofunctional (meth)acrylate monomer (hereinafter, also referred to as "monomer (a2-1)") in terms of the impact strength of the molded product.

Besides the monomer (a2-1), the vinyl monomer component (a2) may include at least one monomer selected from the group consisting of a monofunctional monomer different from the monomer (a2-1), which is copolymerizable with the monomer (a2-1) (hereinafter, also referred to as "monomer (a2-2)"), and a polyfunctional monomer copolymerizable with the monomer (a2-1) (hereinafter, referred to as "monomer (a2-3)").

The vinyl monomer component (a2) preferably includes the monomer (a2-1) and the monomer (a2-3) in terms of the impact strength of the molded product and for having the proportion of the IMF-insoluble fraction in the polymer particles (C) fall within the above range.

Examples of the monomer (a2-1) include alkyl acrylates, such as methyl acrylate, ethyl acrylate, n-propyl acrylate, n-butyl acrylate, 2-ethylhexyl acrylate, and n-octyl acrylate; alkyl methacrylate s, such as methyl methacrylate, ethyl methacrylate, n-propyl methacrylate, n-butyl methacrylate, i-butyl methacrylate, t-butyl methacrylate, hexyl methacrylate, 2-ethylhexyl methacrylate, lauryl methacrylate, tridecyl methacrylate, and stearyl methacrylate.

For further improving the impact strength of the molded product, the monomer (a2-1) preferably includes, inter alia, at least one monomer selected from the group consisting of ethyl acrylate, n-butyl acrylate, 2-ethylhexyl acrylate and n-octyl acrylate, and more preferably includes n-butyl acrylate.

One of these monomers (a2-1) may be used alone, or two or more thereof may be used in combination.

Examples of the monomer (a2-2) include various vinyl monomers. e.g., aromatic vinyl monomers, such as styrene and α-methylstyrene; vinyl cyanide monomers, such as acrylonitrile and methacrylonitrile; and (meth)acrylic group-modified silicones. One of these monomers (a2.2) may be used alone, or two or more thereof may be used in combination.

Examples of the monomer (a2-3) include ethylene glycol dimethacrylate, propylene glycol dimethacrylate, 1,3-butylene glycol dimethacrylate, 1,4-butylene glycol dimethacrylate, ethylene glycol diacrylate, propylene glycol diacrylate, 1,3-butylene glycol diacrylate, 1,4-butylene glycol diacrylate, 1,6-hexanediol diacrylate, divinylbenzene, polyfunctional (meth)acrylic group-modified silicone, allyl methacrylate, triallyl cyanurate, triallyl isocyanurate, etc., and triallyl trimellitate.

Among them, the monomer (a2-3) is preferably at least one selected from the group consisting of allyl methacrylate, triallyl cyanurate and triallyl isocyanurate, and allyl methacrylate is more preferred, since the molded product shows further improved impact strength.

One of these monomers (a2-3) may be used alone, or two or more thereof may be used in combination.

The proportion of the monomer (a2-1) with respect to 100% by mass of the vinyl monomer component (a2) is preferably 60% by mass or more, more preferably 70% by mass or more, even more preferably 80% by mass or more, and particularly preferably 90% by mass or more, in terms of the impact strength of the molded product.

The proportion of the monomer (a2-1) with respect to 100% by mass of the vinyl monomer component. (a2) may be 100% by mass, but is preferably 99.9% by mass or less.

The proportion of the monomer (a2-2) with respect to 100% by mass of the vinyl monomer component (a2) is preferably 40% by mass or less, more preferably 30% by mass or less, even more; preferably 20% by mass or less, particularly preferably 10% by mass or less, and may be 0% by mass, in terms of the impact strength of the molded product.

The proportion of the monomer (a2-3) with respect to 100% by mass of the vinyl monomer component (a2) is preferably 0.1% by mass or more and 4 S by mass or less.

For further improving the impact strength of the molded product, the proportion of the monomer (a2-3) with tweet to 100% by mass of the vinyl monomer component (a2) is preferably 0.1% by mass or more and 2% by mass or less, and more preferably 0.1% by mass or more and 1% by mass or less.

For further improving the color appearance of the molded product, the proportion of the monomer (a2-3) with respect to 100% by mass of the vinyl monomer component tat) is preferably 0.5% by mass or more and 4% by mass or less, and more preferably 1% by mass or more and 4% by mass or less.

For achieving sufficient melt flowability during molding and good balance between the color appearance and impact strength of the molded product, the proportion of the monomer (a2-3) with respect to 100% by mass of the vinyl monomer component (a2) is more preferably 0.3% by mass or more and 3% by mass or less, and even more preferably 0.5% by mass or more and 2.5% by mass or less.

(Polymer (A))

The polymer (A) contains a polyorganosiloxane (A1) and a vinyl polymer (A2).

In the polymer (A), the mass ratio, polyorganosiloxane (A1)/vinyl polymer (A2) (hereinafter, also referred to as "A1/A2"), is preferably 1/99 to 60/40, more preferably 1/99 to 40/60, and even more preferably 2/98 to 30/70, in terms of the impact strength of the molded product.

<Method for Producing Polymer (A)>

The method for producing the polymer (A) is not particularly limited, but is preferably a method that polymerizes the vinyl monomer component (a2) for the vinyl polymer (A2) in the presence of a latex containing the polyorganosiloxane (A1), since the resulting molded product shows further improved impact strength.

The method for polymerizing the vinyl monomer component (a2) in the presence of a latex containing the polyorganosiloxane (A1) is not particularly limited, and examples thereof include (i) a method that adds dropwise the vinyl monomer component (a2) into a latex containing the polyorganosiloxane (A1) to implement polymerization; (ii) a method that adds a part of the vinyl monomer component (a2) into a latex containing the polyorganosiloxane (A1) under conditions that do not allow the polymerization to be initiated, so as to impregnate the particles of the polyorganosiloxane (A1) with the vinyl monomer component (a2), and then initiates the polymerization, followed by dropwise or all-at-once addition of the remainder of the vinyl monomer component (a2) for polymerization; and (iii) a method that adds the entire amount of the vinyl monomer component (a2) into a latex containing the polyorganosiloxane (A1) under conditions that do not allow the polymerization to be initiated, so as to impregnate the particles of the polyorganosiloxane (A1) with the vinyl monomer component (a2), and then, carries out polymerization.

As the method for producing the polymer (A), a preferable method among those described above is the one which adds the entire amount of the vinyl monomer component (a2) into a latex containing the polyorganosiloxane (A1) under conditions that do not allow the polymerization to be initiated, so as to impregnate the particles of the polyorganosiloxane (A1) with the vinyl monomer component (a2), and then, carries out polymerization, because the impact strength of the molded product improves further.

As the method for producing the polymer (A), a production method including the following steps i to iv is particularly preferable. With this production method, it is easier to obtain the polymer (A) capable of providing polymer particles (C) which has: a sea-island structure with the polyorganosiloxane (A1) as a sea component and the vinyl polymer (A2) as an island component; a plurality of vinyl polymer (A2) domains in the polyorganosiloxane (A1) domain; and a Z value of less than 60%.

Step i:

A latex of polyorganosiloxane (A1) is produced under predetermined conditions.

The latex of polyorganosiloxane (A1) can be produced by the method described above. In this context, the polyorganosiloxane (A1) is preferably composed of an organosiloxane and a siloxane crossing agent.

Step ii:

To the latex of the polyorganosiloxane (A1) obtained in step i, an entire amount of the vinyl monomer component (at) and a radical polymerization initiator are added under conditions that do not allow the polymerization of the vinyl monomer component (a2) to be initiated, thereby impregnating the particles of polyorganosiloxane (A1) with the vinyl monomer component (a2).

In this process, the addition of entire amount of the vinyl monomer component (a2) results in further improvement of the impact strength of the molded product.

When the vinyl monomer component (a2) includes a multiple types of vinyl monomers, for example, the monomer (a2-1), and at least one selected from the group consisting of the monomer (a2-2) and the monomer (a2-3), the method for adding these monomers is not particularly limited. For example, the monomer (a2-1) and the monomer (a2-2) and/or the monomer (a2-3) may be introduced at once, or the monomer (a2-1) and the monomer (a2-2) and/or the monomer (a2-3) may be added separately.

When the vinyl monomer component (a2) includes the monomer (a2-3), from the viewpoint of obtaining an appropriate crosslinked structure, it is preferable that the monomer (a2-3) is mixed with the monomer (a2-1) and/or the monomer (a2-2) and added.

Examples of the radical polymerization initiator include, but are not limited to, azo compounds, peroxides, and dihalogens. One of these may be used alone, or two or more of these may be used in combination.

Examples of the azo compound include:

oil-soluble azo initiators, such as 2,2'-azobisisobutyronitrile, dimethyl 2,2'-azobis(2-methylpropionate), 2,2'-azobis(2,4-dimethylvaleronitrile), and 2,2'-azobis(2-butyronitrile); and water-soluble azo initiators, such as 4,4'-azobis (4-cyanovaleric acid), 2,2'-azobis[N-(2-carboxymethyl)-2-methylpropionamidine]hydrate, 2,2'-azobis-(N,N'-dimethyleneisobutyramidine) dihydrochloride, and 2,2'-azobis[2-(2-imidazolin-2-yl)propane]dihydrochloride. One of these may be used alone, or two or more of these may be used in combination.

When an azo compound is used as the radical polymerization initiator, the amount of the azo compound used is preferably 0.01% by mass or more, with respect to the total 100% by mass of the monomers to be polymerized. On the other hand, this amount is preferably 3% by mass or less, more preferably 1% by mass or less, and even more preferably 0.5% by mass or less. The azo compound when used within the range set by the upper limit and lower limit values described above can prevent excessive increase in the polymerization rate, and facilitates the formation of the sea-island structure.

Examples of the peroxide include:
inorganic peroxides, such as hydrogen peroxide, potassium persulfate and ammonium persulfate; and organic peroxides, such as diisopropylbenzene hydroperoxide, p-menthane hydroperoxide, cumene hydroperoxide, t-butyl hydroperoxide, succinic acid peroxide, t-butyl peroxyneodecanoate, t-butyl peroxyneoheptanoate, t-butyl peroxypivalate, 1,1,3,3-tetramethylbutyl peroxy-2-ethylhexanoate, and t-butylperoxy-2-ethylhexanoate. One of these may be used alone, or two or more of these may be used in combination. It is especially preferable to use those which have a 10-hour half-life temperature between 25° C. and 105° C., in terms of easy handling during emulsion polymerization.

When a peroxide is used as the radical polymerization initiator, the amount of the peroxide used is preferably 0.01% by mass or more with respect to total 100% by mass of the monomers to be polymerized. On the other hand, this amount is preferably 1% by mass or less, more preferably 0.5% by mass or less, even more preferably 0.2% by mass or less. The peroxide when used within the range set by the upper limit and lower limit values described above can prevent excessive increase in the polymerization rate, and facilitates the formation of the sea-island structure.

As the radical polymerization initiator, a peroxide is preferable because the polymerization rate can be easily controlled and the impact strength of the molded product improves further.

When a peroxide is used as the radical polymerization initiator, a reducing agent may be used in combination for the purpose of promoting decomposition of the peroxide.

Examples of the reducing agent include sulfur compounds, such as sulfite, hydrogen sulfite, alkali metal bisulfite, acetone bisulfite, alkali metal disulfite, metabisulfite and salts thereof; organic sulfur compounds, such as thiosulfate, sulfinic acid, hydroxylalkylsulfinic acid, hydroxylmethylsulfinic acid, 2-hydroxy-2-sulfinacetic acid, formazinesulfinic acid, propylsulfinic acid, isopropylsulfinic acid, and phenylsulfinic acid; reducing nitrogen compounds, such as formaldehyde sulfoxylate and salts thereof, hydroxylamine, hydroxylamine hydrosulfate, hydroxylammonium salts, polyamines, and dimethylaniline; reducing sugars, such as sorbose, fructose, glucose, lactase, and dextrose; and enediols, such as ascorbic acid and isoascorbic acid. Examples of the "salts" in this context include sodium ions, potassium ions, ammonium ions, and zinc ions.

Further examples of compounds useful as a reducing agent include sulfates, nitrates, acetates, carbonates and chlorides of transition metals belonging to Groups 3 to 11 of the periodic table. Examples of the transition metal include Ce, etc., of Group 3, Ti, etc., of Group 4, V, etc., of Group 5, Cr, Mo, etc., of Group 6, Mn, etc., of Group 7, Fe, etc., of Group 8, Co, etc., of Group 9, Ni, etc., of Group 10, and Cu, Ag, etc., of Group 11.

The reducing agent is preferably at least one selected from the group consisting of sodium formaldehyde sulfoxylate, L(+)-tartaric acid, sodium disulfite, sodium isoascorbate, L-ascorbic acid and ferrous sulfate, in terms of high commercial availability and further improved heat discoloration resistance and surface appearance of the molded product.

The amount of the reducing agent used is preferably 2.0 molar equivalents or less, more preferably 1.0 molar equivalent or less, and even more preferably 0.6 molar equivalents or less, relative to the peroxide used in the polymerization of the vinyl monomer component (a2). This amount may be 0 molar equivalent. The reducing agent when used in an amount not exceeding the upper limit value described above can prevent excessive increase in the polymerization rate, and facilitates the formation of the sea-island structure.

When a transition metal salt is used as the reducing agent, a chelating agent can be used in combination for the purpose of enhancing its reactivity.

As the chelating agent, compounds containing two or more electron donor atoms capable of forming coordinate bonds with the target transition metal atom can be used, and examples thereof include ethylenediaminetetraacetic acid, hydroxyethylethylenediaminetriacetic acid, nitrilotriacetic acid, citric acid, tartaric acid, gluconic acid, 5-sulfosalicylic acid, ethylene diamine, diethylenetriamine, triethylenetetramine, triaminotriethylamine, triethanolamine, N-hydroxyethylethylenediamine, sodium oxalate, and metal salts thereof. Among them, ethylenediaminetetraacetic acid and metal salts thereof are preferable in terms of excellent stability of polymerization.

From the viewpoint of controlling polymerization reactivity, the amount of the chelating agent used is preferably 0.5 molar equivalents or more, more preferably 1.0 molar equivalents or more, relative to the amount of the reducing agent. On the other hand, this amount is preferably 5.0 molar equivalents or less, and more preferably 2.5 molar equivalents or less.

In step ii, if necessary, an aqueous medium may be added to the latex of polyorganosiloxane (A1).

Examples of the aqueous medium include water and a mixed medium of water and an organic solvent. The organic solvent in the mixed medium is not limited as long as it is miscible with water, and examples thereof include methanol and ethanol.

In step ii, if necessary, an emulsifier may be added to the latex of polyorganosiloxane (A1).

The emulsifier is not particularly limited, and the same emulsifier as the emulsifier used in the production of the polyorganosiloxane (A1) can be used. Especially, anionic emulsifiers or nonionic emulsifier: are preferable.

In step ii, polymerization may be implemented using only the emulsifier already contained in the latex of polyorganosiloxane (A1) without adding a new emulsifier.

A chain transfer agent may be used when polymerizing the vinyl monomer component (a2).

Examples of the chain transfer agent include mercaptans, such as n-dodecylmercaptan, t-dodecylmercaptan, n-octylmercaptan, n-tetradecylmercaptan, n-hexylmercaptan and n-butylmercaptan; halogen compounds, such as carbon tetrachloride and ethylene bromide; and α-methylstyrene dieter. One of these chain transfer agents may be used alone, or two or more of these may be used in combination.

The amount of the chain transfer agent used is preferably 1.0% by mass or less, and may be 0% by mass, with respect to 100% by mass of the vinyl monomer component (a2). The chain transfer agent when used in an amount of 1.0% by mass or less suppresses the decrease in the THF-insoluble fraction ratio of the polymer particles (C), resulting in further improved impact strength of the molded product.

Step iii:

Regarding the latex of polyorganosiloxane (A1) to which the vinyl monomer component (a2) and the radical polymerization initiator have been added in step ii, polymerization of the vinyl monomer component (a2) is initiated under conditions satisfying the following formula (a).

$$T_{10}(T_{in}+10) \qquad (a)$$

In this formula, $T_{10}$ represents the 10-hour half-life temperature of the radical polymerization initiator used, and $T_{in}$ represents the temperature at which the polymerization of the vinyl monomer component (a2) is initiated. When multiple radical polymerization initiators are used in combination, the $T_{10}$ value of the radical polymerization initiator showing the lowest 10-hour half-life temperature is used.

By satisfying the formula (a), in other words, by setting the temperature $T_{in}$ for initiating the polymerization of the vinyl monomer component (a2) (hereinafter, referred to as the polymerization temperature ($T_{in}$)) to a temperature 10° C. or more lower than the 10-hour half-life temperature $T_{10}$ of the radical polymerization initiator, the polymerization rate can be suppressed, which facilitates the formation of a sea-island structure in which the polyorganosiloxane (A1) and the vinyl polymer (A2) are combined, and enables production of polymer particles (C) capable of further improving the impact strength of the resulting molded product.

The polymerization temperature ($T_{in}$) is preferably 15° C. or more, mow preferably 20° C. or more lower than the 10-hour half-life temperature $T_{10}$ of the radical polymerization initiator.

The lower limit of the polymerization temperature ($T_{in}$) is not particularly limited, but from the viewpoint of stability at the beginning of polymerization, the preferable lower limit is a temperature which is 50° C. lower than the 10-hour half-life temperature $T_{10}$ of the radical polymerization initiator.

The polymerization time varies depending on the polymerization temperature ($T_{in}$), but may be, for example, 0.1 to 30 hours.

The 10-hour half-life temperature $T_{10}$ is a temperature at which 50 mol % of the radical polymerization initiator used is thermally decomposed in 10 hours. For example, the 10-hour half-life temperature $T_{10}$ of the radical polymerization initiator can be calculated by substituting the conversion X of radical polymerization initiator=50 [%], time t=36000 [s](=10 hours), gas constant R=8.314 [J/Kmol], and literature values for frequency factor A and activation energy E into the following formulae (b) and (c). A literature value may be used for the 10-hour half-life temperature $T_{10}$.

$$X=100\times\exp(-kdt) \qquad (b)$$

$$kd=A\times\exp(-E/RT) \qquad (c)$$

wherein X [%]: conversion, kd [1/S]: reaction rate, t [s]: time, A [1/S]: frequency factor, E [J/mol]: activation energy, R [0.1/Kmol]: gas constant, and T [K]: temperature.

For example, the 10-hour half-life temperature of potassium persulfate is 67° C. and the 10-hour half-life temperature of t-butyl hydroperoxide (trade name: Perbutyl H69, manufactured by Nippon Oil & Fats Co., Ltd.) is 167° C.

Step iv:

The polymerization is carried out so as to satisfy the following formula (d) with the proviso that, in respect of the polymerization behavior after initiating the polymerization in step iii, the maximum temperature in the system reached in the polymerization of the vinyl monomer component (a2) is defined as $T_p$ (° C.), and the time taken for the temperature in the system having reached $T_{in}+1$ (° C.) to reach $T_{in}+\{(T_p-T_{in}/3\}$ (° C.) is defined as $S_p$ (seconds) (hereafter, referred to as polymerization rate ($S_p$)).

$$S_p \geq 80 \qquad (d)$$

By setting the polymerization rate ($S_p$) to 80 seconds or more, the formation of a sea-island structure in which the polyorganosiloxane (A1) and the vinyl polymer (A2) are combined is facilitated, and polymer particles (C) capable of further improving the impact strength of the resulting molded product can be obtained. The polymerization rate ($S_p$) is more preferably 100 seconds or more, even more preferably 120 seconds or more, and particularly preferably 150 seconds or more.

The polymerization rate ($S_p$) can be adjusted not only by the type and amount of the radical polymerization initiator and the polymerization initiation temperature $T_{in}$, but also by the heat-releasing system used during polymerization.

(Vinyl Polymer (B))

The vinyl polymer (B) is a polymer obtained by polymerizing the vinyl monomer component (b), and composed of units derived from vinyl monomers.

The vinyl monomer component (b) in the vinyl polymer (B) includes at least one type of vinyl monomer.

The vinyl monomer forming the vinyl monomer component (b) is not particularly limited, and examples thereof include various vinyl monomers, such as (meth)acrylate monomers, aromatic vinyl monomers, and vinyl cyanide monomers.

Examples of the (meth)acrylate monomer include alkyl methacrylates, such as methyl methacrylate, ethyl methacrylate, n-butyl methacrylate and i-butyl methacrylate; alkyl acrylates, such as methyl acrylate, ethyl acrylate and n-butyl acrylate.

Examples of the aromatic vinyl monomers include styrene, alkyl-substituted styrene (e.g., p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, methylstyrene, o-ethylstyrene, etc.), alkyl-substituted isopropenylbenzene (e.g., isopropenylbenzene (α-methylstyrene), isopropenyltoluene, isopropenylethylbenzene, isopropenylpropyl benzene, isopropenylbutylbenzene, isopropenylpentylbenzene, isopropenylhexylbenzene, isopropenyoctylbenzene, etc.), 1,1-diphenylethylene and the like. Among them, styrene and α-methylstyrene are preferable as the generation of cullet can be suppressed.

Examples of the vinyl cyanide monomers include acrylonitrile, methacrylonitrile, and the like.

One of these may be used alone, or two or more of these may be used in combination.

The vinyl monomer component (b) preferably includes at least one selected from the group consisting of a (meth)acrylate monomer and an aromatic vinyl monomer in terms of further improving the weather resistance of the molded product.

The proportion of the total amount of the (meth)acrylate monomer and the aromatic vinyl monomer is preferably 50% by mass or more with respect to 100% by mass of the vinyl monomer component (b).

With respect to the (meth)acrylate monomer and the aromatic vinyl monomer, it is more preferable that the vinyl monomer component (b) includes either or both of methyl methacrylate and styrene because the resulting molded product shows particularly improved weather resistance.

The proportion of the total amount of methyl methacrylate and styrene is preferably 50% by mass or more with respect to 100% by mass of the vinyl monomer component (b).

The vinyl monomer component (b) preferably includes a (meth)acrylate monomer in terms of superior dispersibility of the polymer particles (C) in the thermoplastic resin and superior weatherability of the molded product.

The proportion of the (meth)acrylate monomer is preferably 50% by mass or more with respect to 100% by mass of the vinyl monomer component (b).

The vinyl monomer component (b) more preferably includes methyl methacrylate among (meth)acrylate monomers in terms of particularly improved dispersibility of the polymer particles (C) in the thermoplastic resin and particularly improved weatherability of the molded product.

The proportion of methyl methacrylate is preferably 50% by mass or more with respect to 100% by mass of the vinyl monomer component (b).

The glass transition temperature (hereinafter, also referred to as "Tg") of the vinyl polymer (B) is preferably 70° C. or higher, more preferably 80° C. or higher, and even more preferably 90° C. or higher. On the other hand, the Tg of the vinyl polymer (B) is preferably 105° C. or lower. When the Tg of the vinyl polymer (B) is not lower than the lower limit value described above, the polymer particles (C) show satisfactory powder characteristics (flowability and particle diameter of the powder).

The Tg of the vinyl polymer (B) can be controlled by adjusting the type and ratio of the vinyl monomers constituting the vinyl monomer component (b).

The Tg of the vinyl polymer (B) can be determined by the Fox equation. In this context, for the Tg of a homopolymer of the vinyl monomers constituting the vinyl monomer component (b), for example, the values described in "Polymer Handbook" (Wiley Interscience/1999) can be used. The Tg of homopolymers of vinyl monomers not described in this literature can be calculated using Bicerano's method "Prediction of Polymer Properties" (MARCEL DEKKER, 2002).

(Method for Producing Polymer Particles (C))

The polymer particles (C) can be produced, for example, by a method that polymerizes (graft-polymerizes) the vinyl monomer component (b) in the presence of the polymer (A). As a result, a polymer in which a part or all of the vinyl polymer (B) is grafted to the polymer (A) is obtained.

The method for producing the polymer particles (C) is preferably a method that involves adding the vinyl monomer component (b) to the polymer (A) latex, and polymerizing the vinyl monomer component (b) in the latex.

M described above, the polymer (A) latex is preferably produced by polymerizing the vinyl monomer component (a2) in the presence of a latex containing the polyorganosiloxane (A1).

The temperature for polymerizing the vinyl monomer component (b) (hereinafter, also referred to as "polymerization temperature ($T_b$)") is not particularly limited, and conventional conditions are applicable. For example, the polymerization temperature ($T_b$) may be 45 to 95° C., and the polymerization time may be 0.1 to 10 hours.

The method for adding the vinyl monomer component (b) to the polymer (A) latex is not particularly limited, but dropwise addition is preferable in that the generation of cutlet can be suppressed and the degree of grafting between the polymer (A) and the vinyl monomer component (b) improves. In this process, the entire amount of the vinyl monomer component (b) may be dropwise added continuously, or the vinyl monomer component (b) may be dropwise and portionwise added while providing intervals during which the vinyl monomer component (b) is not added.

When the vinyl monomer component (b) is composed of multiple types of vinyl monomers, the method for continuously implementing dropwise addition of the entire amount of the vinyl monomer component (b) is not particularly limited, and examples thereof include a method that dropwise adds a mixture continuously with a constant composition, and a method that implements the addition while continuously varying the composition as in the case of power feed polymerization. When the vinyl monomer component (b) is composed of multiple types of vinyl monomers, examples of the method for dropwise and portionwise adding the vinyl monomers while providing intervals include a method that portionwise adds mixtures of the same composition, and a method that portionwise a adds the component monomers and/or mixtures of different compositions.

When the vinyl monomer component (b) includes (meth)acrylate monomers, aromatic vinyl monomers and vinyl cyanide monomers, it is preferable that the (meth)acrylate monomers are polymerized, followed by polymerization with the aromatic vinyl monomers and vinyl cyanide monomers. By implementing polymerization in this manner, the polymer particles (C) show satisfactory powder characteristics (flowability and panicle diameter of the powder).

The vinyl monomer component (b) can form a graft polymer with the polymer (A) by chemical bonding to a unit derived from the siloxane crossing agent contained in the polyorganosiloxane (A1) and/or a unit derived from the monomer (a2-3) contained in the vinyl polymer (A2).

For improving the efficiency of this grafting, polyfunctional monomers may be polymerized prior to the addition of the vinyl monomer component (b). Examples of the polyfunctional monomer include ethylene glycol dimethacrylate, propylene glycol dimethacrylate, 1,3-butylene glycol dimethacrylate, 1,4-butylene glycol dimethacrylate, ethylene glycol diacrylate, propylene glycol diacrylate, 1,3-butylene glycol diacrylate, butylene glycol diacrylate, 1,6-hexanediol diacrylate, divinylbenzene, polyfunctional (meth)acrylic: group-modified silicone, ally methacrylate, triallyl cyanurate, triallyl isocyanurate, and triallyl trimellitate.

The emulsifier used in the polymerization of the vinyl monomer component (b) is not particularly limited, and the same emulsifier as that used in the production of the polyorganosiloxane (A1) and/or the vinyl polymer (A2) can be used. However, anionic or nonionic emulsifiers are preferable. Alternatively, the polymerization may be carried out using only the emulsifier contained in the vinyl polymer (A2) latex without any additional emulsifier when polymerizing the vinyl monomer component (b).

The total amount of the emulsifier used in the production of the polyorganosiloxane (A1), the production of the vinyl polymer (A2), and the polymerization of the vinyl monomer component (b) is preferably 0.05 pants by mass or more, more preferably 0.1 harts by mass or more, with respect to total 100 parts by mass of all monomers forming the polymer particles (C). On the other hand, this amount is preferably 10 parts by mass or less, more preferably 5 parts by mass or less. By adjusting the total amount of the emulsifier, it is possible to control the particle size of the latex of the polymer particles (C) to a desired value. When the total amount of the emulsifier is not less than the lower limit value described above, the stability of each of the polyorganosiloxane (A1) latex, the polymer (A) latex, and the polymer (C) latex can be sufficiently enhanced. When the total amount of the emulsifier is not more than the upper limit value described above, the amount of the emulsifier remaining in the powder of the polymer particles (C) can be sufficiently reduced, and it is possible to suppress the deterioration of the thermal decomposition resistance and surface appearance of the molded product using the resin composition containing the polymer particles (C) and a thermoplastic resin.

When polymerizing the vinyl monomer component (b), a chain transfer agent may be used for the purpose of adjusting the THF-soluble fraction, adjusting the molecular weight, and the like.

Examples of the chain transfer agent include mercaptans, such as n-dodecylmercaptan, t-dodecylmercaptan, n-octylmercaptan, n-tetradecylmercaptan, n-hexylmercaptan and n-butylmercaptan; halogen compounds, such as carbon tetrachloride and ethylene bromide; and α-methylstyrene dieter. One of these chain transfer agents may be used alone, or two or more of these may be used in combination.

The amount of the chain transfer agent used is preferably 2.0% by mass or less, and may be 0% by mass, with respect to 100% by mass of the vinyl monomer component (b). The chain transfer agent when used in an amount of 2.0% by mass or less suppresses the decrease in the THF-insoluble fraction ratio of the polymer particles (C), milking in further improved impact strength of the molded product.

After polymerizing the vinyl monomer component (b), the polymer particles (C) may be recovered as a powder from the obtained latex of the polymer particles (C).

When the polymer particles (C) are recovered as a powder, a direct drying method such as a spray drying method or a coagulation method can be used. In the coagulation method, residual polymerization aids contained in the resulting powder, such as the emulsifier used during polymerization, its coagulation salt, and the initiator, can be reduced in the washing step after coagulation. On the other hand, in the direct drying method, the auxiliary agents added during polymerization can generally be left to remain in the resulting powder. From such powder recovery methods, an appropriate method can be selected with a view to achieving a preferable residue status when the polymer particles (C) are added to the thermoplastic resin.

The spray drying method is a method in which the latex of the polymer particles (C) is sprayed as fine droplets into a dryer, and heated gas for drying is applied to the droplets to dry the droplets. Examples of the method for generating fine droplets include those respectively using a rotating disc, a pressure nozzle, a two-fluid nozzle, and a pressurized two-fluid nozzle. The capacity of the dryer is not limited and the dryer may be of any capacity ranging from small capacity as in the case of laboratory-scale dryer to large capacity as in the case of industry-scale dryer. The temperature of the heated gas for drying is preferably 200° C. or lower, and more preferably 120 to 180° C. Latexes of two or more types of graft copolymers prepared separately may be spray-dried together. Further, in order to improve powder characteristics such as blocking resistance during spray drying and bulk specific gravity, optional components such as silica may be added to the latex of the polymer particles (C) before implementing spray drying.

The coagulation method is a method in which a latex of the polymer particles (C) is allowed to be coagulated so as to separate the polymer particles (C), and then the polymer particles group (C) are collected and dried. First, a latex of the polymer (C) is put into hot water in which a coagulant is dissolved to allow the polymer particles (C) to be salted out and coagulated, thereby separating the polymer particles (C). Then, the separated wet polymer particles (C) are subjected to dehydration or the like to recover the polymer particles (C) having a reduced water content. The recovered polymer particles (C) are dried using a squeezing dehydrator or a hot air dryer.

Examples of the coagulant includes inorganic salts such as aluminum chloride, aluminum sulfate, sodium sulfate, magnesium sulfate, sodium nitrate and calcium acetate, and acids such as sulfuric acid, among which calcium acetate is particularly preferable. One of these coagulants may be used alone, or two or more of these may be used in combination.

The above coagulants are usually used in the form of aqueous solutions. For stably implementing coagulation and recovery of the polymer particles (C), the concentration of the coagulant aqueous solution is preferably 0.1% by mass or more, particularly preferably 1% by mass or more. Further, for reducing the amount of coagulant remaining in the recovered polymer particles (C) so as to prevent deterioration of the appearance of the molded product, the concentration of the aqueous coagulant solution is preferably 20% by mass or less, more preferably 15% by mass or less, and particularly preferably 15% by mass or less.

The amount of the aqueous coagulant solution is not particularly limited, but is preferably 10 parts by mass or more and 500 parts by mass or less with respect to 100 parts by mass of the latex of the polymer particles (C).

The method for bringing the latex of the polymer particles (C) into contact with the coagulant aqueous solution is not particularly limited, and examples of the method usually used include:

(1) a method that involves continuously adding the latex to the coagulant aqueous solution while stirring, and holding the resulting for a predetermined period of time; and (2) a method that involves continuously injecting the aqueous coagulant solution and the latex in a predetermined ratio into a vessel equipped with a stirrer so as to allow them to contact with each other, and continuously withdrawing a mixture containing the coagulated polymer and water.

The temperature for contacting the latex with the coagulant aqueous solution is not particularly limited, but is preferably 30° C. or higher and 100° C. or lower. Contact time is not particularly limited.

The coagulated polymer particles (C) are washed with water used in an amount about 1 to 100 times the mass of the polymer particles (C), and filtered. The filtered wet polymer particles (C) are dried using a fluidized bed dryer, a squeezing dehydrator, or the like. The drying temperature and drying time may be appropriately set depending on the desired polymer particles (C) to be obtained.

Alternatively, it is also possible to transfer the polymer particles (C) direcly to an extruder or molding machine for producing the resin composition without recovering the polymer particles (C) discharged from the squeezing dehydrator or extruder, and mix the polymer particles (C) with the thermoplastic resin to obtain a molded product.

[Composition]

The composition according to one aspect of the present invention (hereinafter, also referred to as "the present composition") include the polymer particles (C) and at least one component selected front the group consisting of a phosphoric acid compound and an alkali metal salt thereof (hereinafter, also referred to as "component (D)").

The component (D) plasticizes the resin composition containing the polymer particles (C) and improves the flowability of the resin composition during molding. Moreover, the component (D) suppresses the decrease in the molecular weight of the resin composition and improves the molding stability.

Examples of the phosphoric acid compound in the component (D) include alkyl phosphates, such as polyoxyalkylene alkyl ether phosphate; and alkylaryl phosphates, such as polyoxyalkylene alkylphenyl ether phosphate.

With respect to the polyoxyalkylene alkylphenyl ether phosphate and polyoxyalkylene alkyl ether phosphate, examples of the polyoxyalkylene groups therein include a polyoxyethylene group and the like, and a polyoxyethylene group is preferred. The number of oxyethylene units in the polyoxyethylene group is, for example, 2 to 14, preferably 2 to 10, more preferably 2 to 8, and even more preferably 2 to 6. The number of carbon atoms in the alkyl group is, for example, 1 to 20, preferably 5 to 18, more preferably 7 to 16, and even more preferably 10 to 16.

Examples of the alkali metal salt include sodium salts, potassium salts and the like.

As the component (D), an alkali metal salt of a phosphoric acid compound is preferable, and an alkali metal salt of an alkyl phosphate and an alkali metal salt of an alkylaryl phosphate are more preferable in that the phosphorus atom content described below can be easily adjusted. Among them, in terms of flowability and molding stability of the resin composition during molding, an alkali metal salt of polyoxyalkylene alkylphenyl ether phosphate and an alkali metal salt of polyoxyalkylene alkyl ether phosphate are preferable, and an alkali metal salt of polyoxyalkylene alkyl ether phosphate is more preferable.

As the alkali metal salt of polyoxyalkylene alkylphenyl ether phosphate, an alkali metal salt of polyoxyethylene alkylphenyl ether phosphate is preferable.

As the alkali metal salt of polyoxyalkylene alkyl ether phosphate, an alkali metal salt of polyoxyethylene alkyl ether phosphate is preferable.

Among these, an alkali metal salt of polyoxyethylene alkyl ether phosphate is preferred.

One of these compounds may be used alone, or two or more of these may be used in combination.

The amount of the component (D) in the present composition is set in consideration of the proportion of phosphorus atoms contained in the component (D) with respect to the total 100% by mass of the polymer particles (C) and the component (D) (hereinafter, also referred to as "phosphorus content").

In terms of flowability and molding stability of the resin composition during molding, the phosphorus content is preferably 10 ppm by mass or more, more preferably 50 ppm by mass or more, even more preferably 100 ppm by mass or more, particularly preferably 200 ppm by mass or more, and most preferably 300 ppm by mass or more. The upper limit of the phosphorus content is not particularly limited, but may be, for example, 2000 ppm by mass or less, and preferably 1500 ppm by mass or less.

The present composition may further contain emulsifiers other than the component (D). The other emulsifiers are not particularly limited, and for example, the same emulsifiers as those used in the production of the polymer panicles (C) can be used.

The proportion of the total amount of the polymer particles (C) and the component (D) is preferably 90% by mass or more, more preferably 95% by mass or more, and even mote preferably 98% by mass or more, with respect to 100% by mass of the present composition.

A preferred embodiment of the present composition is one recovered as a powder from a latex which includes the polymer particles (C) and an emulsifier, wherein at least part of the emulsifier is the above mentioned alkali metal salt of the phosphoric acid compound.

Such a composition can be prepared, for example, by adding an alkali metal salt of a phosphoric acid compound to a latex of the polymer particles (C) (which may contain other emulsifiers) and recovering a powder, or by adding an alkali metal salt of a phosphoric acid compound during the polymerization process for the polymer particles (C) (during polymerization of the polymer (A) or the vinyl polymer (B)) and recovering a powder. Examples of the method for recovering the powder include the same method as described above for recovering the polymer panicles (C) as a powder from the latex of the polymer particles (C).

However, the present composition is not limited to this embodiment. For example, the present composition may be a mixture of the powder of the polymer particles (C) and the component (D).

[Resin Composition]

The resin composition according to one aspect of the present invention (hereinafter, also referred to as "the present resin composition") includes the polymer particles (C) and a thermoplastic resin (hereinafter, also referred to as "thermoplastic resin (E)").

The present ruin composition may contain the present composition instead of the polymer particles (C). In this case, the present resin composition contains the polymer particles (C), the component (D), and the thermoplastic resin (E).

The thermoplastic resin (E) is not particularly limited, and examples thereof include engineering plastics (aromatic polycarbonate, etc.), styrene resins, polyester resins, olefin resins (polyethylene, etc.), thermoplastic elastomers, biodegradable resins, halogen resins (vinyl chloride resin, etc.), and acrylic resins.

As the engineering plastic, various known then thermoplastic engineering plastics can be used without particular limitation.

Examples of the engineering plastics include polyphenylene ether, polycarbonate, polyester polymers (polyethylene terephthalate, polybutylene terephthalate, etc.), syndiotactic polystyrene, nylon polymers (6-nylon, 6,6-nylon, etc.), polyarylate, polyphenylene sulfide, polyether ketone, polyether ether ketone, polysulfone, polyethersulfone, polyamideimide, polyetherimide, and polyacetal.

Special styrene resins such as heat-resistant ABS and heat-resistant acrylic resins, which are highly heat-resistant and required to have melt flowability, can also be listed as examples of engineering plastics usable in the present invention. Among these, aromatic polycarbonate and polybutylene terephthalate are more preferable when there is a higher need for strength.

Examples of the aromatic polycarbonate include 4,4'-dioxydiarylalkane polycarbonates such as 4,4'-dihydroxydiphenyl-2,2-propane (i.e., bisphenol A) polycarbonate.

Examples of the olefin resin include copolymers of high-density polyethylene, medium-density polyethylene, low-density polyethylene or ethylene with other α-olefins; copolymers of polypropylene or propylene with other α-olefins; polybutene, poly-4-methylpentene-1 and the like.

Examples of the thermoplastic elastomer include styrene elastomers, urethane elastomers, polyolefin elastomers, polyamide elastomers, fluoro elastomers, chlorinated PE elastomers, acrylic elastomers, and the like.

Examples of the styrene elastomer include styrene-butadiene-styrene copolymer (SBS), styrene-isoprene-styrene copolymer (SIS), styrene-ethylene/butene copolymer (SEB), styrene-ethylene/propylene copolymer (SEP), styrene-ethylene/butene-styrene copolymer (SEBS), styrene-ethylene/propylene-styrene copolymer (SEEPS), styrene-ethylene/ethylene/propylene-sty/vile copolymer (SEEPS), styrene-butadiene/butylene-styrene copolymer (partially hydrogenated styrene-butadiene-styrene copolymer: SBBS), partially hydrogenated styrene-isoprene-styrene copolymer, and partially hydrogenated styrene-isoprene/butadiene-styrene copolymer. In the above description. "-" indicates that the monomers forming the units connected by "-" are copolymerized, and "/" indicates that the units connected by "/" are present while being randomly modified by hydrogenation or the like after copolymerization.

Examples of the urethane elastomer include reaction products of polymeric dials, organic diisocyanates, and chain extenders.

Examples of the polymer diol include polyester diols, polyether diols, polyester ether diols, polycarbonate diols, and polyester polycarbonate dials.

Examples of the organic diisocyanate include 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexylmethane diisocyanate), isophorone diisocyanate, and hexamethylene diisocyanate. Among these organic diisocyanates, 4,4'-diphenylmethane diisocyanate is preferred.

Examples of the chain extender include ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol, and 1,4-bis(β-hydroxyethoxy)benzene.

Examples of the polyolefin clammier include ethylene-propylene rubber, ethylene-propylene-diene rubber; ethylene-vinyl acetate copolymer, butyl rubber, butadiene rubber, propylene-butane copolymer, ethylene-acrylic ester copolymer and the like.

Examples of the styrene resin include polystyrene, acrylonitrile-styrene copolymer, acrylonitrile-styrene-α-methylstyrene copolymer, acrylonitrile-methyl methacrylate-styrene-α-methylstyrene copolymer, ABS resin, AS resin, MABS resin, MBS resin, AAS resin, AES resin, acrylonitrile-butadiene-styrene-α-methylstyrene copolymer, acrylonitrile-methyl methacrylate-butadiene-styrene-α-methylstyrene copolymer, styrene-maleic anhydride copolymer, styrene-maleimide copolymers, styrene-N-substituted maleimide copolymers, acrylonitrile-styrene-N-substituted maleimide copolymers, acrylonitrile-butadiene-styrene-β-isopropenylnaphthalene copolymers, and acrylonitrile-methyl methacrylate-butadiene-styrene-α-methylstyrene-maleimide copolymer.

The polyester resin is a polymer of a polybasic acid and a polyhydric alcohol, and is not particularly limited as long as it has thermoplasticity. Examples of the polybasic acid include terephthalic acid, naphthaldicarboxylic acid, cyclohexyldicarboxylic acid, and esters thereof. Examples of the polyhydric alcohol include ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxy phenyl)propane, 1,4-dimethyloltetrabromobenzene, and tetrabromobisphenol A bis(2-hydroxyethyl) ether (TBA-EO).

The polyester resin may be a homopolymer, a copolymer, or a blend of two or more of these.

As the polyester resin, a commercially available product, such as "PETG" manufactured by Eastman Chemical Company, may be used.

Examples of the biodegradable resin include microbial polymers, chemically synthesized polymers, and natural polymers.

Examples of the microbial polymers include biopolyesters such as polyhydroxybutyrate/valerate (PHB/V), bacterial cellulose, and microbial polysaccharides (pullulan, curdlan, etc.).

Examples of the chemically synthesized polymer include aliphatic polyesters (polycaprolactone, polybutylene succinate, polyethylene succinate, polyglycolic acid, polylactic acid, etc.), polyvinyl alcohol, and polyamino acids (PMLG, etc.).

Examples of the natural polymer include chitosan, cellulose, starch, and cellulose acetate.

Examples of the halogen resin include vinyl chloride resins, such as vinyl chloride homopolymer, copolymers containing 80% by mass or more of vinyl chloride, and highly chlorinated polyvinyl chloride. Examples of copolymer components other than vinyl chloride include monovinylidene compounds such as ethylene, vinyl acetate, methyl methacrylate, and butyl acrylate. Each of these compounds may be contained in the copolymer in a total amount of 20% by mass or less.

Examples of the halogen resin other than vinyl chloride resins include fluorinated polymers, brominated polymers, and iodinated polymers.

Examples of the acrylic resin include copolymers obtained by polymerizing methyl methacrylate and copolymerizable vinyl monomers. Examples of the copolymerizable vinyl monomers include alkyl acrylates such as methyl acrylate, ethyl acrylate, i-propyl acrylate, n-butyl acrylate and 2-ethylhexyl acrylate; and alkyl methacrylates such as ethyl methacrylate, propyl methacrylate and n-butyl methacrylate; and aromatic vinyl compounds such as styrene, α-methylstyrene and vinyl toluene.

The thermoplastic resin (E) in the present invention also encompasses polyester resins such as polyphenylene ether, polycarbonate, polyethylene terephthalate and polybutylene terephthalate; syndiotactic polystyrene; polyamide resins such as 6-nylon and 6,6-nylon; polymer alloys of engineering plastics such as polyarylate, polyphenylene sulfide, polyetherketone, polyetheretherketone, polysulfone, polyethersulfone, polyamideimide, polyetherimide and polyacetal with other thermoplastic resins.

One of these thermoplastic resins (E) may be used alone, or two or more thereof may be used in combination.

In terms of high commercial availability and further improved balance of impact strength and coloring ability of the molded product, the thermoplastic resin (E) preferably contains at least one selected from the group consisting of aromatic polycarbonate, polymethyl methacrylate, styrene-acrylonitrile copolymer, polyethylene terephthalate, polybutylene terephthalate, polyvinyl chloride, polyphenylene sulfide and polyacetal, and more preferably contains at least one selected from the group consisting of polymethyl methacrylate and styrene-acrylonitrile copolymer.

In addition to the above, the present resin composition may contain various wen-known additives as far as the object of the present invention is not impaired.

Examples of the additive include flame retardants (those of a phosphorus-type, bromine-type, silicone-type, organic metal salt-type, etc.), anti-drip agents (e.g., fluorinated polyolefins, silicones and aramid fibers), lubricants (e.g., long-chain fatty acid metal salts such as magnesium stearate), release agents (e.g., pentaerythritol tetrastearate), nucleating agents, antistatic agents, stabilizers (e.g., phenolic stabilizers, sulfuric stabilizers, phosphoric stabilizers, ultraviolet absorbers, and amine light stabilizers), fillers (titanium oxide, talc, mica, kaolin, calcium carbonate, glass flakes, etc.), plasticizer, reinforcing agents (e.g., glass fiber, and carbon fiber), dyes, pigments, and the like.

Phenolic stabilizers are stabilizers having a phenolic hydroxyl group. A particularly preferable one is a hindered phenolic antioxidant in which one or two carbon atom adjacent to the carbon atom of the aromatic ring to which the phenolic hydroxyl group is bonded are substituted with a substituent having 4 or more carbon atoms. In this context, the substituent having 4 or more carbon atoms may be bonded to the carbon atom of the aromatic ring via a carbon-carbon bond, or may be bonded via an atom other than a carbon atom.

Examples of the phenolic stabilizer include non-hindered phenolic antioxidants, such as p-cyclohexylphenol, 3-t-butyl-4-methoxyphenol, 4,4'-isopropylidenediphenol, and 1,1-bis(4-hydroxyphenyl)cyclohexane; and hindered phenolic antioxidants, such as 2-t-butyl-4-methoxyphenol, 2,6-di-t-butyl-p-cresol, 2,4,6-tri-t-butylphenol, 4-hydroxymethyl-2,6-di-t-butylphenol, styrenated phenol, 2,5-di-t-butylhydroquinone, octadecyl-3-(3,5-di-t-butyl-4-hydroxyphenyl)propionate, triethylene glycol bis[3-(3-t-butyl-5-methyl-4-hydroxyphenyl)propionate], 1,6-hexanediol bis[3-(3,5-di-t-butyl-4-1β hydroxyphenyl) propionate], pentaerythritol tetrakis [3-(3,5-di-t-butyl-4-hydroxyphenyl)propionate], 2,2'-methylenebis(4-methyl-6-t-butylphenol), 2,2'-methylenebis (6-t-butyl-4-ethylphenol), 2,2'-methylenebis[4-methyl-6-(1,3,5-trimethylhexyl)phenol], 4,4'-methylenebis(2,6-di-t-butylphenol), 4,4'-butylidenebis(3-methyl-6-t-butylphenol), 2,6-bis(2-hydroxy-3-t-butyl-5-methylbenzyl)-4-methylphenol, 1,1,3-tris[2-methyl-4-hydroxy-5-t-butylphenyl]butane, 1,3,5-trimethyl-2,4,6-tris[3,5-di-t-butyl-4-hydroxybenzyl]benzene, tris(3,5-di-t-butyl-4-hydroxybenzyl)isocyanurate, tris[3-(3,5-di-t-butyl-4-hydroxyphenyl)propionyloxyethyl]isocyanurate, 4,4'-thiobis(3-methyl-6-t-butylphenol), 2,2'-thiobis(4-methyl-6-t-butylphenol), 4,4'-thiobis(2-methyl-6-t-butylphenol), and thiobis(β-naphthol). In particular, hindered phenolic antioxidants in themselves tend to form stable radicals and, hence, can be suitably used as radical trapping agents. One of these phenolic stabilizers may be used alone, or two or more thereof may be used in combination.

The proportion of the phenolic stabilizer is 0.001% by mass or more, and more preferably 0003% by mass or more, with respect to 100% by mass of the present resin composition. On the other hand, this proportion is preferably 2% by mass or less, and more preferably 1% by mass or less. When the proportion of the phenolic stabilizer is not less than the lower limit value described above, a further improved anti-oxidizing effect is achieved. When this proportion is not more than the upper limit value described above, it is possible to further suppress deterioration of the oxidative heat stability of the resin composition and resin decomposition during melt-kneading of the resin composition.

A sulfuric stabilizer is a stabilizer that does not have a phenolic hydroxyl group but has a sulfur atom, and acts as a decomposer for hydroperoxides generated by deterioration of thermoplastic resins, thereby improving the heat aging resistance of the resin composition and showing effect of improving the retention of color tone, tensile strength, elongation and the like. The sulfuric stabilizer can be used alone, but when it is used in combination with the phenolic stabilizer, the long-term thermal stability can be further improved.

Examples of the sulfuric stabilizer include didodecylthiodipropionate, ditetradecylthiodipropionate, dioctadecylthiodipropionate, pentaerythritol tetrakis(3-dodecylthiopropionate), thiobis(N-phenyl-β-naphthylamine), 2-mercaptobenzothiazole, 2-mercaptobenzimidazole, tetramethylthiuram monosulfide, tetramethylthiuram disulfide, nickel dibutyldithiocarbamate, nickel isopropylxanthate, and trilauryltrithiophosphite. Especially, a thioether stabilizer having a thioether structure can be preferably used because such a stabilizer receives oxygen from an oxidized substance and reduces the substance. One of these sulfuric stabilizers may be used alone, or two or more thereof may be used in combination.

The proportion of the sulfuric stabilizer is 0.001% by mass or more, and more preferably 0.003% by mass or more, with respect to 100% by mass of the present resin composition. On the other hand, this proportion is preferably 2% by mass or less, and more preferably 1% by mass or less. When the proportion of the sulfuric stabilizer is not less than the lower limit value described above, a further improved heat stabilization effect is achieved. When this proportion is not more than the upper limit value described above, it is possible to further suppress resin decomposition during melt-kneading of the resin composition.

A phosphoric stabilizer is a stabilizer having a phosphorus atom and is a phosphite ester compound having a $P(OR)_3$ structure. In this formula, R is an alkyl group, an alkylene group, an aryl group, an arylene group, or the like, three R's may be the same or different, and two R's may form a ring structure. Furthermore, one molecule may have a plurality of $P(OR)_3$ structures. A phosphoric stabilizer acts as a decomposer tier hydroperoxides generated by deterioration of thermoplastic resins, thereby improving the heat aging resistance of the resin composition and showing effect of improving the retention of color tone, tensile strength, elongation and the like. The phosphoric stabilizer can be used alone, but when it is used in combination with the phenol stabilizer, it is possible to not only achieve a particularly improved long-term thermal stability but also suppress the yellowing caused by the phenolic stabilizer.

Examples of the phoshophite compound include triarylphosphites (triphenylphosphite, tricresylphosphite, trixylenylphosphite, trinaphthylphosphite, etc.), diarylalkyl phosphites (diary C1-18 alkyl phosphites such as diphenylisooctylphosphite and diphenyldecylphosphite, etc.), aryl dialkyl phosphites (aryl C1-18 dialkyl phosphites such as phenyl diisooctyl phosphite, etc.), trialkyl phosphite (tri-C1-18 alkyl phosphites such as trimethyl phosphite, triethyl phosphite, tri-n-butyl phosphite, triisooctyl phosphite, tridecyl phosphite, triisodecyl phosphite, etc.), dialkyl phosphites (di-01.18 alkyl phosphites such as dilauryl phosphite, etc.), phosphites containing alkylaryl units [tris(C1-18 alkylaryl) phosphites such as tris(2,4-t-butylphenyl)phosphite, tris(nonylphenyl)phosphite, tris(dinonylphenyl)phosphite and dinonylphenyl-o-biphenylphosphite, and 2,2-methylenebis(4,6-di-t-butylphenyl)octylphosphite, etc.), aliphatic carboxylic acid phosphites (C1-18 aliphatic carboxylic acid phosphites such as tristearyl phosphite, etc.), phosphites containing alkylene oxide units (polydipropylene glycol nonylphenyl phosphate, tetraphenyl dipropylene glycol phosphite, etc.), phosphites containing cyclic neopentane units [cyclic neopentanetetraylbis(octadecyl)phosphite, cyclic neopentanetetraylbis(2,4-di-t-butylphenyl)phosphite, cyclic neopentanetetra irbis(2,6-di-t-butyl-4-methylphenyl)

phosphite, etc.], diphosphites (diisodecyl pentaerythritol diphosphite, didodecyl pentaerythritol diphosphite, 4,4'-isopropylidene diphenyl didodecyl diphosphite, etc.), and triphosphites [heptasis dipropylene glycol triphosphite, hexatridecyl-1,1,3-tri(3-t-butyl-6-methyl-4-oxyphenyl)-3-methylpropane triphosphite, etc.]. One of these phoshophite compounds may be used alone, or two or more thereof may be used in combination.

Particularly, when using a thermoplastic resin (E) having a carbonate bond, an ester bond, an amide bond, or an acetal bond in a polymer structural unit, such as a polycarbonate resin, a polyester resin, a polyamide resin, a polyacetal resin, etc., it is preferable use a phosphoric stabilizer having high resistance to hydrolysis for suppressing deterioration of wet heat decomposition resistance of these thermoplastic resins.

An especially preferable phosphoric stabilizer is a phosphite ester compound in which the number of phosphorus atom per molecule is 1, and the number of carbon atom in each ester moiety (or the total number of carbon atom in the region located between the ester bonds in the case where multiple ester moieties form a ring) is 8 or more, or a phosphite ester having a plurality of phosphorus atoms in one molecule and having 8 or more carbon atoms in the ester moiety positioned between the phosphorus elements. Examples of such a phosphite ester compound include tri C6-18 alkyl phosphite (triisodecyl phosphite, etc.), phosphites containing a branched C3-6 alkyl group (t-butyl group, etc.) [tris(2,4-t-butylphenyl) phosphite, 2,2-methylenebis(4,6-di-t-butylphenyl)octylphosphite, etc.], and tetraalkyl(C12-15)-4,4'-isopropylidene diphenyl diphosphite.

The proportion of the phosphoric stabilizer is preferably 0.001% by mass or more, and more preferably 0.003% by mass or more, with respect to 100% by mass of the present resin composition. On the other hand, this proportion is preferably 2% by mass or less, and more preferably 1% by mass or less. When the proportion of the phosphoric stabilizer is not less than the lower limit value described above, a further improved thermal stabilization effect is achieved. When this proportion is not more than the upper limit value described above, it is possible to further suppress resin decomposition or deterioration of resistance to wet heat decomposition during melt-kneading of the resin composition.

In the present resin composition, when the phenolic stabilizer is used in combination with the sulfuric stabilizer and/or the phosphoric stabilizer, the total mass of the sulfuric stabilizer and the phosphoric stabilizer to be added is preferably at least 0.1 times, and more preferably at least 0.2 times the mass of the phenolic stabilizer to be added. On the other hand, the total mass is preferably not more than 5 times, and more preferably not more than 3 times. When the total mass of the sulfuric stabilizer and the phosphoric stabilizer is not less than the lower limit value described above, a further improved heat aging resistance is achieved. When this total mass is not more than the upper limit value described above, it is possible to further suppress resin decomposition during melt-kneading of the resin composition.

When the present resin composition contains the phenolic stabilizer and the sulfuric stabilizer and/or the phosphoric stabilizer, the total amount of the stabilizers is preferably 2% by mass or less with respect to 100% by mass of the resin composition. By setting the total amount of the stabilizers to 2% by mass or less, decomposition of the resin can be further suppressed during melt-kneading.

Examples of dyes or pigments include inorganic pigments such as iron oxide, ultramarine blue, titanium oxide, and carbon black. Examples of organic pigments include blue pigments of a phthalocyanine type and an anthraquinone type, red pigments of a perylene type and a quinacridone type, and yellow pigments of an isoindolinone type. Also, fluorescent pigments, metal powder pigments, pearl pigments, etc., can be used as pigments for special purposes. Examples of dyes include those of a nigrosine type, a perinone type, and an anthraquinone type. These dyes and pigments are commercially available in various grades, and can be used depending on the desired color. One of these may be used alone, or two or more of these may be used in combination.

The proportion of the polymer particles (C) or the present composition is preferably 0.5% by mass or more, more preferably 1% by mass or more, and even more preferably 2% by mass or more, with respect to 100% by mass of the present resin composition. On the other hand, this proportion is preferably 60% by mass or less, and more preferably 50% by mass or less. When the proportion of the polymer particles (C) or the present composition is not less than the lower limit value described above, the impact strength of the obtained molded article improves further. When the proportion is not more than the upper limit value described above, the decrease in flowability or heat deformation temperature of the resin composition can be suppressed.

The proportion of the thermoplastic resin (E) is preferably 40% by mass or more, and more preferably 50% by mass or more, with respect to 100% by mass of the resin composition. On the other hand, this proportion is preferably 99.5% by mass or less, more preferably 99% by mass or less, and even more preferably 98% by mass or less. When the proportion of the thermoplastic resin (E) is not less than the lower limit value described above, the decrease in flowability or heat deformation temperature of the resin composition can be suppressed. When this proportion is not more than the upper limit value described above, the impact strength of the resulting molded product improves further.

(Method for Producing Resin Composition)

The resin composition can be produced by mixing the polymer particles (C) or the present composition, the thermoplastic resin (E), and, if necessary, additives.

The method for mixing the materials may be, for example, a known blending method, and is not particularly limited. Examples of the method include a method that implements mixing and kneading with a tumbler, a V type blender, a super mixer, a Nauta mixer, a Banbury mixer, a kneading roll, an extruder, or the like.

One example of the method for producing the resin composition of the present invention is a method in which the polymer particles (C) or the present composition, pellets of the thermoplastic resin (E), and, if necessary, additives are mixed using an extruder, and the resulting is extruded into strands which are then cut into pellets with a rotary cutter or the like. By this method, the resin composition in the form of pellets can be obtained.

(Molded Product)

The molded product according to one aspect of the present invention (hereinafter, also referred to as "the present molded product") contains the polymer particles (C).

The present molded product may further contain the component (D).

The present molded product may further contain the thermoplastic resin (E).

It is preferable that the present molded product is composed of the present resin composition described above.

The present molded product can be produced, for example, by molding the polymer particles (C), the present composition, or the present resin composition.

Examples of the molding method include those generally used for molding thermoplastic resin compositions, such as an injection molding method, an extrusion molding method, a blow molding method and a calendar molding method.

The molded product has wide applications in industry as various materials in the fields of automobiles, OA equipment, home electric appliances, electrical/electronic products, construction, lifestyle/cosmetics, medical supplies, and the like. More specifically, the molded product can be used as housings for electronic devices, various parts, coating materials, automobile structural members, automobile interior parts, light reflecting plates, building structural members, fittings, and the like. More specifically, the molded product can be used as personal computer housings, mobile phone housings, mobile information terminal housings, portable game machine housings, interior and exterior materials of printers, copiers, etc., conductive coating materials, automobile interior and exterior materials, building exterior materials, resin window frame members, floor materials, piping members, and the like.

Other embodiments of the present invention are enumerated below.

[1] A polyorganosiloxane-containing polymer including: a polymer (A) including a polyorganosiloxane (A1) and a first vinyl polymer (A2): and a second vinyl polymer (B),
wherein the polymer (A) has a sea-island structure with the polyorganosiloxane (A1) as a sea component and the first vinyl polymer (A2) as an island component, as confirmed by observation using a transmission electron microscope with respect to a cross section of a resin piece obtained by dispersing the polyorganosiloxane-containing polymer in a liquid epoxy resin, followed by curing the resin; and a proportion of particles of the polyorganosiloxane-containing polymer, which satisfy formula (1), is less than 60% with respect to the total number of the particles:

$$M/L>0.1 \quad (1),$$

wherein L is a diameter of each particle of the polyorganosiloxane-containing polymer, as determined in the observation, and M is a maximum domain length of the polyorganosiloxane (A1) included in the particle in the observation.

[2] The polyorganosiloxane-containing polymer according to [1], wherein a proportion of the polyorganosiloxane (A1) is 1% by mass or more and 50% by teas or less with respect to 100% by mass of the polyorganosiloxane-containing polymer.

[3] The polyorganosiloxane-containing polymer according to [1] or [2], wherein a proportion of the polyorganosiloxane (A1) is 1% by mass or more and 10% by mass or less with respect to 100% by mass of the polyorganosiloxane-containing polymer.

[4] The polyorganosiloxane-containing polymer according to any one of [1] to [3], which has a number average particle diameter of 10 mu or more and 150 nm or less.

[5] The polyorganosiloxane-containing polymer according to any one of [1] to [4], a part of which is insoluble in tetrahydrofuran, wherein a proportion of the polyorganosiloxane-containing polymer which is insoluble in tetrahydrofuran is 80% by mass or more and less than 100% by mass with respect to 100% by mass of the polyorganosiloxane-containing polymer.

[6] The polyorganosiloxane-containing polymer according to any one of [1] to [5], a part of which is soluble in tetrahydrofuran, wherein weight average molecular weight of the polyorganosiloxane-containing polymer which is soluble in tetrahydrofuran is 20,000 or more and 500,000 or less.

[7] The polyorganosiloxane-containing polymer according to any one of [1] to [6], wherein the sea-island structure has multiple domains of the first vinyl polymer (A2) included in a domain of the polyorganosiloxane (A1).

[8] The polyorganosiloxane-containing polymer to any one of [1] to [7], which has a sea-island structure with the polyorganosiloxane (A1) as a sea component and the first vinyl polymer (A2) as an island component, as confirmed by observation using a transmission electron microscope with respect to a cross section of a resin piece obtained by dispersing the polyorganosiloxane-containing polymer in a liquid epoxy resin, followed by curing the resin.

[9] The polyorganosiloxane-containing polymer according to any one of [1] to [8], wherein a proportion of the polymer (A) is 60% by mass or more and 95% by mass or less with respect to 100% by mass of the polyorganosiloxane-containing polymer.

[10] The polyorganosiloxane-containing polymer according to any one of [1] to [9], wherein the first vinyl polymer (A2) includes a vinyl monomer component (a2) including a (meth)acrylate monomer.

[11] The polyorganosiloxane-containing polymer according to any one of [1] to [10], wherein the second vinyl polymer (B) includes a vinyl monomer component (b) including at least one selected from the group consisting of a (meth)acrylate monomer and an aromatic vinyl monomer, wherein
a proportion of total amount of the (meth)acrylate monomer and the aromatic vinyl monomer is 50% by mass or more with respect to 100% by mass of the vinyl monomer component (b).

[12] The polyorganosiloxane-containing polymer according to any one of [1] to [11], wherein the second vinyl polymer (B) comprises a vinyl monomer component (b) including methyl methacrylate, wherein
a proportion of the methyl methacrylate is 50% by mass or more with respect to 100% by mass of the vinyl monomer component (b).

[13] The polyorganosiloxane-containing polymer according to any one of [1] to [12], wherein the polymer (A) is a polymer obtained by polymerizing a vinyl monomer component (a2) for the first vinyl polymer (A2) in the presence of a latex containing the polyorganosiloxane (A1).

[14] A composition comprising: the polyorganosiloxane-containing polymer of any one of [1] to [13]; and at least one component selected from the group consisting of a phosphoric acid compound and an alkali metal salt thereof.

[15] The composition according to [14], wherein the alkali metal salt of the phosphoric acid compound is at least one selected from the group consisting of an alkali metal salt of an alkyl phosphate and an alkali metal salt of an alkyl aryl phosphate.

[16] The composition according to [14] or [15], wherein the alkali metal salt of the phosphoric acid compound is an alkali metal salt of a polyoxyalkylene alkyl ether phosphate.

[17] The composition according to any one of [14] to [16], wherein an amount of phosphorus atoms contained in the at least one component selected from the group consisting of a phosphoric acid compound and an alkali metal salt thereof is 100 ppm by mass or more, in terms of a mass proportion thereof relative to total 100% by mass of the polyorganosiloxane-containing polymer and the at least one component.

[18] A resin composition comprising: the polyorganosiloxane-containing polymer of any one of [1] to [13]; and a thermoplastic resin.

[19] A resin composition including: the composition of any one of [14] to [17]; and a thermoplastic resin.

[20] The resin composition according to [18] or [19], wherein the thermoplastic resin comprises at least one selected from the group consisting of aromatic polycarbonate, polymethyl methacrylate, styrene-acrylonitrile copolymer, polyethylene terephthalate, polybutylene terephthalate, polyvinyl chloride, polyphenylene sulfide and polyacetal.

[21] A molded product including the polyorganosiloxane-containing polymer of any one of [1] to [13].

EXAMPLES

Hereinbelow, the present invention will be described in more detail with reference to the Production Examples and Examples. Production Examples 1-1 to 1-2 and 2-1 to 2-20 are production examples for the polyorganosiloxane (A1), the polymer (A), the polymer particles (C) and the composition. With regard to the units used herein, "parts" means "parts by mass", "%" means "% by mass", and "ppm" means "ppm by mass". Also, various measurement methods are described below.

[Measurement of Solid Content]

A polyorganosiloxane latex having a weight w1 is dried in a hot air dryer at 180° C. for 30 minutes, the weight w2 of the residue after drying is measured, and the solid content [%] is calculated by the following formula (e).

$$\text{Solid content}[\%]=w2/w1\times100 \quad (e)$$

[Measurement of Particle Diameter]

Using, a sample obtained by diluting the "polyorganosiloxane (A1) latex" or "polymer particles (C) latex" with deionized water to a concentration of about 3% in terms of solid content, the number average particle diameter Dn and the mass average particle diameter Dw were measured under the following conditions with the above-mentioned CHDF2000 particle size distribution analyzer manufactured by MATEC inc., USA.

Cartridge: Customized capillary type cartridge for particle separation (trade name: C-202)
Carrier liquid: Customized carrier liquid (trade name: 2XGR500)
pH of carrier liquid: Neutral
Carrier liquid flow rate: 1.4 mL/min
Carrier liquid pressure: 4.000 psi (2,600 kPa)
Measurement temperature: 35° C.
Volume of sample used: 0.1

[Powder Recovery Method]

Powder recovery of the polymer particles (C) was carried out by either the following coagulation method (described as G in Tables 1 and 2) or the following spray recovery method (described as S in Tables 1 and 2).

Coagulation method: 630 parts of an aqueous solution of calcium acetate having a concentration of 0.8% was heated to 50° C., and the polymer particles (C) latex was gradually added dropwise to the aqueous solution with stirring to cause coagulation. The obtained polymer particles (C) were filtered, washed, dehydrated, and then dried to obtain a powder of the polymer particles (C).

Spray recovery method: The polymer particles (C) latex was spray-dried using an atomizer-type spray dryer (L8 spray dryer manufactured by Okawara Kakoki Co., Ltd.) under the following treatment conditions to obtain a powder of the polymer particles (C).

<Spray Drying Treatment Conditions>
Atomization method: Rotating disc type
Disk rotation speed: 25000 rpm
Hot air temperature: inlet temperature: 130° C., outlet temperature: 60° C.

[Measurement of THF Insoluble Fraction]

With respect to the polymer particles (C), the THF-insoluble fraction was measured according to the following method.

(1-1) 0.5 g of a sample is added to 50 mL 04.5 g) of THE to prepare a mixed solution. The Obtained mixed solution is allowed to stand at 25° C. for 8 hours, followed by stirring with a stirrer for 30 minutes, to thereby dissolve the THE-soluble fraction.

(1-2) The mixed solution is placed in a centrifugal tube with its mass having been measured in advance, and centrifugally separated into the THF-insoluble fraction, and a liquid containing the THF-soluble fraction by a centrifuge (16000 rpm, 4 hours).

(1-3) After removing the supernatant containing the THF-soluble fraction. THF is newly added and stirred, and the resulting is centrifuged again in the same manner as in (1-2) above to wash the THF-insoluble fraction.

(1-4) After repeating the above (1-3) twice, the supernatant is removed. The centrifugal tube with the remaining THF-insoluble fraction is immersed in a warm water bath (80° C., 8 hours) to volatilize the THF, and the resulting is vacuum-dried at 65° C. for 6 hours obtain a dry sample (THF-insoluble fraction adhering to the centrifugal tube).

(1-5) The mass of the obtained dry sample (THF-insoluble fraction+centrifugal tube) is measured, and the proportion, $w_{ais}$ (%), of the THF-insoluble fraction is calculated by the following formula:

$$w_{ais}=(w_{ct}-w_{as})/wt\times100 \quad (f),$$

wherein:
wt is the mass of the polyorganosiloxane-containing polymer particles (C) subjected to the measurement,
$w_{as}$ is the mass of the centrifugal tube, and
$w_{ct}$ is the mass of the THF-insoluble fraction (including the mass of the centrifugal tube).

[Measurement of Weight Average Molecular Weight of THF Soluble Fraction]

The weight average molecular weight of the THF-soluble fraction was measured by implementing the following operations (2-1) to (2-3).

(2-1) THF is distilled off under reduced pressure using a rotary evaporator from the liquid containing the THF-soluble fraction collected in the preceding section [Measurement of THF insoluble fraction], to obtain the THF-soluble fraction.

(2-2) The THF-soluble fraction obtained in (2-1) above is dissolved again in THF so as to give a sample concentration of 0.1 to 0.3% by mass, thereby obtaining a THF solution of the THF-soluble fraction.

(2-3) The THF solution of the THF soluble fraction obtained in (2-2) above is subjected to gel permeation chromatography (GPC) measurement, and the weight average molecular weight (Mw) is determined from the standard polystyrene calibration curve.

The measurement conditions for GPC are as follows.
Apparatus: "HLC8220" manufactured by Tosoh Corporation Column: "TSKgel Super Multipore HZ-H" manufactured by Tosoh Corporation (inner diameter 4.6 mm× length 15 cm×2, exclusion limit $4\times10^7$ (estimated value))
Eluent: THF
Eluent flow rate: 0.35 mL/min
Measurement temperature: 40° C.
Sample injection volume: 10 μL

[TEM Image Acquisition and Image Analysis]

The polymer particles (C) were placed in a polyethylene capsule, and a liquid epoxy resin (Epiform (registered trademark) R-2100, H-105, manufactured by Somar Co., Ltd.) was poured thereinto and stirred. The resulting was left to stand at 25° C. for 12 hours to cure the epoxy resin. The resulting resin piece was subjected to leveling and trimming using an ultramicrotome Leica EM UC7 (manufactured by Leica Microsystems, Inc.).

The obtained resin piece was stained with an osmium tetroxide aqueous solution (23° C. 12 hours), and then stained with a ruthenium tetroxide aqueous solution (23° C., 5 hour). Sections were cut out from the stained resin piece under the following conditions; cutting temperature 23° C. cutting speed 0.4 mm/sec, and thickness 50 nm; and collected on a copper grid with a support film.

With respect to the surface of the collected sections, a randomly selected area of 0.5 μm² or more was observed with TEM (H-7600 manufactured by Hitachi Co., Ltd.) at an accelerating voltage of 80 kV and a magnification of 200,000 to obtain a TEM image. In the obtained TEM image, a region of cured epoxy resin (resin region) and particle regions dispersed within this resin region were observed. Further, in the particle region, the polyornosiloxane (A1) portion was confirmed to have a bright contrast, and the vinyl polymer portion was confirmed to have a dark contrast.

From the particle regions observed in one TEM observation image, the particle regions falling under the following categories (i) to (iii) were excluded.

(i) A particle regions cut off at the edge of the image.
(ii) A particle region with a size less than 80% of the average particle diameter.
(iii) A particle region having adjacent particle regions in three or more directions with unclear boundaries therebetween.

Of the remaining particle regions, 80% or more and 50 regions or more were subjected to contrast line profile measurement following the procedures described below to calculate the Z values, and the average value thereof was obtained. In this context, the proportion of the selected particle regions is the proportion of the number of selected particle regions relative to the total number of particle regions confirmed in the image.

From the obtained TEM, image, the diameter L of the particle region and the maximum domain length M of the polyorganosiloxane (A1) were calculated using an image analysis software (ImageJ).

As described above, the diameter L of the particle region was obtained by performing a line profiling so as to cut an axis corresponding to the particle diameter through the central point which is an intersection between the axes respectively corresponding to the major axis and the minor axis of one particle region.

As described above, the maximum domain length M was obtained from the portion having the maximum continuous length among the portions where the contrast value (Gray Value) in one particle region obtained by the line profiling continuously show a value of 75% or more of the maximum value.

From the obtained diameter L and maximum domain length M, the number of particle regions that satisfy the following formula (1) was defined as Z1, the number of particle regions that do not satisfy the formula (1) was defined as Z2, and the Z value (%) was calculated from the following formula (2).

$$M/L>0.1 \tag{1}$$

$$Z\ value[\%]=\{Z1/(Z1+Z2)\}\times 100 \tag{2}$$

<Production Example 1-1> (Production of Polyorganosiloxane (A1-11)

98 parts of a cyclic organosiloxane mixture (manufactured by Shin-Etsu Silicone Co., Ltd., product name: DMC, a mixture of 3- to 6-membered cyclic organosiloxanes) and 2 parts of 3-methacryloxypropylmethyldimethoxysilane (manufactured by Shin-Etsu Silicone Co., Ltd., product name: KBM 502) were mixed to obtain 100 parts of an organosiloxane mixture. An aqueous solution prepared by dissolving 0.7 parts of sodium do decylbenzenesulfonate (DBSNa, manufactured by Kao Corporation, product name: Neopelex G-15, the amount being in terms of solid content) in 300 pans of deionized water was added to the mixture obtained above, and the resulting was stirred at 10,000 rpm for 5 minutes with a homomixer. Then, the resulting was passed twice through a homogenizer at a pressure of 20 MPa to obtain a stable premixed emulsion.

Next, an aqueous solution prepared by dissolving 15 parts of dodecylbenzenesulfonic acid (DBSH, manufactured by Kao Corporation, product name: Neopelex GS) in 90 pans of deionized water was placed in a 5-liter separable flask equipped with a cooling condenser, and the aqueous solution was heated to a temperature of 80° C. Then, the above emulsion was continuously added thereto over 240 minutes to perform a polymerization reaction. The resulting reaction liquid was cooled to 25° C., and a 5% aqueous sodium hydroxide solution was added thereto so as to neutralize the reaction solution to pH 7.0, thereby obtaining a polyorganosiloxane latex (A1-1).

The solid content of the polyorganosiloxane latex (A1-1) was 20% by mass. The number average particle diameter (Dn) of this latex measured by a capillary particle size distribution analyzer was 26 nm, the mass average particle diameter (Dw) was 35 nm, and Dw/Dn was 1.35.

Production Example 1-2

(Production of polyorganosiloxane (A1-2))

98 parts of a cyclic organosiloxane mixture (manufactured by Shin-Etsu Silicone Co., Ltd., product name: DMC, a mixture of 3- to 6-membered cyclic organosiloxanes) and 2 parts of 3-methacryloxypropylmethyldimethoxysilane (KBM-502) were mixed to obtain 100 pans of an organosiloxane mixture. An aqueous solution prepared by dissolving 0.7 parts of sodium dodecylbenzenesulfonate (DBSNa) in 350 parts of deionized water was added to the mixture obtained above, and the resulting was stirred at 10,000 rpm for 5 minutes with a homomixer. Then, the resulting was passed twice through a homogenizer at a pressure of 20 MPa to obtain a stable premixed emulsion.

Next, an aqueous solution prepared by dissolving 4 parts of dodecylbenzenesulfonic acid (DBSH) in 40 parts of deionized water was placed in a 5-liter separable flask equipped with a cooling condenser, and the aqueous solution was heated to a temperature of 80° C. Then, the above emulsion was continuously added thereto over 240 minutes to perform a polymerization reaction. The resulting reaction liquid was cooled to 25° C., and a 5% aqueous sodium hydroxide solution was added thereto so as to neutralize the reaction solution to pH 7.0, thereby obtaining a polyorganosiloxane latex (A1-2).

The solid content of the polyorganosiloxane latex (A1-2) was 18% by mass. The number average particle diameter (Dn) of this latex measured by a capillary particle size distribution analyzer was 67 nm, the mass average particle diameter (Dw) was 83 rent, and Dw/Dn was 1.24.

Production Example 2-1

(Production of Polymer Particles (C-1))

18 pans of the polyorganosiloxane latex (A1-1) obtained in Production Example 1-1 (3.0 pans in terms of polymer content) was collected in a 5-liter separable flask, and 170 parts of deionized water was added thereto and mixed. Then, 76.6 parts of n-butyl acrylate (nBA), 0.4 parts of allyl methacrylate (AMA), 0.3 parts of sodium dodecylbenzenesulfonate (DBSNa) were added to the separable flask, and a nitrogen stream was passed therethrough to purge the flask with nitrogen to provide nitrogen atmosphere inside the flask. Further, the liquid temperature inside the flask was raised to 43° C., and the resulting was stirred for 1 hour.

0.15 parts of potassium persulfate (KPS) was added to initiate radical polymerization. After stirring for 10 hours and confirming a polymerization exothermic peak, the resulting was cooled to 25° C. and held for 15 hours to complete the polymerization, thereby obtaining a composite rubber latex.

This composite rubber latex was heated to 80° C., and 20 parts of methyl methacrylate (MMA) was dropwise added into this latex at a rate of 0.6 parts/minute to initiate graft polymerization reaction. After completion of the dropwise addition, the temperature was kept at 80° C. for 1 hour and then cooled to 25° C. to obtain a latex of polymer particles (C-1).

This latex had a solid content of 35% and the polymerization degree was 99.9% or more. This polymerization rate is the percentage of the polymerized monomer components out of those used in the entire process from the production of the composite rubber to the graft polymerization. The number average particle diameter (Dn) of this latex measured by a capillary particle size distribution analyzer was 94 nm, the mass average particle diameter (Dw) was 105 nm, and Dw/Dn was 1.12.

Then, a powder of the polymer particles (C-1) was obtained by the coagulation method described above. The proportion of the THF-insoluble fraction in the polymer particles (C-1) was 95%. Further, the weight average molecular weight of the THF-soluble fraction was 230,000.

As shown in FIG. 2, the polymer particles (C-1) had a sea-island structure with the polyorganosiloxane (A1) as the sea component and the vinyl polymer (A2) as the island component. Further, the Z value was 8%.

Production Example 2-2

(Production of Polymer Particles (C-2))

The latex of the polymer particles (C-1) obtained in Production Example 2-1 was subjected to powder recovery by the spray drying method described above to obtain the polymer particles (C-2). Since the latex after polymerization is the same latex of the polymer particles (C-1), the particle diameter, the proportion of the THF-insoluble fraction, the weight average molecular weight of the THF-soluble fraction, and the Z value of the polymer particles (C-2) are the same as those of the polymer particles (C-1).

Production Examples 2-3 to 2-6

(Production of Polymer Particles (C-3) to (C-6))

Polymer particles (C-3) to (C-6) were obtained in the same manner as in Production Example 2-1, except for varying the amounts of the monomers used and the powder recovery method, as shown in Table 1. The coagulation temperature for obtaining the polymer powder by the coagulation method was appropriately changed within the range of 50 to 85° C. depending on the powder characteristics emerged.

Production Example 2-7

(Production of Polymer Particles (C-7))

18 parts of the polyorganosiloxane latex (A1-1) obtained in Production Example 1-1 (3.0 parts in terms of polymer content) was collected in a 5-liter separable flask, and 170 parts of deionized water was added thereto and mixed. Then, 66.0 parts of n-butyl acrylate (nBA), 1.0 part of allyl methacrylate (AMA), and 0.3 pans of sodium dodecylbenzenesulfonate (DBSNa) were added to the separable flask, and a nitrogen stream was passed therethrough to purge the flask with nitrogen to provide nitrogen atmosphere inside the flask. Further the liquid temperature inside the flask was raised to 43° C. and the resulting was stirred for 1 hour.

0.15 parts of potassium persulfate (KPS) was added to initiate radical polymerization. After stirring for 10 hours and confirming a polymerization exothermic peak, the resulting was cooled to 25° C. and held for 15 hours to complete the polymerization, thereby obtaining a composite rubber latex.

This composite rubber latex was heated to 80° C. and 7.5 parts of methyl methacrylate (MMA) was dropwise added into this latex at a rate of 0.6 parts/minute to initiate graft polymerization reaction. After completion of the dropwise addition, the resulting was held at 80° C. for 1 hour. Then, after adding 0.04 pans of potassium persulfate (KPS) and stirring for 15 minutes, a mixed solution of 5.6 parts of acrylonitrile (AN), 16.9 parts of styrene (St), and 0.015 parts of n-octyl mercaptan (nOM) was dropwise added into this latex at a rate of 0.3 parts/minute to restart the graft polymerization reaction. After completion of the dropwise addition, the resulting was held at 80° C. for 2 hours, followed by addition of 0.04 pans of potassium persulfate (KPS). The resulting was further stirred for 2 hours, and then cooled to 25° C. to obtain a latex of polymer particles (C-7).

This latex had a solid content of 35% and the polymerization degree was 99.9% or more. This polymerization rate is the percentage of the polymerized monomer components out of those used in the entire process from the production of the composite rubber to the graft polymerization. The number average particle diameter (Dn) of this latex measured by a capillary particle size distribution analyzer was 90 nm, the mass average particle diameter (Dw) was 112 nm, and Dw/Dn was 1.25.

Then, a powder of the polymer particles (C-7) was obtained by the coagulation method described above. The proportion of the THF-insoluble fraction in the polymer particles (C-7) was 95%. Further, the weight average molecular weight of the THF-soluble fraction was 400,000.

Figure 6:
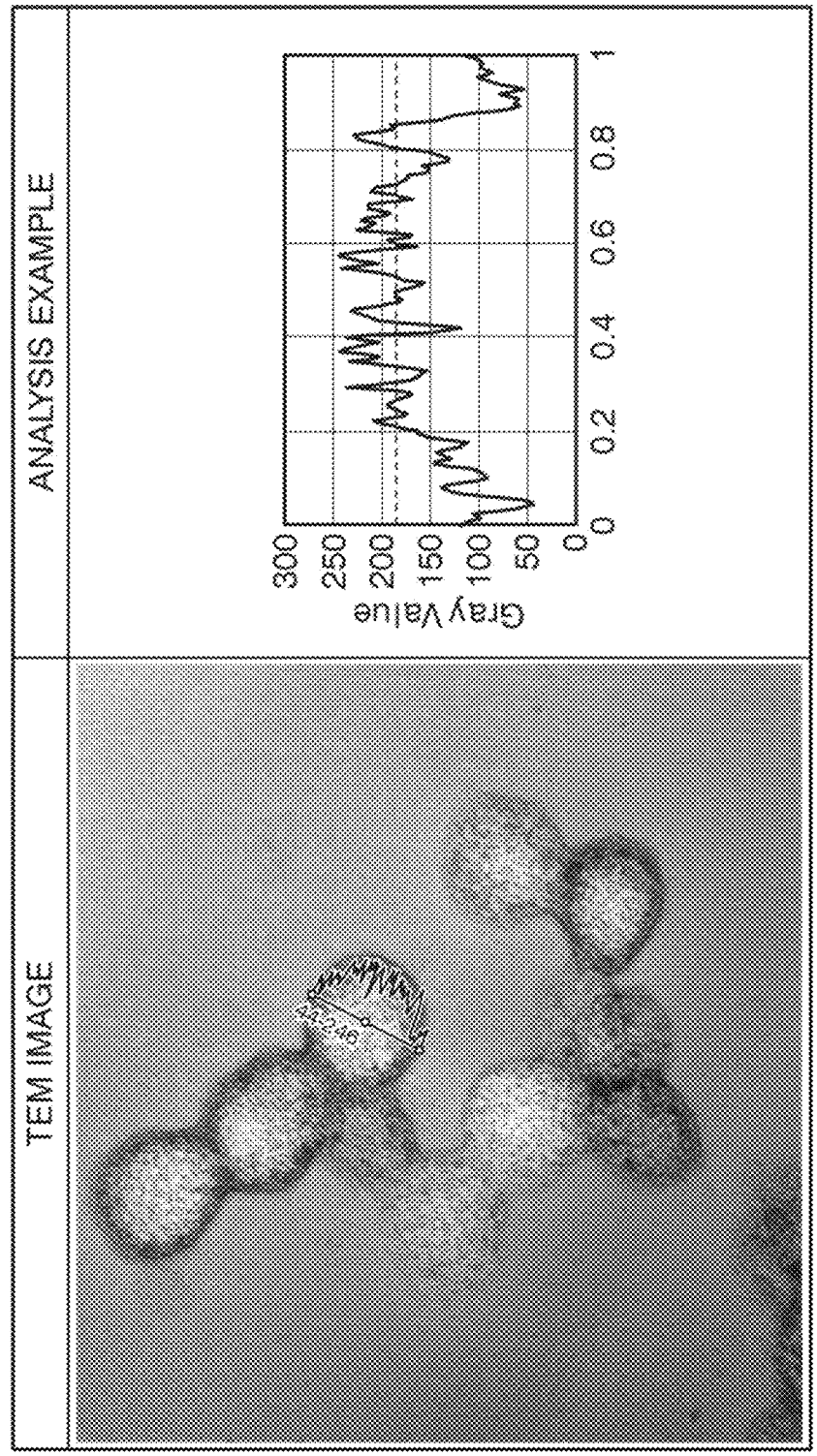
FIG. 6 is an image obtained as a result of brightness image analysis from a transmission electron microscope (TEM) image of polymer particles (C-7) produced in the Examples section.
Figure 7:
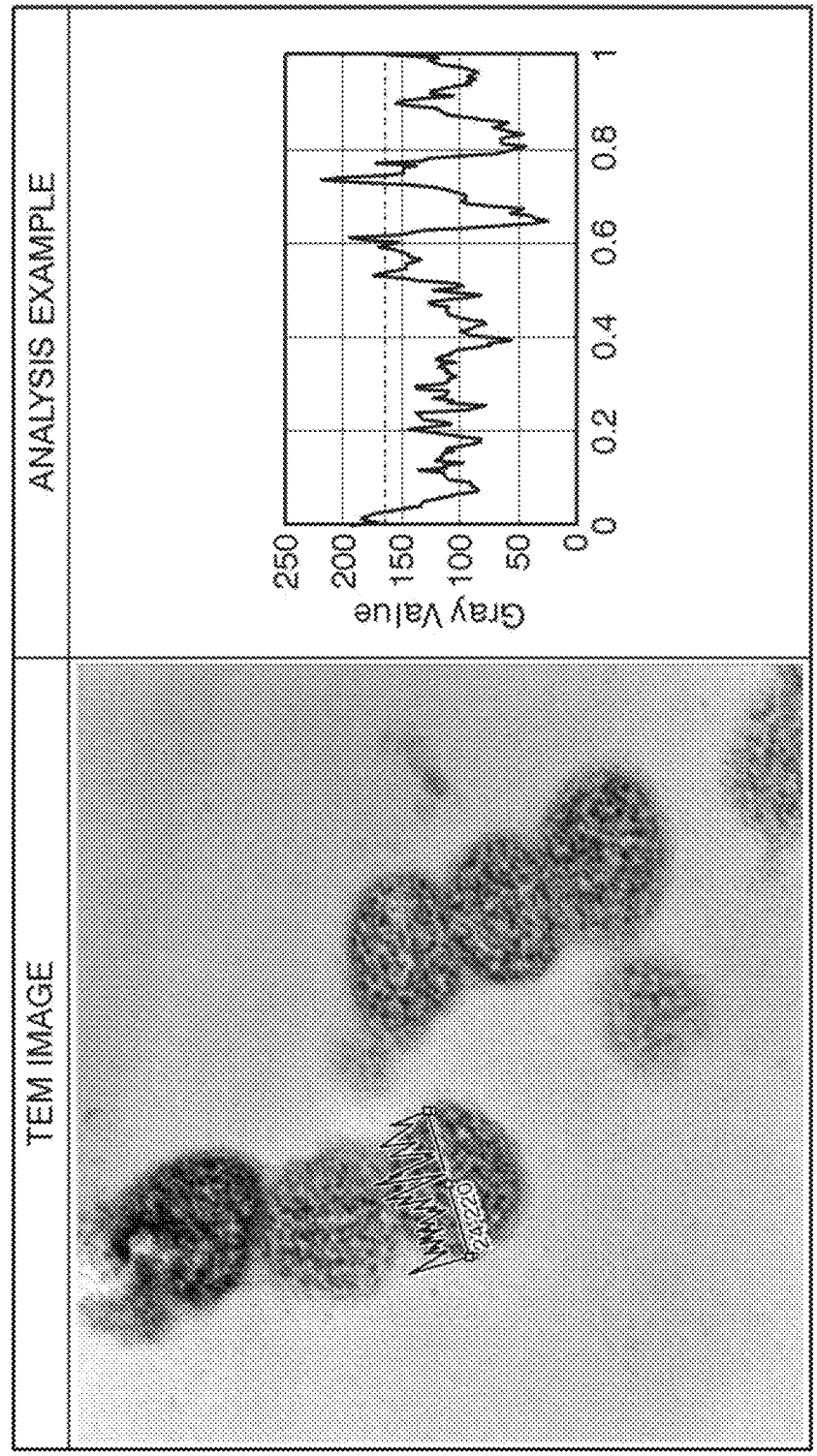
FIG. 7 is an image obtained as a result of brightness image analysis from a transmission electron microscope (TEM) image of polymer particles (C-8) produced in the Examples section.
Figure 8:
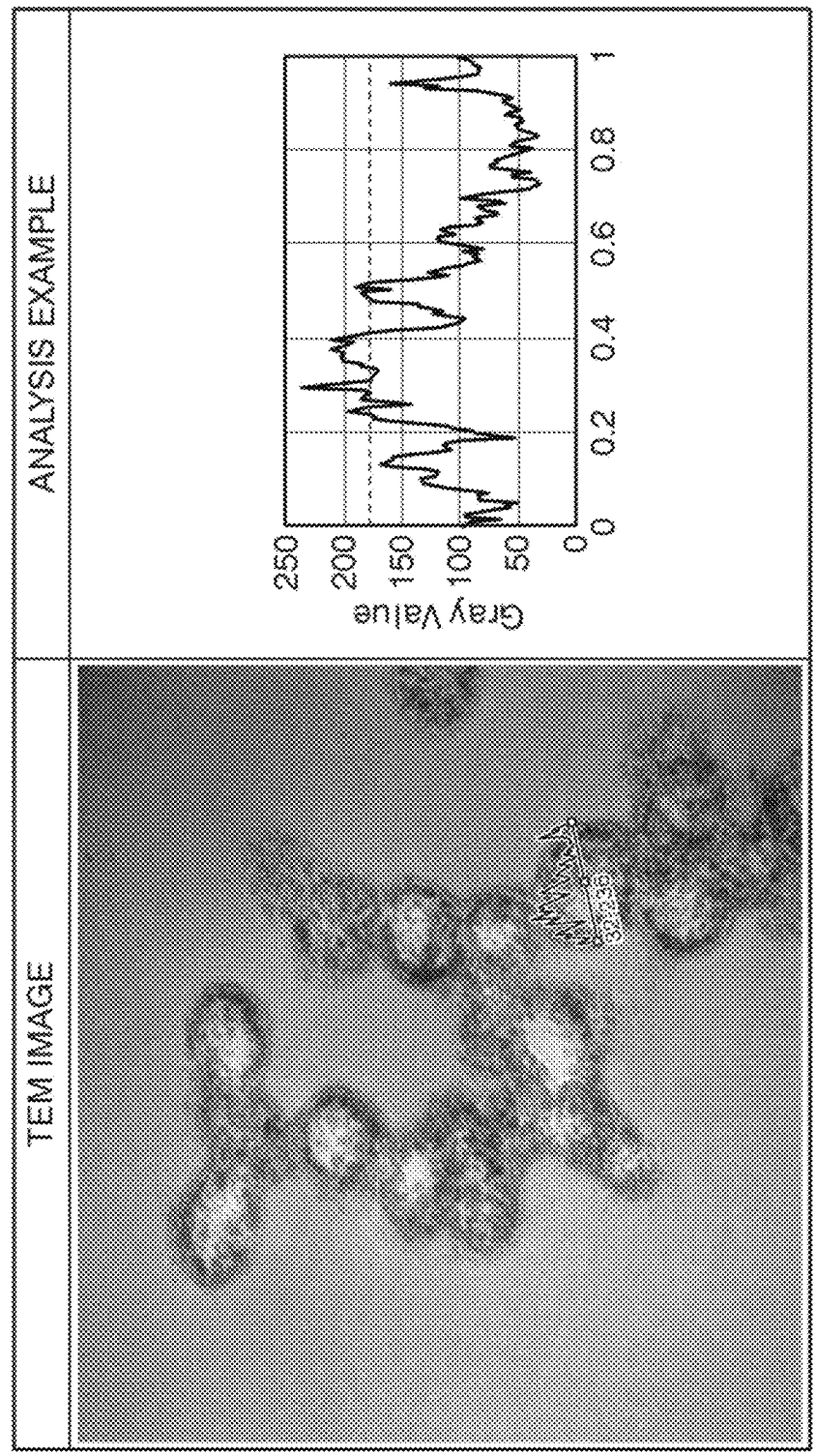
FIG. 8 is an image obtained as a result of brightness image analysis from a transmission electron microscope (TEM) image of polymer particles (C-10 produced in the Examples section.
Figure 9:
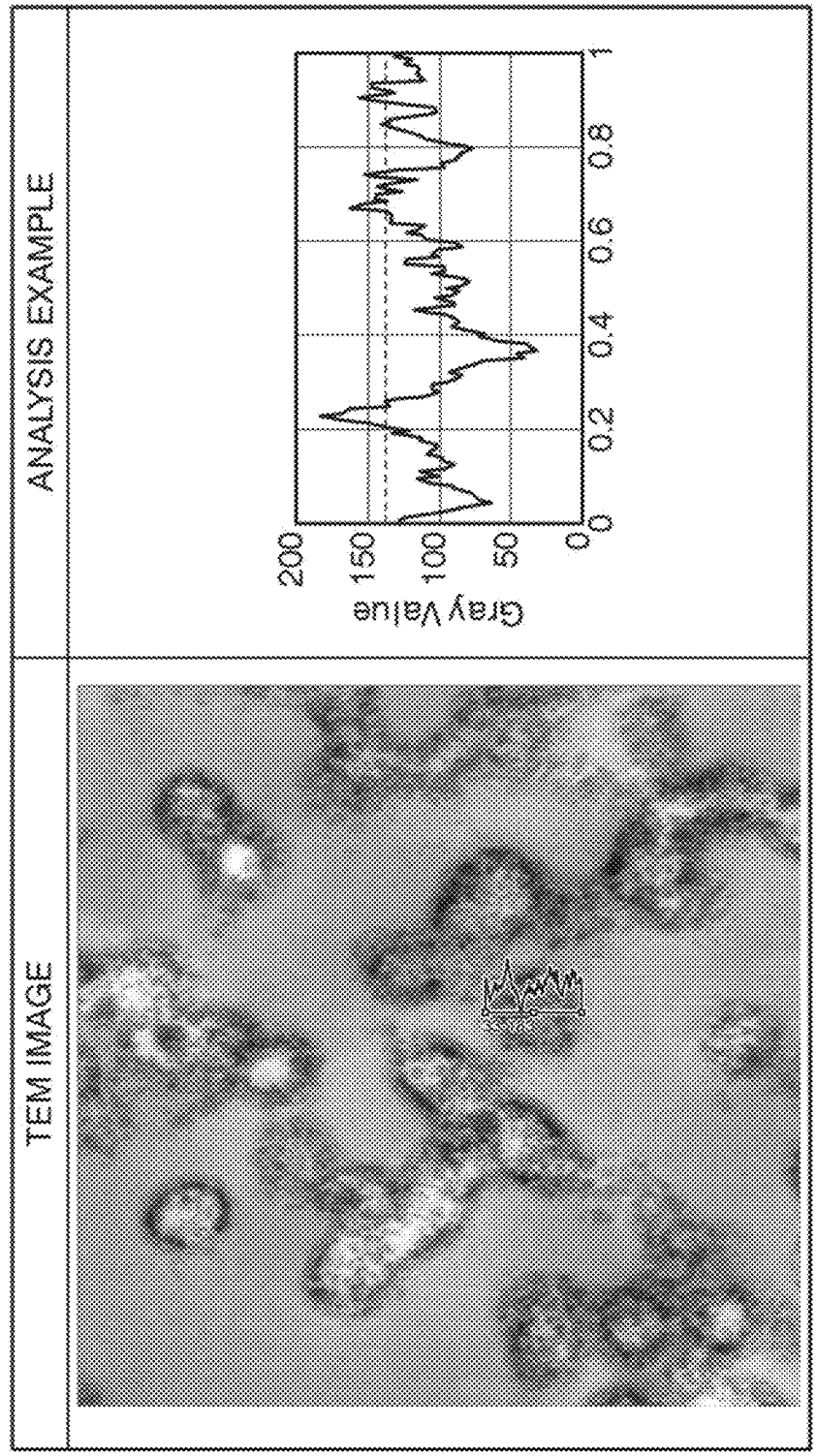
FIG. 9 is an image obtained as a result of brightness image analysis from a transmission electron microscope (TEM) image of polymer particles (C-12) produced in the Examples section.
Figure 10:
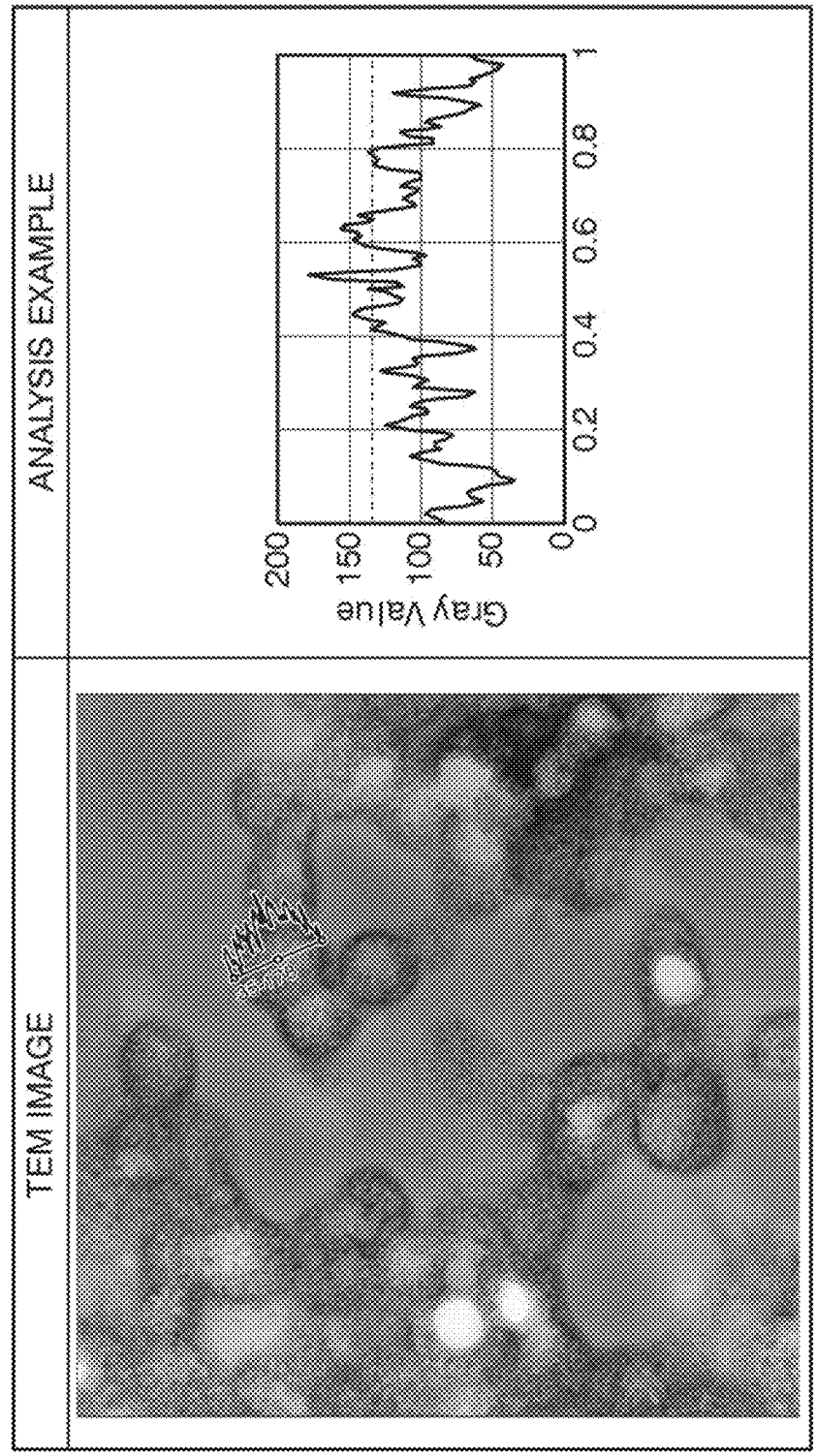
FIG. 10 is an image obtained as a result of brightness image analysis from a transmission electron microscope (TEM) image of polymer particles (C-13) produced in the Examples section.
Figure 11:
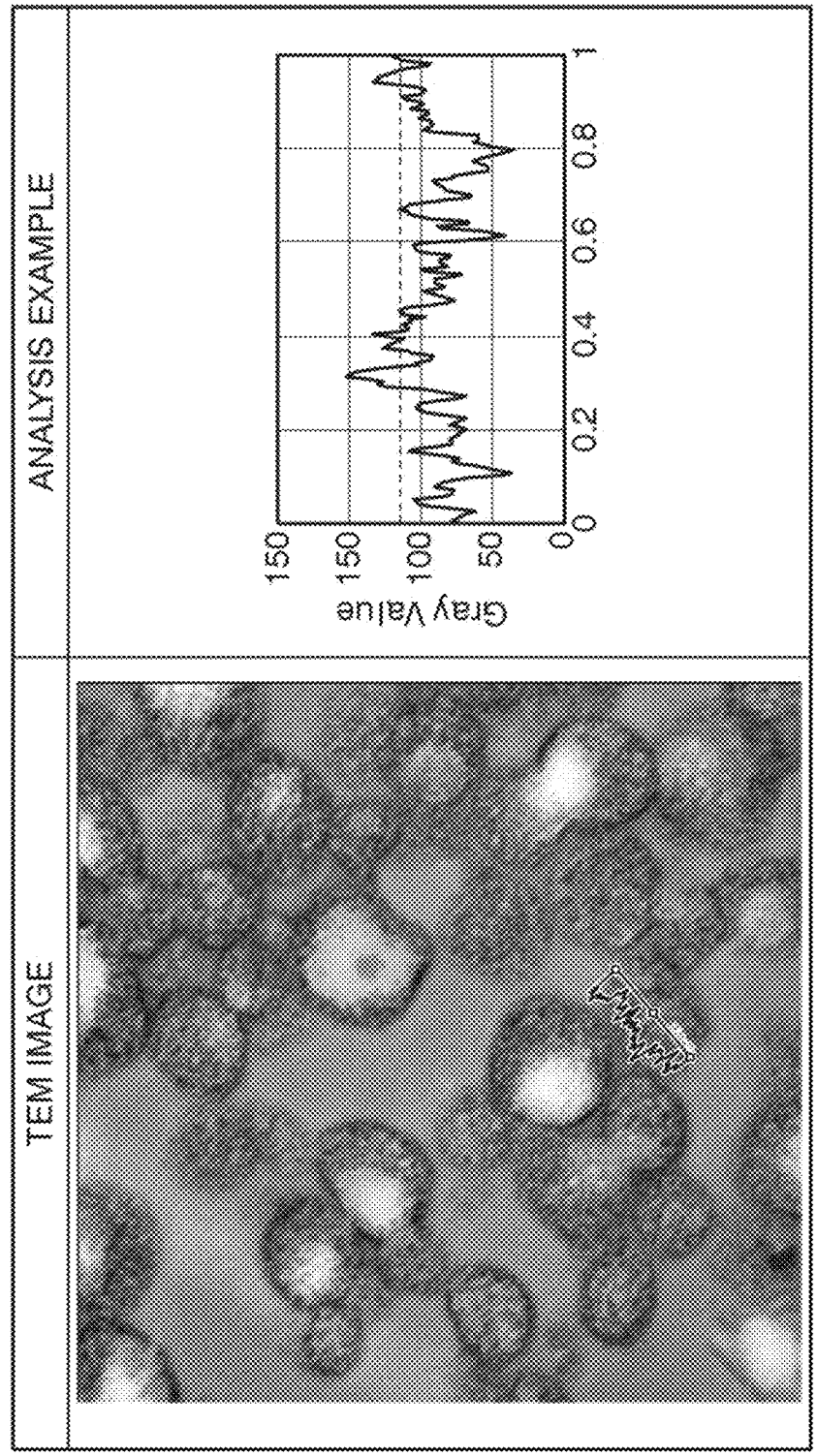
FIG. 11 is an image obtained as a result of brightness image analysis from a transmission electron microscope (TEM) image of polymer particles (C-14) produced in the Examples section.
Figure 12:
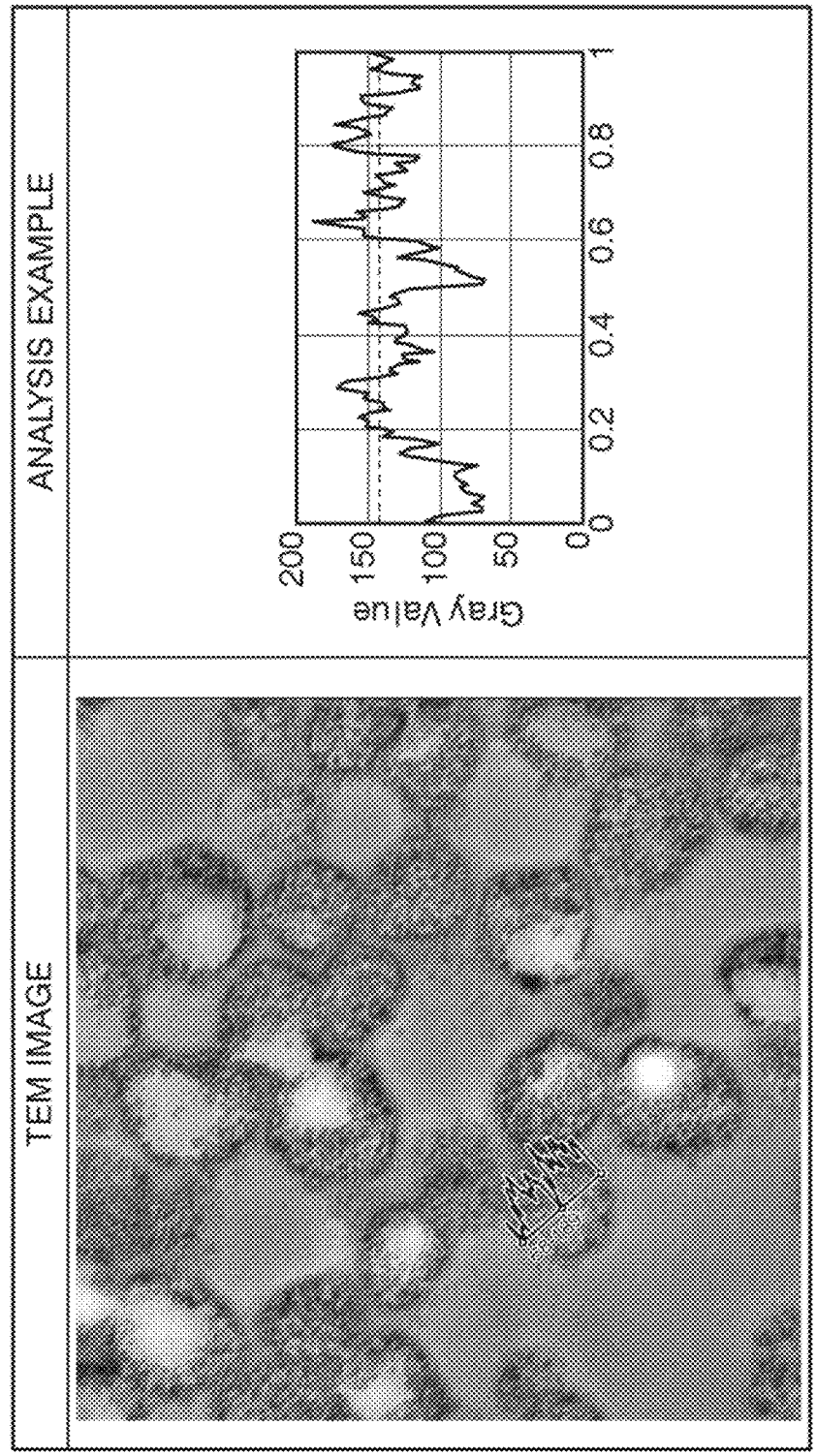
FIG. 12 is an image obtained as a result of brightness image analysis from a transmission electron microscope (TEM) image of polymer particles (C-15) produced in the Examples section.
Figure 13:
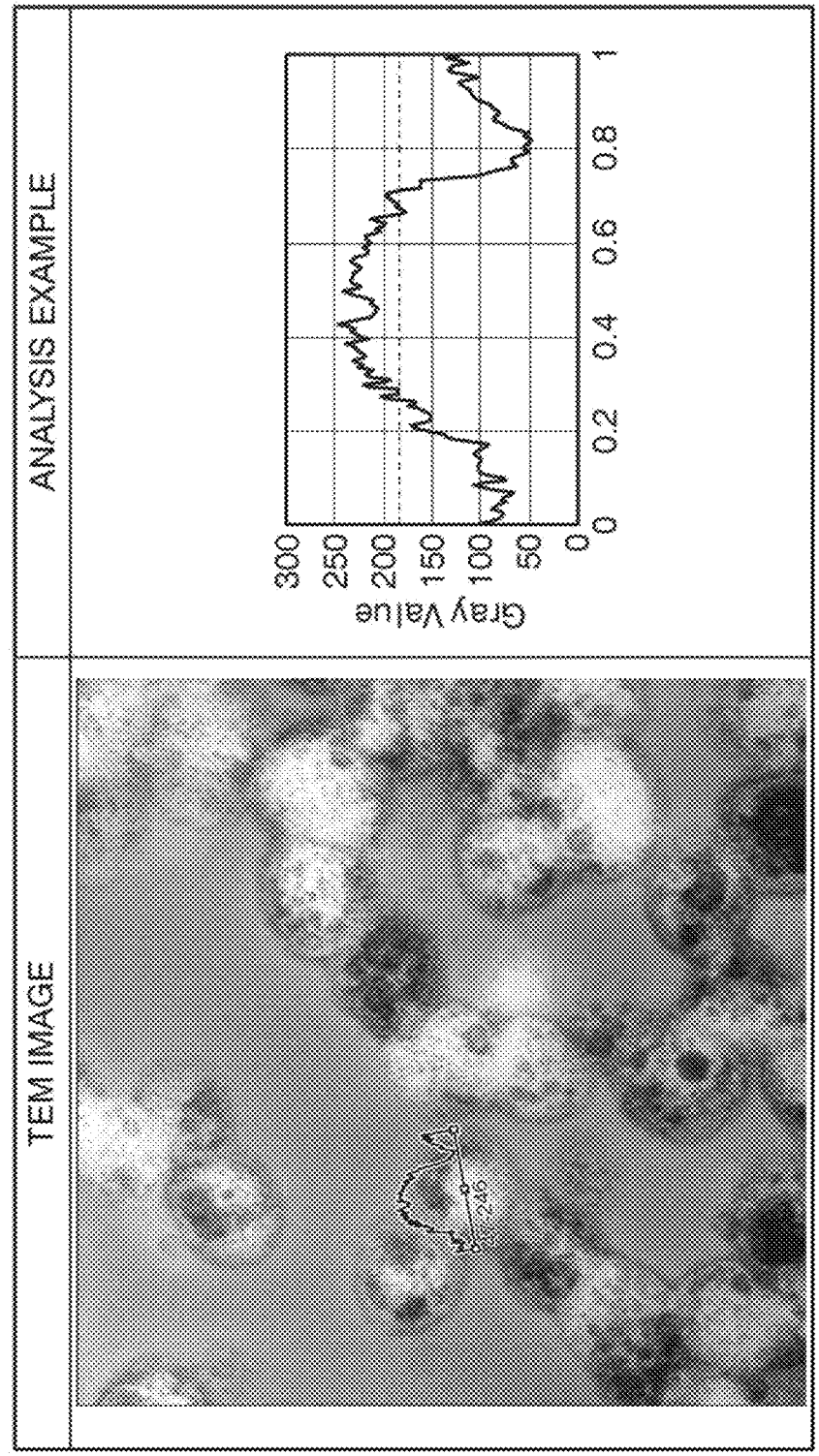
FIG. 13 is an image obtained as a result of brightness image analysis from a transmission electron microscope (TEM) image of polymer particles (C-17) produced in the Examples section.
Figure 14:
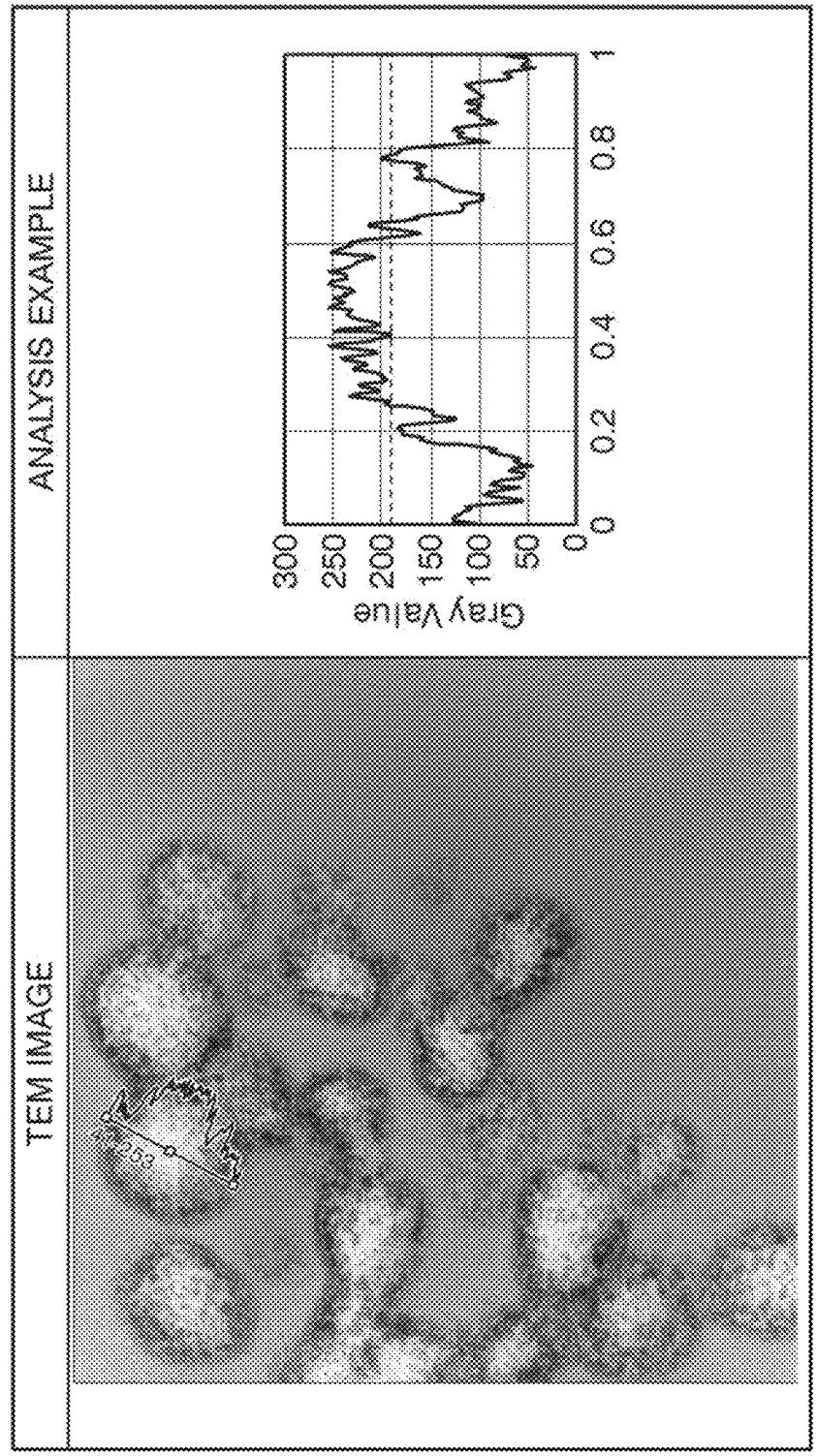
FIG. 14 is an image obtained as a result of brightness image analysis from a transmission electron microscope (TEM) image of polymer particles (C-18) produced in the Examples section.
Figure 15:
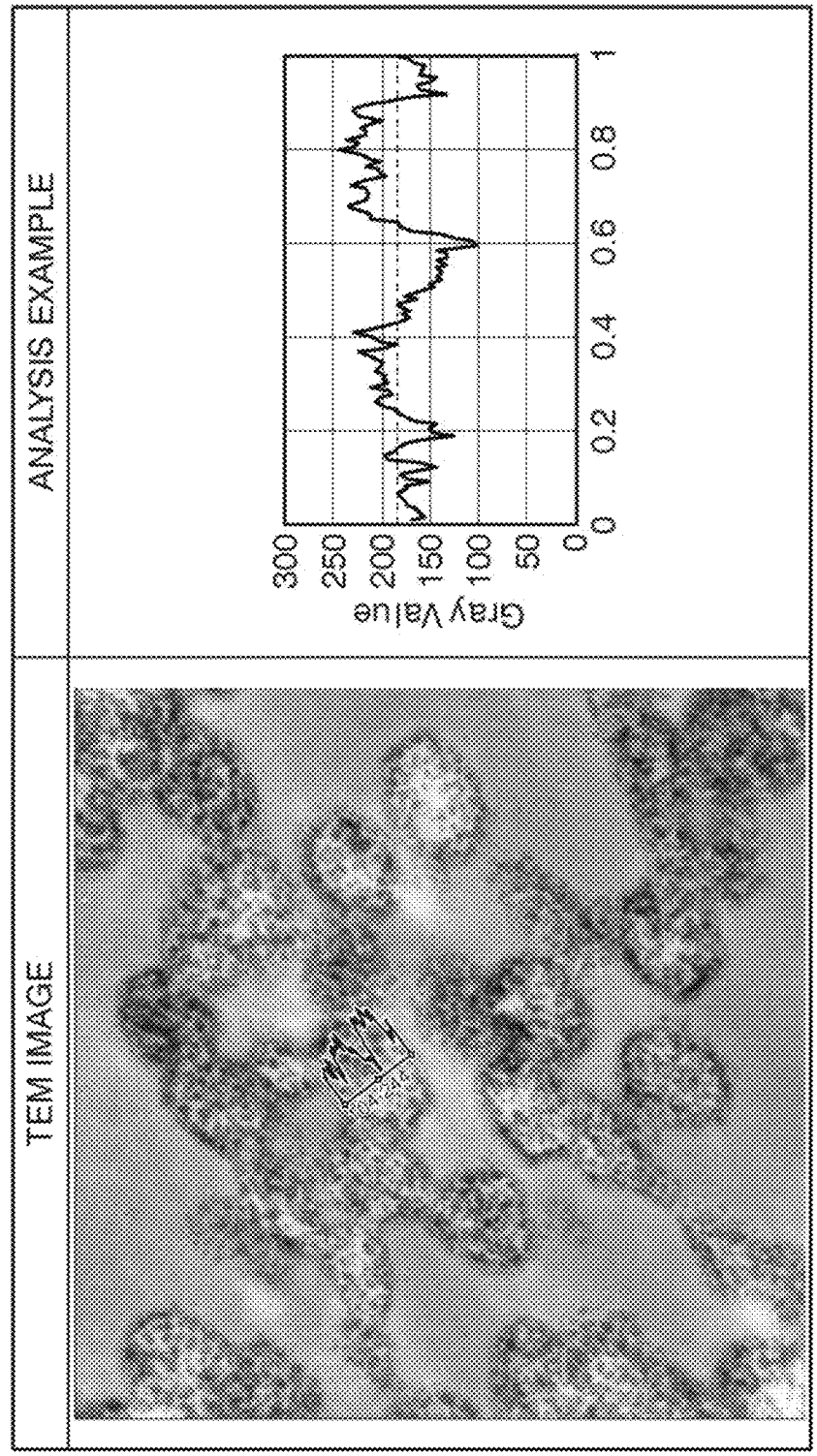
FIG. 15 is an image obtained as a result of brightness image analysis from a transmission electron microscope (TEM) image of polymer particles (C-19) produced in the Examples section.
Figure 16:
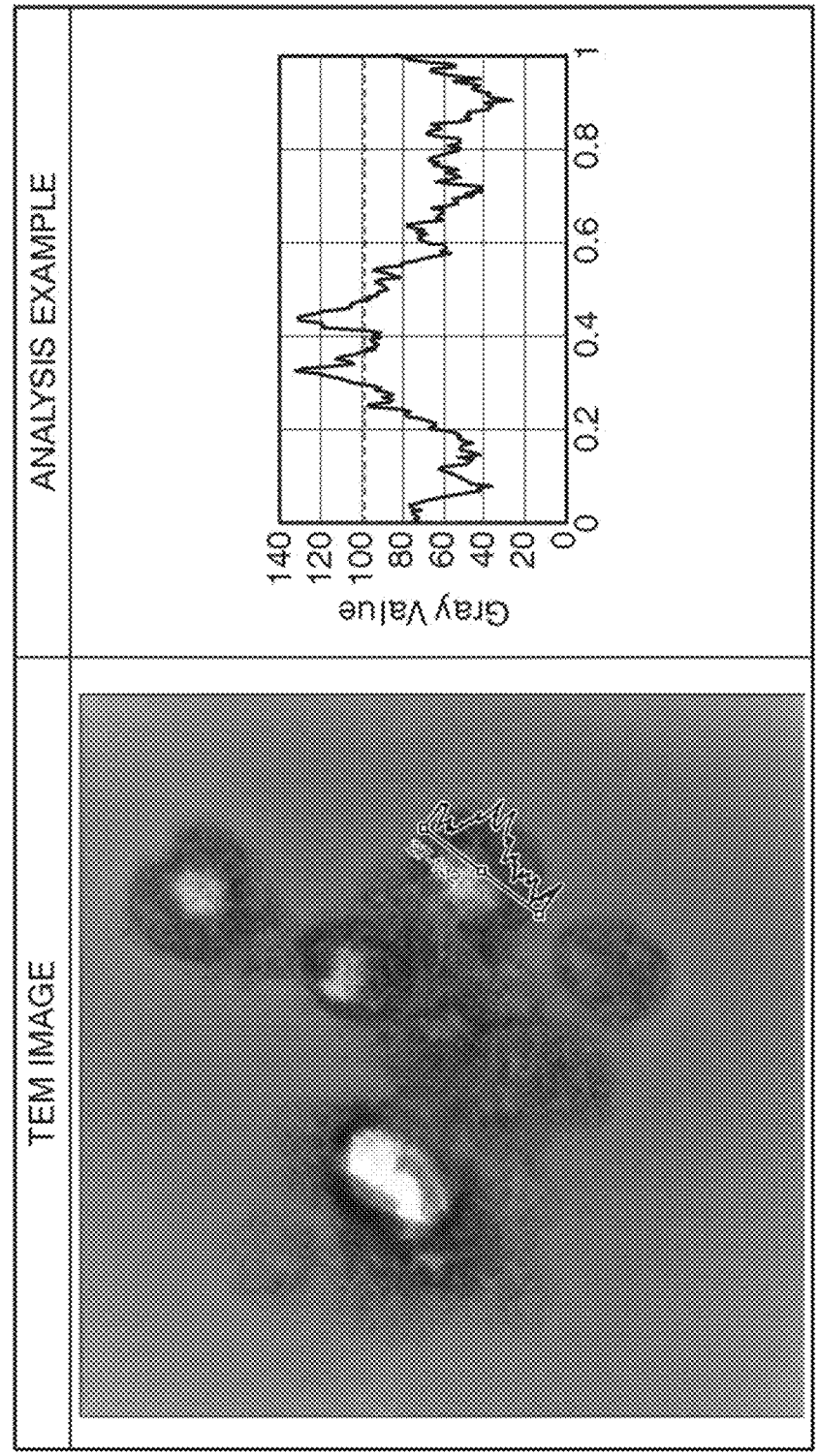
FIG. 16 is an image obtained as a result of brightness image analysis from a transmission electron microscope (TEM) image of polymer particles (C-20) produced in the Examples section.

As shown in FIG. 6, the polymer particles (C-7) had a sea-island structure with the polyorganosiloxane (A1) as the sea component and the vinyl polymer (A2) as the island component. Further, the Z value was 8%.

Production Example 2-8

(Production of Polymer Particles (C-8))

A powder of polymer particles (C-8) was obtained in the same manner as in Production Example 2-7, except for varying the amounts of the monomers used, as shown in Table 1.

Production Examples 2-9 and 2-10

(Production of Polymer Particles (C-9) and (C-10))

To the latex of the polymer particles (C-1) obtained in Production Example 2-1, sodium tridecyloxyethylene phosphate (RS-610Na, manufactured by Toho Chemical Industry Co., Ltd., product name: Phosphanol (registered trademark) RS-610Na, polyoxyethylene alkyl phosphate in which the alkyl group is a tridecyl group, number of oxyethylene units in the polyoxyethylene group: 6) was added as component (D) in amounts (in terms of solid content) described in Table 1 to obtain a latex of the composition (C-9) and a latex of the composition (C-10).

Then, the obtained latexes was respectively powdered by the coagulation method to obtain a powder of the composition (C-9) and a powder of the composition (C-10).

With respect to the polymer particles (C-1) in each of the compositions (C-9) and (C-10), the proportion of THF-insoluble fraction was 95%, the weight average molecular weight of THF-soluble fraction was 230,000, and the Z value was 8%.

The phosphorus atom content relative to the total mass of the polymer particles (C-1) and the additional emulsifier was 230 ppm for the composition (C-9) and 490 ppm for the composition (C-10). The phosphorus atom content of the polymer (C-1) obtained in Production Example 2-1 was less than 16 ppm.

Production Examples 2-11 and 2-12

(Production of Polymer Particles (C-11) and (C-12))

Powders of polymer particles (C-11) and (C-12) were obtained in the same manner as in Production Example 2-1, except for varying the types and amounts of the polyorganosiloxane latex, monomers and emulsifier used, as shown in Table 2. The coagulation temperature for obtaining each powder was appropriately changed within the range of 55 to 95° C.: depending on the powder characteristics emerged.

Production Examples 2-13 to 2-15

(Production of Polymer Particles (C-13) to (C-15))

Powders of polymer particles (C-13) to (C-15) were obtained in the same manner as in Production Example 2-7, except for varying the types and amounts of the polyorganosiloxane latex, monomers and emulsifier used, as shown in Table 2. The coagulation temperature for obtaining each powder was appropriately changed within the range of 55 to 75° C.: depending on the powder characteristics emerged.

Production Example 2-16

(Production of Polymer Particles (C-16))

5.0 parts of n-butyl acrylate (nBA), 0.03 parts of allyl methacrylate (AMA), 0.3 parts of sodium dodecylbenzenesulfonate (DBSNa) and 160 parts of deionized water were placed in a 5-liter separable flask, and a nitrogen stream was passed therethrough while stirring for 1 hour to purge the flask with nitrogen to provide nitrogen atmosphere inside the flask.

After raising the liquid temperature to 80° C., 0.05 parts of potassium persulfate (KPS) was added, and the resulting was stirred for 180 minutes, then cooled to 25° C. and allowed to stand for 18 hours.

Next, 74.6 parts of n-butyl acrylate (nBA), 0.37 pans of allyl methacrylate (AMA) and 0.4 parts of sodium dodecylbenzenesulfonate (DBSNa) were added, and the resulting was stirred at 25° C. for 90 minutes while passing a stream of nitrogen therethrough. Then, the liquid temperature was raised to 43° C. and the resulting was stirred for 1 hour.

0.15 parts of potassium persulfate (KPS) was added to initiate radical polymerization. After stirring for 10 hours and continuing a polymerization exothermic peak, the resulting was cooled to 25° C. and held for 15 hours to complete the polymerization, thereby obtaining a composite rubber latex.

This composite rubber latex was heated to 80° C. and 20 parts of methyl methacrylate (MMA) was dropwise added into this latex at a rate of 0.6 parts/minute to initiate graft polymerization reaction. After completion of the dropwise addition, the temperature was kept at 80° C.: for 1 hour and then cooled to 25° C. to obtain a latex of polymer particles (C-16).

This latex had a solid content of 35% and the polymerization degree was 99.9% or more. This polymerization degree is the percentage of the polymerized monomer components out of those used in the entire process from the production of the acrylic rubber to the graft polymerization. The number average particle diameter (Dn) of this latex measured by a capillary particle size distribution analyzer was 88 mu, the mass average particle diameter (Dw) was 94 nm, and Dw/Dn was 1.07.

Then, the obtained product was powdered by the coagulation method described above to obtain a powder of polymer particles (C-16). The proportion of the THF-insoluble fraction in the polymer particles (C-16) was 96%. Further, the weight average molecular weight of the THF-soluble fraction was 170,000. Since the polymer particles (C-16) did not contain the polyorganosiloxane (A1) and were a polymer of only the vinyl polymer (A2), TEM observation was omitted.

Production Example 2-17

(Production of Polymer Particles (C-17))

A latex of polymer particles (C-17) was obtained in the same manner as in Production Example 2-1, except for varying the amounts of the monomers used, as shown in Table 2.

This latex had a solid content of 35% and the polymerization degree was 99.9% or more. Further, the number average particle diameter (Dn) measured by a capillary particle size distribution analyzer was 98 nm, the mass average particle diameter (Dw) was 108 nm, and Dw/Dn was 1.11.

Then, the obtained product was powdered by the coagulation method described above to obtain a powder of polymer particles (C-17). The proportion of the THF-insoluble fraction in the polymer particles (C-17) was 79%. Further, the weight average molecular weight of the THE-soluble fraction was 410,000. The Z value was 68%.

Production Example 2-18

(Production of Polymer Particles (C-18))

18 parts of the polyorganosiloxane latex (A1-1) obtained in Production Example 1-1 (3.0 parts in terms of polymer content) was collected in a 5-liter separable flask, and 220 parts of deionized water was added thereto and mixed. Then, 76.6 parts of n-butyl acrylate (nBA), 0.4 parts of allyl methacrylate (AMA), 0.3 pans of sodium dodecylbenzenesulfonate (DBSNa) were added to the separable flask, and a nitrogen stream was passed therethrough to purge the flask with nitrogen to provide nitrogen atmosphere inside the flask. Further, the liquid temperature inside the flask was raised to 65° C. and the resulting was stirred for 1 hour.

0.25 parts of potassium persulfate (KPS) was added to initiate radical polymerization. Thereafter, the liquid temperature was raise to 80° C. and held for 1 hour to complete the polymerization and obtain a composite rubber latex.

While maintaining the liquid temperature of this latex at, 80 GC, 20 parts of methyl methacrylate (MMA) was dropwise added into this latex at a rate of 0.6 parts/minute to initiate graft polymerization reaction. After completion of the dropwise addition, the temperature was kept at 80° C. for 1 hour and then cooled to 25° C. to obtain a latex of polymer particles (C-18).

This latex had a solid content of 30% and the polymerization rate was 99.9% or more. Further, the number average particle diameter (Dn) measured by a capillary particle size distribution analyzer was 98 nm, the mass average particle diameter (Dw) was 113 nm, and Dw/Dn was 1.16.

Next, 630 parts of an aqueous solution having a calcium acetate concentration of 0.8% by mass was heated to 70° C., and the obtained graft copolymer latex was gradually dropped into the aqueous solution while stirring to cause coagulation. The resulting graft copolymer was filtered, washed, dehydrated, and dried to obtain a powder of polymer particles (C-18). The proportion of the THF-insoluble fraction in the polymer particles (C-18) was 93%. Further, the weight average molecular weight of the THF-soluble fraction was 190.000. The Z value was 66%.

Production Example 2-19

(Production of Polymer Particles (C-19))

18 parts of the polyorganosiloxane latex (A1-1) obtained in Production Example 1-1 (3.0 parts in teens of polymer content) was collected in a 5-liter separable flask, and 155 parts of deionized water was added thereto and mixed. Then, 76.6 parts of n-butyl acrylate (nBA), 0.4 parts of ally) methacrylate (AMA), 0.15 parts of t-butyl hydroperoxide (t-BH), and 0.3 parts of sodium dodecylbenzenesulfonate (DBSNa) were added to the separable flask, and a nitrogen stream was passed therethrough to purge the flask with nitrogen to provide nitrogen atmosphere inside the flask. Further, the liquid temperature inside the flask was raised to 50° C., and the resulting was stirred for 1 hour.

5 parts of deionized water in which 0.0005 pans of ferrous sulfate heptahydrate (Fe), 0.0015 parts of ethylenediaminetetraacetic acid disodium salt dihydrate (EDTA), and 0.2 parts of sodium formaldehyde sulfoxylate (SFS) were dissolved was added all at once to initiate radical polymerization. Thereafter, the resulting was held for 1 hour to complete the polymerization and obtain a composite rubber latex.

While maintaining the liquid temperature of this latex at 50° C., a mixed solution of 20 parts of methyl methacrylate (MMA) and 0.05 parts of t-butyl hydroperoxide (t-BH) was added dropwise at a rate of 0.6 parts/minute to initiate graft polymerization reaction. After completion of the dropwise addition, the temperature; was kept at 50° C. for 1 hour and then cooled to 25° C. to obtain a latex of polymer particles (C-19).

This latex had a solid content of 35% and the polymerization rate was 99.9% or more. The number average particle diameter (Dn) of this latex measured by a capillary particle size distribution analyzer was 96 rent, the mass average particle diameter (Dw) was 106 nm, and Dw/Dn was 1.11.

Next, 630 parts of an aqueous solution having a calcium acetate concentration of 0.8% by mass was heated to 70° C., and the obtained graft copolymer latex was gradually dropped into the aqueous solution while stirring to cause coagulation. The resulting graft copolymer was filtered, washed, dehydrated, and dried to obtain a powder of polymer particles (C-19). The proportion of the THF-insoluble fraction in the polymer particles (C-19) was 93%. Further, the weight average molecular weight of the THF-soluble fraction was 170,000. The Z value was 96%.

Production Example 2-20

(Production of Polymer Particles (C-20))

A powder of polymer particles (C-20) was obtained in the same manner us in Production Example 2-19, except for varying the amounts of the monomers used, as shown in Table 2. The proportion of the THF-insoluble fraction in the polymer particles (C-20) was 85%. Further, the weight average molecular weight of the THF-soluble fraction was 150,000. The Z value was 68%.

TABLE 1

| | | Production Example | | | | | | | | | |
|---|---|---|---|---|---|---|---|---|---|---|---|
| | | 2-1 | 2-2 | 2-3 | 2-4 | 2-5 | 2-6 | 2-7 | 2-8 | 2-9 | 2-10 |
| Polymer particles (C) or composition | | (C-1) | (C-2) | (C-3) | (C-4) | (C-5) | (C-6) | (C-7) | (C-8) | (C-9) | (C-10) |
| Polyorganosiloxane (A1): in terms of amount of polymer | (A1-1) | 3.0 | 3.0 | 3.0 | 3.0 | 3.0 | 3.0 | 3.0 | 3.0 | 3.0 | 3.0 |
| | (A1-2) | — | — | — | — | — | — | — | — | — | — |
| Vinyl monomer component (a2) | nBA | 76.6 | 76.6 | 66.7 | 66.0 | 66.0 | 56.7 | 66.0 | 66.0 | 76.6 | 76.6 |
| | AMA | 0.4 | 0.4 | 0.3 | 1.0 | 1.0 | 0.3 | 1.0 | 1.0 | 0.4 | 0.4 |
| Additional emulsifier | DBSNa | 0.3 | 0.3 | 0.3 | 0.3 | 0.3 | 0.3 | 0.3 | 0.3 | 0.3 | 0.3 |
| Polymerization | KPS | 0.15 | 0.15 | 0.15 | 0.15 | 0.15 | 0.15 | 0.15 | 0.15 | 0.15 | 0.15 |

TABLE 1-continued

|  |  | Production Example |  |  |  |  |  |  |  |  |  |
|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 |
| initiator for vinyl monomer component (a2) | tBH | — | — | — | — | — | — | — | — | — | — |
| Type of reducing agent | Fe | — | — | — | — | — | — | — | — | — | — |
|  | EDTA | — | — | — | — | — | — | — | — | — | — |
|  | SFS | — | — | — | — | — | — | — | — | — | — |
| Polymerization temperature (Tin)[° C.] |  | 43 | 43 | 43 | 43 | 43 | 43 | 43 | 43 | 43 | 43 |
| Polymerization rate (Sp) [Sec] |  | 211 | 211 | 143 | 185 | 186 | 115 | 185 | 185 | 211 | 211 |
| Vinyl monomer component (b) | MMA | 20 | 20 | 30 | 30 | 30 | 40 | 7.5 | 9.3 | 20 | 20 |
|  | AN | — | — | — | — | — | — | 5.6 | 3.1 | — | — |
|  | St | — | — | — | — | — | — | 16.9 | 17.6 | — | — |
|  | nOM | — | — | — | — | — | — | 0.015 | 0.015 | — | — |
| Polymerization initiator for vinyl monomer component (b) | KPS | — | — | — | — | — | — | 0.08 | 0.08 | — | — |
|  | tBH | — | — | — | — | — | — | — | — | — | — |
| Polymerization temperature (Tb)[° C.] |  | 80 | 80 | 80 | 80 | 80 | 80 | 80 | 80 | 80 | 80 |
| Additional emulsifier | RS-610NA | — | — | — | — | — | — | — | — | 0.8 | 1.6 |
| Polymerization characteristics | Solid content [%] | 35 | 35 | 35 | 35 | 35 | 35 | 35 | 35 | 35 | 35 |
|  | Polymerization degree [%] | 99.9> | 99.9> | 99.9> | 99.9> | 99.9> | 99.9> | 99.9> | 99.9> | 99.9> | 99.9> |
| Particle diameter | Dn[nm] | 94 | 94 | 92 | 94 | 93 | 95 | 96 | >89 | 93 | 94 |
|  | Dw[nm] | 105 | 105 | 103 | 105 | 111 | 105 | 112 | 112 | 105 | 105 |
|  | Dw/Dn | 1.12 | 1.12 | 1.11 | 1.12 | 1.19 | 1.11 | 1.25 | 1.25 | 1.12 | 1.12 |
| Powder recovery method |  | G | S | G | G | S | G | G | G | G | G |
| Proportion of THF-insoluble fraction [wt %] |  | 95 | 95 | 96 | 96 | 96 | 88 | 95 | 95 | 95 | 95 |
| Weight average molecular weight of THF soluble fraction [number to be multiplied by 10,000] |  | 23 | 23 | 28 | 17 | 17 | 34 | 40 | 27 | 23 | 23 |
| Z value [%] |  | 8 | 8 | 24 | 13 | 13 | 44 | 8 | 2 | 8 | 8 |

TABLE 2

|  |  | Production Example |  |  |  |  |  |  |  |  |  |
|---|---|---|---|---|---|---|---|---|---|---|---|
|  |  | 2-11 | 2-12 | 2-13 | 2-14 | 2-15 | 2-16 | 2-17 | 2-18 | 2-19 | 2-20 |
| Polymer particles (C) or composition |  | (C-11) | (C-12) | (C-13) | (C-14) | (C-15) | (C-16) | (C-17) | (C-18) | (C-19) | (C-20) |
| Polyorganosiloxane (A1): in terms of amount of polymer | (A1-1) | 5.0 | 10.0 | 14.0 | — | — | — | 3.0 | 3.0 | 3.0 | 3.0 |
|  | (A1-2) | — | — | — | 20.0 | 30.0 | — | — | — | — | — |
| Vinyl monomer component (a2) | nBA | 74.6 | 69.7 | 51.8 | 49.3 | 39.4 | 79.6 | 46.8 | 76.6 | 76.6 | 46.8 |
|  | AMA | 0.4 | 0.4 | 0.8 | 0.7 | 0.6 | 0.4 | 0.2 | 0.4 | 0.4 | 0.2 |
| Additional emulsifier | DBSNa | 0.03 | — | 0.2 | — | — | 0.7 | 0.3 | 0.3 | 0.3 | 0.3 |
| Polymerization initiator for vinyl monomer component (a2) | KPS | 0.15 | 0.15 | 0.08 | 0.08 | 0.08 | 0.15 | 0.15 | 0.15 | — | — |
|  | tBH | — | — | — | — | — | — | — | — | 0.15 | 0.15 |
| Type of reducing agent | Fe | — | — | — | — | — | — | — | — | 0.0005 | 0.0005 |
|  | EDTA | — | — | — | — | — | — | — | — | 0.0015 | 0.0015 |
|  | SFS | — | — | — | — | — | — | — | — | 0.2 | 0.2 |
| Polymerization temperature (Tin)[° C.] |  | 43 | 43 | 43 | 43 | 43 | 43 | 43 | 65 | 43 | 43 |
| Polymerization rate (Sp) [Sec] |  | 146 | 104 | 124 | 116 | 101 | 222 | 75 | 75 | 51 | 46 |
| Vinyl monomer component (b) | MMA | 20 | 20 | 6 | 6 | 6 | 20 | 50 | 20 | 20 | — |
|  | AN | — | — | 4.11 | 3.6 | 3.6 | — | — | — | — | 12.5 |
|  | St | — | — | 23.29 | 20.4 | 20.4 | — | — | — | — | 37.5 |
|  | nOM | — | — | 0.02 | 0.02 | 0.02 | — | — | — | — | — |
| Polymerization initiator for vinyl monomer component (b) | KPS | — | — | 0.08 | 0.08 | 0.08 | — | — | — | — | — |
|  | tBH | — | — | — | — | — | — | — | — | 0.03 | 0.06 |
| Polymerization temperature (Tb)[° C.] |  | 80 | 80 | 80 | 80 | 80 | 80 | 80 | 80 | 80 | 80 |

TABLE 2-continued

| | | Production Example | | | | | | | | | |
|---|---|---|---|---|---|---|---|---|---|---|---|
| | | 2-11 | 2-12 | 2-13 | 2-14 | 2-15 | 2-16 | 2-17 | 2-18 | 2-19 | 2-20 |
| Additional emulsifier | RS-610NA | — | — | — | — | — | — | — | — | — | — |
| Polymerization characteristics | Solid content [%] | 34 | 33 | 33 | 33 | 33 | 35 | 35 | 30 | 35 | 35 |
| | Polymerization degree [%] | 99.9> | 99.9> | 99.9> | 99.9> | 99.9> | 99.9> | 99.9> | 99.9> | 99.9> | 99.9> |
| Particle diameter | Dn[nm] | 92 | 79 | 77 | 103 | 99 | 88 | 98 | 98 | 96 | 91 |
| | Dw[nm] | 99 | 86 | 82 | 114 | 107 | 94 | 108 | 113 | 106 | 99 |
| | Dw/Dn | 1.08 | 1.09 | 1.06 | 1.11 | 1.09 | 1.07 | 1.11 | 1.16 | 1.11 | 1.09 |
| Powder recovery method | | G | G | G | G | G | G | G | G | G | G |
| Proportion of THF-insoluble fraction[wt %] | | 95 | 91 | 89 | 92 | 93 | 96 | 79 | 93 | 93 | 85 |
| Weight average molecular weight of THF soluble fraction [number to be multiplied by 10,000] | | 23 | 23 | 20 | 21 | 19 | 17 | 41 | 19 | 17 | 15 |
| Z value [%] | | 22 | 52 | 36 | 42 | 54 | — | 68 | 66 | 96 | 68 |

Examples 1 to 14 and Comparative Examples 1 to 11

The polymers obtained in the production examples described above, styrene-acrylonitrile copolymer, carbon black (CB, product name: #960B, manufactured by Mitsubishi Chemical Corporation) and magnesium stearate (MgST, manufactured by Nacalai tesque, INC.) were blended at the ratios shown in Tables 3 to 6 to obtain mixtures. Each of the mixtures was supplied to a devolatilization-type, twin-screw extruder (TEM-35B (trade name) manufactured by Toshiba Machine Co., Ltd.) heated to a barrel temperature of 240° C. and kneaded to prepare pellets of each resin composition.

In this process, the styrene-acrylonitrile copolymers used were as follows.

SAN-1: manufactured by Techno-UMG Co., Ltd., product name: SR-56B (AN content: 33%). SAN-2: manufactured by Techno-UMG Co., Ltd., product name: AP-H (AN content: 27%).

SAN-3: manufactured by Techno-UMG Co., Ltd., product name: AP-A (AN content: 30%).

The AN content is a mass ratio of acrylonitrile units with respect to 100% of the styrene-acrylonitrile copolymer.

The pellets were injection molded under the following conditions to prepare a test piece for evaluation.

Injection molding machine: SE100DU (trade name) manufactured by Sumitomo Heavy Industries, Ltd.

Cylinder temperature: 24) ° C. mold temperature: 80° C.
Specifications of test piece:
Test piece A: length 80 mm×width 10 mm×thickness 4 mm
Test piece B: length 100 mm×width 50 mm×thickness 2 mm

[Charpy Impact Strength Test]

A TYPE A notch conforming to ISO 179-1 was cut into the test piece A, and the Charpy impact strength was measured at 23° C. and −30° C. A higher value can be regarded as indicating a better impact resistance, and hence is favorable.

[Color Development Test]

As an index of the color appearance, the lightness (L* according to JIS Z8781-4) of the test piece 13 was measured with a spectral color difference meter (SE7700 (trade name) manufactured by Nippon Denshoku Industries Co., Ltd.). The measurement was performed by the reflection measurement method under with a C light source and a 2-degree field of view. In the Examples of the present application, since the test piece was colored black, a lower value can be regarded as indicating a superior color appearance (jet-blackness) and, hence, is favorable.

[Weatherability Test]

A weatherability test was carried out under the following irradiation conditions using the same molded product (flat plate) as used in in the above color development test.

—Irradiation Conditions—

Testing apparatus: Daipla Metal Weather, model KW-R5TP-A, 5, manufactured by Daipla Motes Co., Ltd.
Inner temperature of the tank: set at 50° C.
UV irradiation conditions: set at 65 mW/cm$^2$
(Measurement implemented with illuminance meter UIT 101/UVD-365PD manufactured by Ushio Inc. at a measurement wavelength of 330 to 390 nm and a peak sensitivity wavelength of 365 nm)
Filter: KF-1 filter (transmission wavelength range: 295 nm to 780 nm)
Test atmosphere: 20-hour continuous irradiation, 4-hour darkness (24 hours/1 cycle)
Test time: 96 hours (4 cycles)

The yellowness before and after the weatherability test (YI, according to JIS K7105), the lightness (L*) and the chromaticity (a*, b*)(according to JIS Z8781-4) were measured with a spectral color difference meter (SE7700 (trade name) manufactured by Nippon Denshoku Industries Co., Ltd.). The measurements were performed by the reflection method with a C light source and a 2-degree field of view.

The yellowness index (YI$_1$) before the weatherability test was taken as the initial yellowness index (YI).

The change in yellowness (ΔYI) was calculated by the following formula (C) from the yellowness before the weatherability test (YI$_1$) and the yellowness after the weatherability test (YI$_2$). In addition, the color difference (ΔE*$_{ab}$) was calculated by the following formula (D) from the lightness (L*$_1$) and chromaticity (a*$_1$, b*$_1$) before the weatherability test, as well as the lightness (L*$_2$) and chromaticity (a*$_2$, b*$_2$) after the weatherability test.

$$\Delta YI = YI_2 - YI_1 \quad \text{Formula(C):}$$

$$\Delta E*_{ab} = ((L*_2 - L*_1) + (a*_2 - a*_1) + (b*_2 - b*_1))^{0.5} \quad \text{Formula(D):}$$

A smaller initial yellowness can be regarded as indicating a higher resistance to heat discoloration during molding, and hence is favorable. Also, a smaller change in yellowness and a smaller color difference can be regarded as indicating a superior weatherability, and hence are favorable.

TABLE 3

|  |  | Example | | | | | | Comparative Example | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Thermoplastic resin (E) [%] | SAN-1 | 60 | 60 | 60 | 60 | 60 | 60 | 100 | 60 | 60 | 60 | 60 |
| Polymer particles(C) | Type | (C-1) | (C-2) | (C-3) | (C-6) | (C-11) | (C-12) | — | (C-16) | (C-17) | (C-18) | (C-19) |
|  | Amount [%] | 40 | 40 | 40 | 40 | 40 | 40 | — | 40 | 40 | 40 | 40 |
| Additive [%] | CB | 0.5 | 0.5 | 0.5 | 0.5 | 0.5 | 0.5 | 0.5 | 0.5 | 0.5 | 0.5 | 0.5 |
|  | MgST | 0.2 | 0.2 | 0.2 | 0.2 | 0.2 | 0.2 | 0.2 | 0.2 | 0.2 | 0.2 | 0.2 |
| Charpy impact strength | 23° C. [kJ/m$^2$] | 29 | 28 | 24 | 18 | 28 | 22 | 1.1 | 8.6 | 13 | 17 | 13 |
|  | −30° C. [kJ/m$^2$] | 7.6 | 7.8 | 8.0 | 4.4 | 7.0 | 6.5 | 0.6 | 2.0 | 2.3 | 4.1 | 3.8 |
| Color development | Lightness L*[−] | 8.4 | 8.3 | 8.4 | 8.4 | 8.7 | 9.4 | 5.0 | 9.9 | 11.2 | 10.1 | 9.7 |

Excellent impact strength and color appearance were achieved in Examples 1 to 6.

In Comparative Example 1, the impact strength was extremely low due to lack of the polymer particles (C).

In Comparative Example 2, the impact strength was low due to the use of the acrylic polymer containing no polyorganosiloxane.

In Comparative Examples 3 to 5, the impact strength and color appearance were low due to the me of the polymer particles (C) having a Z value of 60% or more.

TABLE 4

|  |  | Example | | | | | | Comparative Example |
| --- | --- | --- | --- | --- | --- | --- | --- | --- |
|  |  | 7 | 8 | 9 | 10 | 11 | 12 | 6 |
| Thermoplastic resin (E) [%] | SAN-1 | 70 | 70 | 70 | 70 | 70 | 70 | 70 |
| Polymer particles (C) | Type | (C-1) | (C-4) | (C-5) | (C-7) | (C-8) | (C-12) | (C-18) |
|  | Amount [%] | 30 | 30 | 30 | 30 | 30 | 30 | 30 |
| Additive [%] | CB | 0.5 | 0.5 | 0.5 | 0.5 | 0.5 | 0.5 | 0.5 |
|  | MgST | 0.2 | 0.2 | 0.2 | 0.2 | 0.2 | 0.2 | 0.2 |
| Charpy impact strength | 23° C. [kJ/m$^2$] | 14 | 9.8 | 9.8 | 12 | 14 | 12 | 9.3 |
|  | −30° C. [kJ/m$^2$] | 6.1 | 3.6 | 3.6 | 4.6 | 4.7 | 5.8 | 2.5 |
| Color development | Lightness L*[−] | 8.6 | 8.2 | 8.2 | 7.0 | 7.0 | 9.7 | 10.0 |

Excellent impact strength and color appearance were achieved in Examples 7 to 12.

In Comparative Example 6, the impact strength and color appearance were low due to the use of the polymer particles (C) having a Z value of 60% or more.

TABLE 5

|  |  | Example | Comparative Example | | |
| --- | --- | --- | --- | --- | --- |
|  |  | 13 | 7 | 8 | 9 |
| Thermoplastic resin (E) [%] | SAN-2 | 60 | 100 | 60 | 60 |
| Polymer particles(C) | Type | (C-1) | — | (C-18) | (C-19) |
|  | Amount [%] | 40 | — | 40 | 40 |
| Additive [%] | CB | 0.5 | 0.5 | 0.5 | 0.5 |
|  | MgST | 0.2 | 0.2 | 0.2 | 0.2 |

TABLE 5-continued

|  |  | Example | Comparative Example | | |
| --- | --- | --- | --- | --- | --- |
|  |  | 13 | 7 | 8 | 9 |
| Charpy impact strength | 23° C. [kJ/m$^2$] | 25 | 1.0 | 16 | 12 |
|  | −30° C. [kJ/m$^2$] | 7.2 | 0.9 | 5.0 | 4.0 |
| Color development | Lightness L*[−] | 8.4 | 4.8 | 8.9 | 8.7 |

Excellent impact strength and color appearance were achieved in Example 13.

In Comparative Examples 8 and 9, the impact strength and color appearance were low due to the use of the polymer particles (C) having a Z value of 60% or more.

TABLE 6

|  |  | Example | Comparative Example | |
|---|---|---|---|---|
|  |  | 14 | 10 | 11 |
| Thermoplastic resin (E) [%] | SAN-3 | 60 | 60 | 60 |
| Polymer particles(C) | Type | (C-1) | (C-18) | (C-19) |
|  | Amount [%] | 40 | 40 | 40 |
| Additive [%] | CB | — | — | — |
|  | MgST | 0.2 | 0.2 | 0.2 |
| Charpy impact strength | 23° C. [kJ/m$^2$] | 36 | 22 | 15 |
|  | −30° C. [kJ/m$^2$] | 11 | 7.6 | 4.4 |
| Weatherability | Initial yellowness index Y1[−] | 8 | 9 | 10 |
|  | Change in yellowness ΔY1[−] | 42 | 44 | 51 |
|  | Color difference ΔE*[−] | 24 | 25 | 29 |

Excellent impact strength and weatherability were achieved in Example 14.

In Comparative Examples 10 and 11, the impact strength, color appearance, heat discoloration resistance and weatherability were low due to the use of the polymer particles (C) having a Z value of 60% or more.

Examples 15 to 25 and Comparative Examples 12 to 19

The polyorganosiloxane-containing polymers obtained in the production examples described above, methacrylic resin (PMMA) and various organic dyes were blended at the ratios shown in Tables 7 and 8 to obtain mixtures. Each of the mixtures was supplied to a devolatilization-type, twin-screw extruder (TEM-35B (trade name) manufactured by Toshiba Machine Co., Ltd.) heated to a barrel temperature of 250° C. and kneaded to prepare pellets of each resin composition.

In this process, the methacrylic resin (PMMA) used was Acrypet VH001 (trade name, a product containing 90% or more of methyl methacrylate units, manufactured by Mitsubishi Chemical Corporation).

Further, the coloring agents used were as follows.
(OD-1): Organic dye, Diaresin Green C manufactured by Mitsubishi Chemical Corporation.
(OD-2): Organic dye, Diaresin Red A manufactured by Mitsubishi Chemical Corporation.
(OD-3): Organic dye, Diaresin Blue G manufactured by Mitsubishi Chemical Corporation.
CB: Carbon black, #960B manufactured by Mitsubishi Chemical Corporation.

The pellets of the resin composition were injection molded under the following conditions to prepare a test piece for evaluation.

Injection molding machine: EC20PNII (trade name) manufactured by Toshiba Machine Co., Ltd.
Cylinder temperature: 250° C., mold temperature: 60° C.
Specifications of test piece:
Test piece A: length 80 mm×width 10 mm×thickness 4 mm
Test piece C: length 50 mm×width 50 mm×thickness 3 mm

[Charpy Impact Strength]
A TYPE A notch conforming to ISO 179-1 was cut into the test piece A, and the Charpy impact strength was measured at 23° C. and −30° C. A higher value can be regarded as indicating a better impact resistance, and hence is favorable.

[Color Development Test]
As an index of the color appearance of the resin composition, the lightness (L*) was evaluated according to the following method. Using a spectral colorimeter (trade name: SD7000, manufactured by Nippon Denshoku Industries Co., Ltd.), the hue of the test piece C was measured by the SCE method, and L* was determined in accordance with ISO 11664-4. In the Examples of the present application, since the test piece was colored black, a lower value can be regarded as indicating a superior color appearance (jet-blackness) and, hence, is favorable.

TABLE 7

|  |  | Example | | | | Comparative Example | | | |
|---|---|---|---|---|---|---|---|---|---|
|  |  | 15 | 16 | 17 | 18 | 12 | 13 | 14 | 15 |
| Thermoplastic resin (E) [%] | PMMA | 60 | 60 | 60 | 60 | 100 | 60 | 60 | 60 |
| Polymer particles (C) | Type | (C-1) | (C-3) | (C-4) | (C-8) | — | (C-18) | (C-19) | (C-20) |
|  | Amount [%] | 40 | 40 | 40 | 40 | — | 40 | 40 | 40 |
| Additive [%] | (OD-1) | 0.4 | 0.4 | 0.4 | 0.4 | 0.4 | 0.4 | 0.4 | 0.4 |
|  | (OD-2) | 0.4 | 0.4 | 0.4 | 0.4 | 0.4 | 0.4 | 0.4 | 0.4 |
|  | (OD-3) | 0.1 | 0.1 | 0.1 | 0.1 | 0.1 | 0.1 | 0.1 | 0.1 |
| Charpy impact strength | 23° C. [kJ/m$^2$] | 12 | 11 | 10 | 10 | 1.0 | 9.3 | 7.4 | 8.4 |
|  | −30° C. [kJ/m$^2$] | 6.2 | 4.9 | 4.7 | 4.4 | 1.0 | 3.0 | 3.3 | 2.0 |
| Color development | Lightness L*[−] | 5.4 | 3.1 | 1.4 | 1.0 | 1.0 | 5.5 | 5.6 | 2.5 |

Excellent impact strength and color appearance were achieved in Examples 15 to 18.

In Comparative Example 12, the impact strength was extremely low due to lack of the polymer particles (C).

In Comparative Examples 13 to 15, the balance between impact strength and color appearance was poor due to the use of the polymer particles (C) having a Z value of 60 or more.

TABLE 8

| | | Example | | | | | | | Comparative Example | | | |
|---|---|---|---|---|---|---|---|---|---|---|---|---|
| | | 19 | 20 | 21 | 22 | 23 | 24 | 25 | 16 | 17 | 18 | 19 |
| Thermoplastic resin (E) [%] | PMMA | 70 | 70 | 70 | 70 | 70 | 70 | 70 | 100 | 70 | 70 | 70 |
| Polymer particles(C) | Type | (C-4) | (C-5) | (C-7) | (C-8) | (C-13) | (C-14) | (C-15) | — | (C-18) | (C-19) | (C-20) |
| | Amount [%] | 30 | 30 | 30 | 30 | 30 | 30 | 30 | — | 30 | 30 | 30 |
| Additive [%] | CB | 0.5 | 0.5 | 0.5 | 0.5 | 0.5 | 0.5 | 0.5 | 0.5 | 0.5 | 0.5 | 0.5 |
| Charpy impact strength | 23° C. [kJ/m$^2$] | 7.5 | 7.5 | 9.2 | 9.4 | 8.7 | 9.6 | 9.4 | 1.1 | 6.9 | 5.2 | 6.3 |
| | −30° C. [kJ/m$^2$] | 2.5 | 2.5 | 2.9 | 2.9 | 3.5 | 6.5 | 7.2 | 1.0 | 2.4 | 2.1 | 2.4 |
| Color development | Lightness L*[−] | 3.9 | 3.9 | 3.5 | 3.1 | 4.4 | 4.7 | 5.0 | 5.4 | 6.5 | 5.2 | 5.3 |

Excellent impact strength and color appearance were achieved in Examples 19 to 25.

In Comparative Example 16, the impact strength was extremely low due to lack of the polymer particles (C).

In Comparative Examples 17 to 19, the impact strength and color appearance were low due to the use of the polymer particles (C) having a Z value of 60% or more.

Examples 26 to 31 and Comparative Examples 20 to 34

The polyorganosiloxane-containing polymers obtained in the production examples described above, various auxiliary agents and various thermoplastic resins were blended at the ratios shown in Tables 9 to 12 to obtain mixtures. Each of the mixtures was supplied to a devolatilization-type, twin-screw extruder (PCM-30 (trade name) manufactured by Ikegai Co., Ltd.) and kneaded to prepare pellets of each resin composition.

In this process, the followings were used as the thermoplastic resins.

PC: Polycarbonate resin (lupilon S-2000F, manufactured by Mitsubishi Engineering-Plastics Corporation, viscosity average molecular weight 24,000)

SAN-2: Styrene-acrylonitrile copolymer (AP-H, manufactured by Techno-UMG Co., Ltd.)

PET: Polyethylene terephthalate resin (TRN8550FF, manufactured by Teijin Limited)

PCGF-1: Glass fiber-added polycarbonate resin (lupilon GS2020MR2, manufactured by Mitsubishi Engineering-Plastics Corporation, 20% by mass of glass fiber added)

The pellets of the resin composition were injection molded to prepare test pieces for evaluation.

Injection molding machine: SE100DU (trade name) manufactured by Sumitomo Heavy Industries, Ltd.

Specifications of test piece:

Test piece A: length 80 mm×width 10 mm×thickness 4 mm

Test piece D: length 127 mm×width 12.7 mm×thickness 1.6 mm

In this process, the extrusion conditions and injection molding conditions were appropriately varied as follows in consideration of the flowability of the molding resin.

Example 26, Comparative Examples 20 to 22

Extrusion barrel temperature 280° C., injection cylinder temperature: 280° C., mold temperature: 80° C.

Examples 27 to 28, Comparative; Examples 23 to 26

Extrusion barrel temperature 260° C., injection cylinder temperature: 260° C., mold temperature: 80° C.

Examples 29 to 30, Comparative Examples 27 to 30

Extrusion barrel temperature 280° C. injection cylinder temperature: 300° C., mold temperature: 70° C.

Example 31, Comparative Examples 31 to 34

Extrusion barrel temperature 300° C., injection cylinder temperature: 300° C., mold temperature: 90° C.

[Charpy Impact Strength]

A TYPE A notch conforming to ISO 179-1 was cut into the test piece A, and the Charpy impact strength was measured. A higher value can be regarded as indicating a better impact resistance, and hence is favorable.

The examples included cases where the impact resistance was so high in some impact tests that the test piece did not completely break. Such cases are categorized as N. B., since an accurate impact value could not be calculated.

TABLE 9

| | | Example | Comparative Example | | |
|---|---|---|---|---|---|
| | | 26 | 20 | 21 | 22 |
| Thermoplastic resin (E) [%] | PC | 95 | 100 | 95 | 95 |
| Polymer particles (C) | Type | (C-1) | — | (C-18) | (C-19) |
| | Amount [%] | 5 | — | 5 | 5 |
| Charpy impact strength | 23° C. [kJ/m$^2$] | N.B. | N.B. | N.B. | N.B. |
| | −30° C. [kJ/m$^2$] | 29 | 14 | 21 | 16 |

Excellent impact strength was achieved in Example 26.

In Comparative Example 20, the impact strength was extremely low due to lack of the polymer particles (C).

In Comparative Examples 21 and 22, the impact strength was low due to the use of the polymer particles (C) having a Z value of 60% or more.

TABLE 10

|  |  | Example | | Comparative Example | | | |
|---|---|---|---|---|---|---|---|
|  |  | 27 | 28 | 23 | 24 | 25 | 26 |
| Thermo-plastic resin (E) [%] | PC | 70 | 70 | 75 | 70 | 70 | 70 |
|  | SAN-2 | 22.5 | 22.5 | 25.0 | 22.5 | 22.5 | 22.5 |
| Polymer particles (C) | Type | (C-1) | (C-7) | — | (C-18) | (C-19) | (C-20) |
|  | Amount [%] | 7.5 | 7.5 | — | 7.5 | 7.5 | 7.5 |
| Charpy impact strength | 23° C. [kJ/m²] | N.B. | N.B. | 7.4 | N.B. | N.B. | N.B. |
|  | −30° C. [kJ/m²] | 24 | 22 | 5.9 | 19 | 18 | 15 |

Excellent impact strength was achieved in Examples 27 and 28.

In Comparative Example 23, the impact strength was extremely low due to lack of the polymer particles (C).

In Comparative Examples 24 to 26, the impact strength was low due to the use of the polymer particles (C) having a Z value of 60% or more.

TABLE 11

|  |  | Example | | Comparative Example | | | |
|---|---|---|---|---|---|---|---|
|  |  | 29 | 30 | 27 | 28 | 29 | 30 |
| Thermo-plastic resin (E) [%] | PC | 54 | 54 | 60 | 54 | 54 | 54 |
|  | PET | 36 | 36 | 40 | 36 | 36 | 36 |
| Polymer particles (C) | Type | (C-1) | (C-7) | — | (C-18) | (C-19) | (C-20) |
|  | Amount [%] | 10 | 10 | — | 10 | 10 | 10 |
| Charpy impact strength | 23° C. [kJ/m²] | 39 | 30 | 7.9 | 24 | 14 | 22 |
|  | −30° C. [kJ/m²] | 14 | 14 | 5.3 | 11 | 10 | 9.4 |

Excellent impact strength was achieved in Examples 29 and 30.

In Comparative Example 27, the impact strength was extremely low due to lack of the polymer particles (C).

In Comparative Examples 28 to 30, the impact strength was low due to the use of the polymer particles (C) having a Z value of 60% or more.

TABLE 12

|  |  | Example | Comparative Example | | | |
|---|---|---|---|---|---|---|
|  |  | 31 | 31 | 32 | 33 | 34 |
| Thermoplastic resin (E) [%] | PCGF-1 | 95 | 100 | 95 | 95 | 95 |
| Polymer particles (C) | Type | (C-1) | — | (C-18) | (C-19) | (C-20) |
|  | Amount [%] | 5 | — | 5 | 5 | 5 |
| Charpy impact strength | 23° C. [kJ/m²] | 15 | 8.1 | 13 | 12 | 11 |

Excellent impact strength was achieved in Example 31.

In Comparative Example 31, the impact strength was extremely low due to lack of the polymer particles (C).

In Comparative Examples 32 to 34, the impact strength was low due to the use of the polymer particles (C) having a Z value of 60% or more.

Examples 32 to 33 and Comparative Examples 35 to 36

The polyorganosiloxane-containing polymers obtained in the production examples described above, various auxiliary agents and polyacetal resin (POM) were blended at the ratios shown in Table 13 to obtain mixtures. Each of the mixtures was supplied to a devolatilization-type, twin-screw extruder (PCM-30 (trade name) manufactured by Ikegai Co., Ltd.) heated to a barrel temperature of 180° C. and kneaded to prepare pellets of each resin composition.

In this process, HOSTAFORM C9021 (trade name, manufactured by Celanese Japan Ltd.) was used as the polyacetal resin (POM).

Further, the following were used as various auxiliary agents.

St-Ca: calcium stearate (calcium stearate GF-200, manufactured by NOF Corporation)

Irg245: phenolic antioxidant (Irganox 245, manufactured by Ciba Japan Ltd.).

The pellets of the resin composition were injection molded under the following conditions to prepare a test piece for evaluation.

Injection molding machine: SE100DU (trade name) manufactured by Sumitomo Heavy Industries, Ltd.

Cylinder temperature: 205° C., mold temperature: 70° C.

Specifications of test piece:

Test piece A: length 80 mm×width 10 mm×thickness 4 nm

[Charpy Impact Strength]

A TYPE A notch conforming to ISO 179-1 was cut into the test piece A, and the Charpy impact strength was measured at 23° C. and 30° C. A higher value can be regarded as indicating a better impact resistance, and hence is favorable.

TABLE 13

|  |  | Example | | Comparative Example | |
|---|---|---|---|---|---|
|  |  | 32 | 33 | 35 | 36 |
| Thermoplastic resin (E) [%] | POM | 90 | 90 | 100 | 90 |
| Polymer particles (C) | Type | (C-1) | (C-12) | — | (C-15) |
|  | Amount [%] | 10 | 10 | — | 10 |
| Additive [%] | St-Ca | 0.2 | 0.2 | 0.2 | 0.2 |
|  | Irg245 | 0.1 | 0.1 | 0.1 | 0.1 |
| Charpy impact strength | 23° C. [kJ/m²] | 12 | 11 | 4.6 | 9.4 |
|  | −30° C. [kJ/m²] | 7.4 | 6.8 | 2.2 | 5.6 |

Excellent impact strength was achieved in Examples 32 and 33.

In Comparative Example 35, the impact strength was extremely low due to lack of the polymer particles (C).

In Comparative Example 36, the impact strength was low due to the use of the polymer particles (C) having a Z value of 60% or more.

Examples 34 to 35 and Comparative Examples 37 to 38

The polyorganosiloxane-containing polymers obtained in the production examples described above and polyvinyl chloride resin were blended at the ratios shown in Table 14 to obtain mixtures.

In this process, the polyvinyl chloride resin used was a powder obtained by supplying the following materials to a Henschel mixer and uniformly mixing the materials: 100 parts of vinyl chloride resin (product name: TK-1000, manufactured by Shin-Etsu Chemical Co., Ltd., average degree of polymerization: 1050), 3 pans of a Ca/Zn composite stabilizer (product name: HT-547A, manufactured by Nitto Kasei Kogyo K.K.), 6 parts of calcium carbonate (product name: μ-powder 3S, manufactured by Bihoku Funka Kogyo Co., Ltd.), 3 parts of titanium oxide (product name: Tipaque R830, manufactured by Ishihara Sangyo Kaisha, Ltd.), 0.5 parts of glycerin fatty acid ester (product name: Loxiol GH-4, manufactured by Emery Oleochemicals Japan Co., Ltd.), 0.2 parts of a polymer complex ester (product name: Loxiol VPN963, manufactured by Emery Oleochemicals Japan Co., Ltd.), 0.3 parts of a polymer complex ester (product name: Loxiol (G70S, manufactured by Emery Oleochemicals Japan Co., Ltd.), 0.2 parts of polyethylene wax (product name: Loxiol VPN233, manufactured by Emery Oleochemicals Japan Co., Ltd.), and an acrylic processing aid (product name: Metablene P-570A, manufactured by Mitsubishi Chemical Corporation).

A mixture of the vinyl chloride resin and each polyorganosiloxane-containing polymer was melt-kneaded for 5 minutes at 190° C. with a roll interval of 0.4 mm using a dielectric heating type 8-inch test roll (manufactured by Kansai Roll Co., Ltd.) to obtain a sheet molded product. The obtained sheet molded product was hot-pressed for 5 minutes at 190° C. and 15 MPa using a hot press machine (manufactured by Shoji Co., Ltd.) to obtain a molded product having a thickness of 4 mm. A test piece as described below was cut out from the obtained molded product and used for evaluation.

Test piece A: length 80 mm×width 10 mm×thickness 4 mm

[Charpy Impact Strength]

A TYPE A notch conforming to ISO 179-1 was cut into the test piece A, and the Charpy impact strength was measured at 23° C. and −10° C. A higher value can be regarded as indicating a better impact resistance, and hence is favorable. The examples included cases where the impact resistance was so high in some impact tests that the test piece did not completely break. Such cases are categorized as N. B., since an accurate impact value could not be calculated. Such ceases can be regarded as indicating superior impact strength to the case wheat breakage occurred.

TABLE 14

|  |  | Example | | Comparative Example | |
|---|---|---|---|---|---|
|  |  | 34 | 35 | 37 | 38 |
| Thermoplastic resin (E) [%] | PVC | 95 | 95 | 100 | 95 |
| Polymer particles (C) | Type | (C-1) | (C-12) | — | (C-15) |
|  | Amount [%] | 5 | 5 | — | 5 |
| Charpy impact strength | 23° C. [kJ/m²] | N.B. | N.B. | 5.9 | N.B. |
|  | −10° C. [kJ/m²] | 6.8 | 5.6 | 1.9 | 4.9 |

Excellent impact strength was achieved in Examples 34 and 35.

In Comparative Example 37, the impact strength was extremely low due to lack of the polymer particles (C).

In Comparative Example 38, the impact strength was low due to the use of the polymer particles (C) having a Z value of 60% or more.

Example 36 and Comparative Examples 39 to 40

The polyorganosiloxane-containing polymers obtained in the production examples described above and polyamide resin (PA) were blended at the ratios shown in Table 15 to obtain mixtures. Each of the mixtures was dried at 80° C. for 12 hours, and then supplied to a devolatilization-type, twin-screw extruder (PCM-30 (trade name) manufactured by Ikegai Co., Ltd.) heated to a barrel temperature of 250° C. and kneaded to prepare pellets of each resin composition.

In this process, UBE nylon 1022B (trade name, polyamide 6, manufactured by Ube Industries. Ltd.) was used as the polyamide resin (PA).

The pellets of the resin composition were injection molded under the following conditions to prepare a test piece for evaluation.

Injection molding machine: SE100DU (trade name) manufactured by Sumitomo Heavy industries. Ltd.

Cylinder temperature: 250° C., mold temperature: 80° C.

Specifications of test piece:

Test piece A: length 80 mm×width 10 mm×thickness 4 mm

[Charily Impact Strength]

A TYPE A notch conforming to ISO 179-1 was cut into the test piece A, and the Charpy impact strength under absolute dry conditions was measured at 23° C. and −40° C. A higher value can be regarded as indicating a better impact resistance, and hence is favorable.

TABLE 15

|  |  | Example | Comparative Example | |
|---|---|---|---|---|
|  |  | 36 | 39 | 40 |
| Thermoplastic resin (E) [%] | PA | 85 | 100 | 85 |
| Polymer particles (C) | Type | (C-1) | — | (C-19) |
|  | Amount [%] | 15 | — | 15 |
| Charpy impact strength | 23° C. [kJ/m²] | 18 | 7.1 | 10 |
|  | −40° C. [kJ/m²] | 6.4 | 2.5 | 3.6 |

Excellent impact strength was achieved in Example 36.

In Comparative Example 39, the impact strength was extremely low due to lack of the polymer particles (C).

In Comparative Example 40, the impact strength was low due to the use of the polymer particles (C) having a Z value of 60% or more.

Example 37 and Comparative Examples 41 to 42

The polyorganosiloxane-containing polymers obtained in the production examples described above and polylactic acid resin (PLA) were blended at the ratios shown in Table 16 to obtain mixtures. Each of the mixtures was supplied to a devolatilization-type, twin-screw extruder (PCM-30 (trade name) manufacture) by Ikegai Co., Ltd.) heated to a barrel temperature of 200° C. and kneaded to prepare pellets of each resin composition.

In this process, Ingeo Biopolymer 2003D (trade name, manufactured by NatureWorks LLC) was used as the polylactic acid resin (PLA).

The pellets of the resin composition were injection molded under the following conditions to prepare a test piece for evaluation.

Injection molding machine: SE100DU (trade name) manufactured by Sumitomo Heavy Industries, Ltd.

Cylinder temperature: 200° C., mold temperature: 30° C.

Specifications of test piece:

Test piece A: length 80 mm×width 10 mm×thickness 4 mm

[Charpy Impact Strength]

A TYPE A notch conforming to ISO 179-1 was cut into the test piece A, and the Charpy impact strength was measured at 23° C. In the case of "Annealed" condition, a TYPE A notch conforming to ISO 179-1 was cut into the test piece A, which was then placed in an oven at 100° C. for 3 hours, cooled to 23° C., and the Charpy impact strength was measured.

In both cases, a higher value can be regarded as indicating a superior impact resistance, and hence is favorable.

TABLE 16

|  |  | Example | Comparative Example | |
|---|---|---|---|---|
|  |  | 37 | 41 | 42 |
| Thermoplastic resin (E) [%] | PLA | 85 | 100 | 85 |
| Polymer particles (C) | Type | (C-1) | — | (C-19) |
|  | Amount [%] | 15 | — | 15 |
| Charpy impact strength | Annealed | 23 | 4.4 | 10 |
|  | No annealing | 4.7 | 2.1 | 2.3 |

Excellent impact strength was achieved in Example 37.

In Comparative Example 41, the impact strength was extremely low due to lack of the polymer particles (C).

In Comparative Example 42, the impact strength was low due to the use of the polymer particles (C) having a Z value of 60% or more.

Examples 38 to 39 and Comparative Examples 43 to 44

The composition obtained in Production Example 2-10 and the polymer particles polybutylene terephthalate (PBT, Novaduran 5010R5, manufactured by Mitsubishi Engineering-Plastics Corporation) and polycarbonate (PC, lupilon S-2000F, manufactured by Mitsubishi Engineering-Plastics Corporation, viscosity average molecular weight of 24,000) was blended at the ratios shown in Table 17 to obtain mixtures. Each of the mixtures was supplied to a devolatilization-type, twin-screw extruder (PCM-30 (trade name) manufactured by Ikegai Co., Ltd.) heated to a barrel temperature of 260° C. and kneaded to prepare pellets of each resin composition.

The pellets were injection molded under the following conditions to prepare a test piece for evaluation.

Injection molding machine: SE100DU (trade name) manufactured by Sumitomo Heavy Industries, Ltd.

Cylinder temperature: 260° C. mold temperature: 60° C.
Specifications of test piece:
Test piece A: length 80 mm×width 10 mm×thickness 4 mm

[Charpy Impact Strength Test]

A TYPE A notch conforming to ISO 179-1 was cut into the test piece A, and the Charpy impact strength was measured at 23° C. and −30° C. A higher value can be regarded as indicating a better impact resistance, and hence is favorable.

[Melt Flowability]

Each pellet was continuously injection molded IS times under the following conditions, and the spiral flow length (SFL) was evaluated. Table 15 shows the maximum SFL and the minimum SFL out of the values in 15 rounds of injection molding, as well as the difference ΔSFL therebetween (maximum SFL−minimum SFL). A higher value can be regarded as indicating a higher melt flowability, and hence is favorable. Also, a smaller difference between the minimum and maximum values can be regarded as indicating a better molding stability, and hence is favorable.

Injection molding machine: SE100DU (trade name) manufactured by Sumitomo Heavy Industries, Ltd.

Cylinder temperature: 300° C., mold temperature: 70° C., injection speed: 20 mm/sec, and injection pressure: 50 MPa.

TABLE 17

|  |  | Example | | Comparative Example | |
|---|---|---|---|---|---|
|  |  | 38 | 39 | 43 | 44 |
| Thermoplastic resin (E) [%] | PBT | 54 | 54 | 60 | 54 |
|  | PC | 36 | 36 | 40 | 36 |
| Polymer particles (C) or composition | Type | (C-10) | (C-1) | — | (C-19) |
|  | Amount [%] | 10 | 10 | — | 10 |
| Charpy impact strength | 23° C. [kJ/m$^2$] | N.B. | N.B. | 5.9 | N.B. |
|  | −30° C. [kJ/m$^2$] | 15 | 13 | 3.9 | 7.9 |
| SFL (Minimum) | mm | 194 | 157 | 206 | 125 |
| SFL (Maximum) | mm | 214 | 231 | 239 | 203 |
| ΔSFL | mm | 20 | 74 | 33 | 78 |

Excellent impact strength, melt flowability and molding stability were achieved in Example 38.

Excellent impact strength and melt flowability wen; achieved in Example 39. However, Example 39 was inferior to Example 41 in terms of molding stability due to lack of the component (D).

In Comparative Example 43, the impact strength was low due to lack of the polymer particles (C).

In Comparative Example 44, the impact strength, melt flowability and molding stability were low due to the use of the polymer particles (C) having a Z value of 60% or more.

Examples 40 to 42 and Comparative Examples 45 to 46

The compositions obtained in Production Examples 2-9 to 2-10, the polymer particle (C-1), polycarbonate (PC, lupilon S-2000F, manufactured by Mitsubishi Engineering-Plastics Corporation, viscosity average molecular weight 24,000) and polyethylene terephthalate (PET, TRN8550FF, manufactured by Teijin Limited) were blended at the ratios shown in Table 18 to obtain mixtures. Each of the mixtures was supplied to a devolatilization-type, twin-screw extruder (PCM-30 (trade name) manufactured by Ikegai Co., Ltd.) heated to a barrel temperature of 280° C. and kneaded to prepare pellets of each resin composition.

The pellets were injection molded under the following conditions to prepare a test piece for evaluation.

Injection molding machine: SE100DU (trade name) manufactured by Sumitomo Heavy Industries, Ltd.

Cylinder temperature: 300° C. mold temperature: 70° C.
Specifications of test piece:
Test piece A: length 80 mm×width 10 mm×thickness 4 mm

[Charpy Impact Strength Test]

A TYPE A notch conforming to ISO 179-1 was cut into the test piece A. and the Charpy impact strength was measured at 23° C. and −30° C. A higher value can be regarded as indicating a better impact resistance, and hence is favorable,

[Melt Flowability]

Each pellet was continuously injection molded 15 times under the following conditions, and the spiral flow length (SFL) was evaluated. Table 15 shows the maximum SFL and the minimum SFL out of the values in 15 rounds of injection molding, as well as the difference ΔSFL therebetween (maximum SFL−minimum SFL). A higher value can be regarded as indicating a higher melt flowability, and hence is favorable. Also, a smaller difference between the minimum and maximum values can be regarded as indicating a better molding stability, and hence is favorable.

Injection molding machine: SE100DU (trade name) manufactured by Sumitomo Heavy Industries, Ltd.

Cylinder temperature: 300° C., mold temperature: 70° C. injection speed: 20 mm/sec, and injection pressure: 50 MPa.

TABLE 18

|  |  | Example | | | Comparative Example | |
|---|---|---|---|---|---|---|
|  |  | 40 | 41 | 42 | 45 | 46 |
| Thermoplastic resin (E) [%] | PC | 54 | 54 | 54 | 60 | 54 |
|  | PET | 36 | 36 | 36 | 40 | 36 |
| Polymer particles (C) or composition | Type | (C-9) | (C-10) | (C-1) | — | (C-19) |
|  | Amount [%] | 10 | 10 | 10 | — | 10 |
| Charpy impact strength | 23° C. [kJ/m²] | N.B. | N.B. | 39 | 7.9 | 14 |
|  | −30° C. [kJ/m²] | 17 | 17 | 14 | 5.3 | 11 |
| SFL(Minimum) | mm | 386 | 393 | 302 | 257 | 293 |
| SFL(Maximum) | mm | 401 | 404 | 342 | 362 | 395 |
| ΔSFL | mm | 15 | 11 | 40 | 105 | 102 |

Excellent impact strength, melt flowability and molding stability were achieved in Examples 40 and 41.

Excellent impact strength and melt flowability were achieved in Example 42. However, Example 42 was inferior to Examples 40 and 41 in terms of molding stability due to lack of the component (D).

In Comparative Example 45, the impact strength and melt flowability were low due to lack of the polymer particles (C).

In Comparative Example 46, the impact strength, melt flowability and molding stability were low due to the use of the polymer particles (C) having a Z value of 60% or more.

Examples 43 to 44 and Comparative Examples 47 to 48

The composition obtained in Production Example 2-10, the polymer (C-1), a glass fiber-added polycarbonate resin (PCGF-2, lupilon GSH2030R2, manufactured by Mitsubishi Engineering-Plastics Corporation, 30% by mass of glass fiber added) and polyethylene terephthalate (PET, TRN8550FF, manufactured by Teijin Limited) were blended at the ratios shown in Table 19 to obtain mixtures. Each of the mixtures was supplied to a devolatilization-type, twin-screw extruder (PCM-30 (trade name) manufactured by Ikegai Co., Ltd.) heated to a barrel temperature of 300° C. and kneaded to prepare pellets of each resin composition.

The pellets were injection mottled under the following conditions to prepare a test piece for evaluation.

Injection molding machine: SE100DU (trade name) manufactured by Sumitomo Heavy Industries, Ltd.

Cylinder temperature: 300° C., mold temperature: 70° C. Specifications of test piece:

Test piece A: length 80 mm×width 10 mm×thickness 4 mm

[Charpy Impact Strength Test]

A TYPE A notch conforming to ISO 179-1 was cut into the test piece A, and the Charpy impact strength was measured at 23° C. and −30° C. A higher value can be regarded as indicating a better impact resistance, and hence is favorable.

[Melt Flowability]

Each pellet was continuously injection molded 15 times under the following conditions, and the spiral flow length (SFL) was evaluated. Table 15 shows the maximum SFL, and the minimum SFL out of the values in 15 rounds of injection molding, as well as the difference ΔSFL therebetween (maximum SFL−minimum SFL). A higher value can be regarded as indicating a higher melt flowability, and hence is favorable. Also, a smaller difference between the minimum and maximum values can be regarded as indicating a better molding stability, and hence is favorable.

Injection molding machine: SE100DU (trade name) manufactured by Sumitomo Heavy Industries, Ltd.

Cylinder temperature: 300° C., mold temperature: 70° C., injection speed: 20 min/sec, and injection pressure: 50 MPa.

TABLE 19

|  |  | Example | | Comparative Example | |
|---|---|---|---|---|---|
|  |  | 43 | 44 | 47 | 48 |
| Thermoplastic resin (E) [%] | PCGF-2 | 57 | 57 | 60 | 57 |
|  | PET | 38 | 38 | 40 | 38 |
| Polymer particles (C) or composition | Type | (C-10) | (C-1) | — | (C-19) |
|  | Amount [%] | 5 | 5 | — | 5 |
| Charpy impact strength | 23° C. [kJ/m²] | 12 | 11 | 6.5 | 9.1 |
| SFL (Minimum) | mm | 260 | 200 | 160 | 200 |
| SFL (Maximum) | mm | 273 | 332 | 201 | 428 |
| ΔSFL | mm | 13 | 132 | 41 | 228 |
| Flexural modulus | [GPa] | 5.2 | 5.2 | 5.5 | 4.9 |

Excellent impact strength, melt flowability and molding stability welt achieved in Example 4:3.

Excellent impact strength and melt flowability were achieved in Example 44. However, Example 44 was inferior to Example 43 in terms of molding stability due to lack of the component (D).

In Comparative Example 47, the impact strength and melt flowability were low due to lack of the polymer particles (C).

In Comparative Example 48, the impact strength, melt flowability and molding stability were low due to the use of the polymer particles (C) having a Z value of 60% or more.

What is claimed is:

1. Polyorganosiloxane-containing polymer particles, comprising:
   a polymer (A) comprising a polyorganosiloxane (A1) and a first vinyl polymer (A2); and
   a second vinyl polymer (B),
   wherein a proportion of particles satisfying formula (I) is less than 60%:

$$M/L > 0.1 \tag{1}$$

wherein L is a diameter of each particle of the polyorganosiloxane-containing polymer particles, as determined in an observation using a transmission electron microscope with respect to a cross section of a resin piece obtained by dispersing the polyorganosiloxane-containing polymer particles in a resin, and M is a maximum domain length of the polyorganosiloxane (A1) in the observation.

2. The polyorganosiloxane-containing polymer particles according to claim 1, wherein a proportion of the polyorganosiloxane (A1) is 1% by mass or more and 50% by mass or less, with respect to 100% by mass of the polyorganosiloxane-containing polymer particles.

3. The polyorganosiloxane-containing polymer particles according to claim 1, wherein a proportion of the polyorganosiloxane (A1) is 1% by mass or more and 10% by mass or less, with respect to 100% by mass of the polyorganosiloxane-containing polymer particles.

4. The polyorganosiloxane-containing polymer particles according to claim 1, which have a number average particle diameter of 10 nm or more and 150 nm or less.

5. The polyorganosiloxane-containing polymer particles according to claim 1, a proportion of which is insoluble in tetrahydrofuran, wherein the proportion of the polyorganosiloxane-containing polymer particles which are insoluble in tetrahydrofuran is 80% by mass or more and less than 100% by mass, with respect to 100% by mass of the polyorganosiloxane-containing polymer particles.

6. The polyorganosiloxane-containing polymer particles according to claim 1, a proportion of which is soluble in tetrahydrofuran, wherein a weight average molecular weight of the polyorganosiloxane-containing polymer particles which are soluble in tetrahydrofuran is 20,000 or more and 500,000 or less.

7. The polyorganosiloxane-containing polymer particles according to claim 1, wherein the polymer (A) has a sea-island structure with the polyorganosiloxane (A1) as a sea component and the first vinyl polymer (A2) as an island component, as confirmed by observation using a transmission electron microscope with respect to a cross section of the resin piece,
wherein the sea-island structure has multiple domains of the first vinyl polymer (A2) domains included in a domain of the polyorganosiloxane (A1).

8. The polyorganosiloxane-containing polymer particles according to claim 1, each of which has a sea-island structure with the polyorganosiloxane (A1) as a sea component and the first vinyl polymer (A2) as an island component, as confirmed by observation using a transmission electron microscope with respect to a cross section of the resin piece.

9. The polyorganosiloxane-containing polymer particles according to claim 1, wherein a proportion of the polymer (A) is 60% by mass or more and 95% by mass or less, with respect to 100% by mass of the polyorganosiloxane-containing polymer particles.

10. The polyorganosiloxane-containing polymer particles according to claim 1, wherein the first vinyl polymer (A2) comprises a vinyl monomer component (a2) including a monofunctional (meth)acrylate monomer.

11. The polyorganosiloxane-containing polymer particles according to claim 1, wherein the second vinyl polymer (B) comprises a vinyl monomer component (b) including at least one selected from the group consisting of a (meth)acrylate monomer and an aromatic vinyl monomer,
wherein a proportion of a total amount of the (meth)acrylate monomer and the aromatic vinyl monomer is 50% by mass or more, with respect to 100% by mass of the vinyl monomer component (b).

12. The polyorganosiloxane-containing polymer particles according to claim 1, wherein the second vinyl polymer (B) comprises a vinyl monomer component (b) including methyl methacrylate,
wherein a proportion of the methyl methacrylate is 50% by mass or more, with respect to 100% by mass of the vinyl monomer component (b).

13. The polyorganosiloxane-containing polymer particles according to claim 1, wherein the polymer (A) is a polymer obtained by polymerizing a vinyl monomer component (a2) for the first vinyl polymer (A2) in the presence of a latex containing the polyorganosiloxane (A1).

14. A composition, comprising:
the polyorganosiloxane-containing polymer particles of claim 1; and
at least one component selected from the group consisting of a phosphoric acid compound and an alkali metal salt thereof.

15. The composition according to claim 14, wherein the alkali metal salt of the phosphoric acid compound is at least one selected from the group consisting of an alkali metal salt of an alkyl phosphate and an alkali metal salt of an alkyl aryl phosphate.

16. The composition according to claim 14, wherein the alkali metal salt of the phosphoric acid compound is an alkali metal salt of a polyoxyalkylene alkyl ether phosphate.

17. The composition according to claim 14, wherein an amount of phosphorus atoms contained in the at least one component selected from the group consisting of a phosphoric acid compound and an alkali metal salt thereof is 100 ppm by mass or more, in terms of a mass proportion thereof relative to a total 100% by mass of the polyorganosiloxane-containing polymer particles and the at least one component.

18. A resin composition, comprising:
the polyorganosiloxane-containing polymer particles of claim 1; and
a thermoplastic resin.

19. A resin composition, comprising:
the composition of claim 14; and
a thermoplastic resin.

20. The resin composition according to claim 18, wherein the thermoplastic resin comprises at least one selected from the group consisting of aromatic polycarbonate, polymethyl methacrylate, styrene-acrylonitrile copolymer, polyethylene terephthalate, polybutylene terephthalate, polyvinyl chloride, polyphenylene sulfide, and polyacetal.

21. A molded product, comprising the polyorganosiloxane-containing polymer particles of claim 1.

* * * * *